United States Patent [19]

Horie et al.

[11] Patent Number: 5,787,239
[45] Date of Patent: Jul. 28, 1998

[54] IMAGE PROCESSING/COMMUNICATION SYSTEM

[75] Inventors: Hitoshi Horie, Ageo; Toru Ozaki, Tokyo; Hideyuki Shirai, Ichikawa, all of Japan

[73] Assignee: Matsushita Graphic Communication Systems, Inc., Japan

[21] Appl. No.: 680,645

[22] Filed: Jul. 17, 1996

Related U.S. Application Data

[62] Division of Ser. No. 2,471, Jan. 8, 1993, Pat. No. 5,574,834.

[30] Foreign Application Priority Data

| Jan. 9, 1992 | [JP] | Japan | 4-1879 |
| Feb. 13, 1992 | [JP] | Japan | 4-26457 |
| Apr. 22, 1992 | [JP] | Japan | 4-102622 |

[51] Int. Cl.$^6$ .......... G06F 15/00
[52] U.S. Cl. .......... 395/114; 382/132
[58] Field of Search .......... 395/101, 109, 395/114, 117, 139, 505, 244, 245, 246, 248; 358/448, 261.1, 261.2, 261.3, 539, 427, 430; 382/232, 234, 235, 245, 233, 236, 237, 238, 239; 345/129, 130; 355/72; 341/81, 82, 86

[56] References Cited

U.S. PATENT DOCUMENTS

| 5,014,276 | 5/1991 | Bush et al. | 371/43 |
| 5,231,679 | 7/1993 | Matsuura et al. | 382/232 |
| 5,379,070 | 1/1995 | Retter et al. | 348/403 |
| 5,384,567 | 1/1995 | Hassner et al. | 341/51 |
| 5,446,747 | 8/1995 | Berrou | 371/45 |
| 5,450,599 | 9/1995 | Horvath et al. | 395/800 |
| 5,471,206 | 11/1995 | Alleh et al. | 341/51 |
| 5,574,834 | 11/1996 | Horie et al. | 395/114 |

*Primary Examiner*—David K. Moore
*Assistant Examiner*—Gabriel I. Garcia
*Attorney, Agent, or Firm*—Rossi & Associates

[57] ABSTRACT

An image processing/communication system provided with a processing unit for performing a coding processing on image data, a plurality of line memories for storing image data related to the coding processing and coding data, an external-bus connection control unit for controlling a connection between the external bus and the system, an internal bus for transferring data to the processing unit, the external-bus connection control unit and the plurality of line memories, and an operation control unit for causing the processing unit, the plurality of line memories and the external-bus connection control unit to simultaneously perform an input operation of inputting image data from the external bus to the line memory and an output operation of outputting coding data to the external bus from the processing unit or the line memory in parallel with one another. Thus, in each operation of this system, a coding processing can be effected by using the line memory. Therefore, an access to an external bus, which is necessary in the conventional system, becomes unnecessary. Moreover, a coding operation, a data input operation of inputting data from and a data output operation of outputting data to the external bus can be performed in parallel with one another. Thus, a coding operation can be performed extremely quickly.

11 Claims, 50 Drawing Sheets

E/R : ENLARGEMENT/REDUCTION

DISR : DIS SIGNAL RECEIVING
CCT : CODE CONVERSION TERMINATION

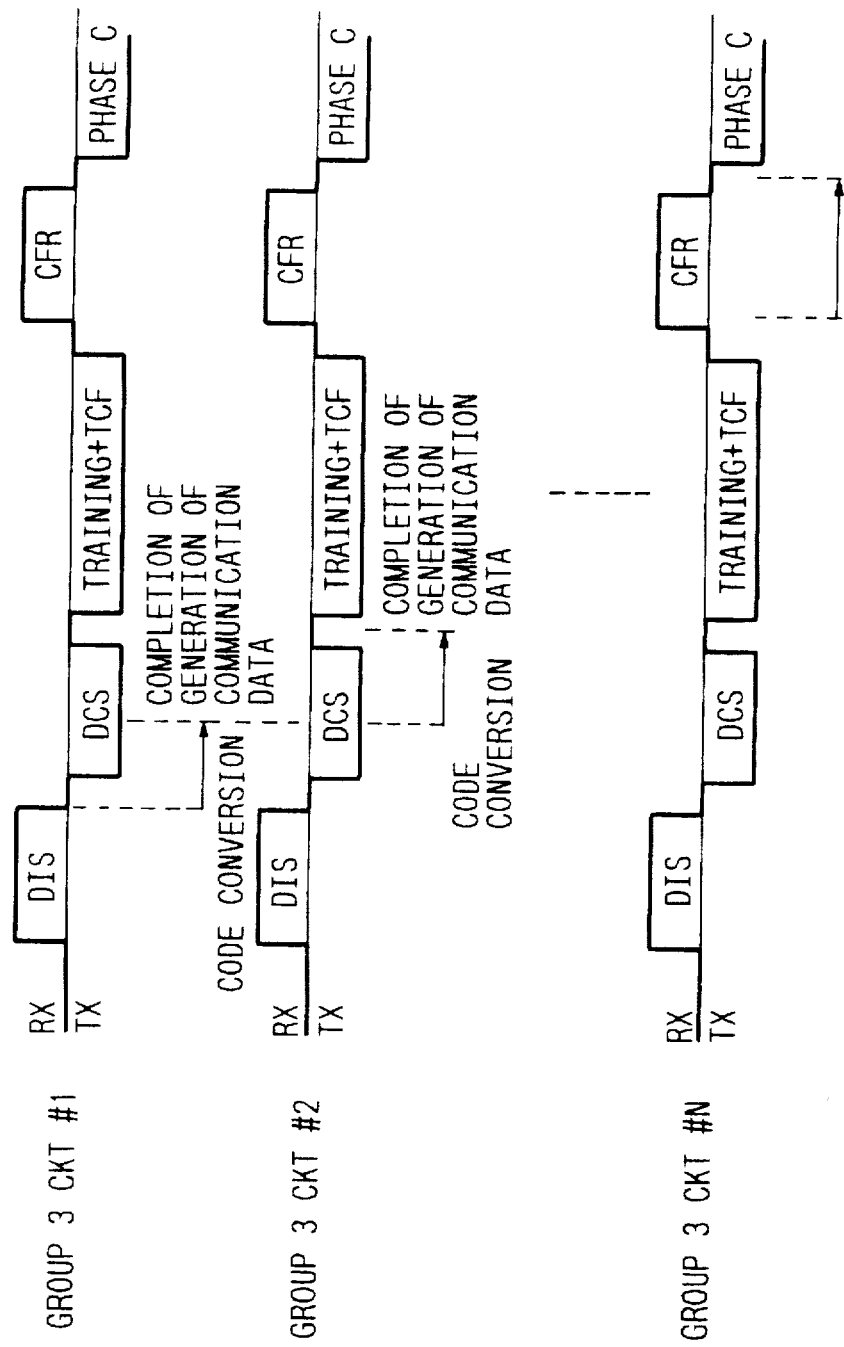

IMAGE PROCESSING/COMMUNICATION SYSTEM

This is a Division of application Ser. No. 08/002,471, filed Jan. 8, 1993, now U.S. Pat. No. 5,574,834.

BACKGROUND OF THE INVENTION

1. Field of the Invention

This invention generally relates to an image processing system for processing image data and coded image data (hereunder sometimes referred to as image code data or simply as code data) and to an image communication system such as a facsimile system for receiving image code data and reproducing an image on a sheet of recording paper. More particularly, this invention relates to an image processing system for carrying out various functions, which are necessary for a facsimile system or the like, such as compression of image data, expansion of image code data, conversion (namely, enlargement or reduction) of an image represented by image data and conversion of a code representing image data to another type of code representing the image data. Further, this invention particularly relates to an image communication system for following a communication procedure to simultaneously transmit image code data to a plurality of image-receiving terminals by using a plurality of circuits or lines, for appreciating the receiving capability of each image-receiving terminal and for performing a code conversion of image code data according to the appreciated receiving capability of each receiving capability of each image-receiving terminal.

2. Description of the Related Art

The above described image processing system is needed in an image communication system such as a facsimile system and a picture file system.

FIG. 1 illustrates an example of a conventional facsimile system. This conventional facsimile system is provided with two compression/expansion devices for performing expansion of received image code data and compression of image data (namely, a first compression/expansion device 8001 and a second compression/expansion device 8002) and an image conversion device 8003 for performing enlargement/ reduction (namely, image conversion) of an image represented by image data. These devices interface to both of a system bus 8005 and an image bus 8006.

The received code data is first demodulated by a modem 8007. Then the demodulated code data is buffered, namely, stored in a compression data memory 8009 on (or connected to) the system bus 8005. Subsequently, the buffered code data is decoded by, for example, the first compression/ expansion device (namely, the compression/expansion device #1) 8001. Thereafter, restored image data is stored in an image page memory 8010 on the image bus 8006. Incidentally, a random access memory (RAM) 8016 is used as a reference line memory.

When image data of one page is restored and parameters such as the number of lines of an image represented by the restored image data are obtained, a ratio of enlargement or reduction of this image (hereunder sometimes referred to as a scaling ratio of image data) is determined and then the image conversion device 8003 is informed of the determined scaling ratio. Thereafter, enlargement or reduction of the image data stored in the image page memory 8010 is performed by the image conversion device 8003. Upon completion of the conversion (namely the expansion or reduction), the converted image data is transferred through a recording image processing unit 8011 to a printer 8012 whereupon the transferred image data is printed on a sheet of recording paper.

In case that a request to read an original page of a draft to be transmitted occurs during a receiving operation as above described, the page to be transmitted is first scanned by an image scanner 8014. Then output signals of the image scanner 8014 is processed by a read-image processing unit 8015 to generate transmitting-draft image data representing an image of the original page of the draft. Subsequently, the transmitting-draft image data is sent through the RAM (hereunder sometimes referred to as the line buffer) 8016 on the image bus 8006 to the second compression/expansion device (namely, the compression/expansion device #2) 8002 whereupon the sent image data is coded. Code data obtained by the device 8002 is stored in a compression data memory 8009. Additionally, the RAM 8016 is used as a coding line memory and a reference line memory.

Such a conventional compression/expansion device has a structure as illustrated in FIG. 2. In this figure, reference numeral 8050 representing an image bus unit for interfacing with the image bus; and 8051 a system bus unit for interfacing with the system bus. Image data and code data are inputted and outputted through these bus units 8050 and 8051 as 16-bit-parallel word data and 8-bit-parallel word data, respectively.

In this compression/expansion device, composing elements for performing a coding of image data are a changing-pixel-of-reference-line detection portion 8052 for detecting an address of a changing pixel (namely, a changing pel) of a reference line, a changing-pixel-of-coded-line detection portion 8053 for detecting an address of a changing pixel of a coding line, a coding mode judgement portion 8054 for judging which of vertical, horizontal and pass modes a coding mode is, by using information on the address of the changing-pixel, a coding-table retrieval portion 8055 for effecting code assignment on the basis of a result of the judgement made by the coding mode judgement portion 8054 and a coding table read-only memory (ROM) (hereunder sometimes referred to simply as a coding ROM) 8056.

Further, composing elements for performing a decoding of code data are a decoding-table retrieval portion 8058 for analysis of code data, a decoding table ROM (hereunder sometimes referred to simply as a decoding ROM) 8059, an a0-address calculation portion 8060 for calculating the address of a starting point of a decoding line or the address of a reference changing-pixel a0 (see CCITT (Consultative Committee in International Telegraphy and Telephony). Recommendation T. 4) and an image-data drawing portion 8061 for drawing an image represented by image data corresponding to a decoding line. Incidentally, reference numeral 8062 designates a control unit for monitoring the state of the compression/expansion device and controlling the operation thereof.

In case of the conventional compression/expansion device with the above described configuration, when performing a compression operation, the following sequence of operations are effected serially. Namely, image data is inputted thereto in word units and then the address of a changing pixel is detected and coded. Subsequently, code data is outputted therefrom. Therefore, a time required for a compression operation (hereunder sometimes referred to as a compression processing time) is given by the following equation:

$$\begin{aligned}\text{(A compression processing time)} = &\text{(Image data input time)} \\ &+ \text{(Coding processing time)} \\ &+ \text{(Code data output time)}\end{aligned} \quad \ldots (1)$$

where the image data input time is a time required for inputting image data, and the coding processing time is a time required for completing a coding operation, and the code data output time is a time required for outputting generated code data.

The coding line memory and the reference line memory are provided in an external memory (namely, RAM 8016 of FIG. 1) on the image bus. However, an access time for the image bus (hereunder sometimes referred to as a bus access time) is rather long. Further, the lower limit of the time indicated by the second term of the right-hand side (namely, the coding processing time) of the equation (1) depends on this bus access time. Therefore, there is a limitation in speeding-up of a compression operation (and thus of the entire processing of data by the facsimile system).

Especially, in case where a plurality of compression/expansion devices and an image conversion device are provided on or connected to a common bus just as in case of the facsimile system of FIG. 1, a burden on the common bus becomes large. This results in increasing the bus access time. Consequently, the compression processing time becomes noticeably increased due to the increase in the bus access time.

In case of processing image data representing a coarse image, the periods of time respectively indicated by the second and third terms of the right-hand side of the equation (1) are rather shorter than the period of time indicated by the first term of the right-hand side thereof. Thus the compression processing time is substantially dependent only on the image data input time. In contrast with this, in case of processing image data representing a fine image, the coding processing time indicated by the second term of the right-hand side of the equation (1) is increased in comparison with that of the former case (namely, the case of processing image data representing a coarse image). Moreover, in the latter case (namely, the case of processing image data representing a fine image), generated code data increases compared with code data of the former case. Thus the code data output time indicated by the third term of the right-hand side of the equation (1) is increased in comparison with that of the former case. Consequently, the total processing time (namely, the compression processing time) becomes large. Additionally, the total processing time changes very widely according to the contents of image data to be processed.

The same applies to a case of performing an expansion operation.

As is apparent from the foregoing description of an operation of the facsimile system of FIG. 1, when an image conversion of restored image data is needed, the image conversion cannot be commenced until all image data representing an image of one page is restored, because of the necessity of obtaining parameters required to determine a scaling ratio (namely, an enlargement or reduction ratio). Consequently, a bulk memory (namely, the image page memory 8010 of FIG. 1) being capable of storing restored image data representing an image of one page becomes necessary.

Further, the image conversion device is independent of the compression/expansion devices. Therefore, when an image conversion and a compression operation (or an expansion operation) are performed serially, an access to an external bus is necessary for the image conversion. This is also a limitation on speeding-up of the processing.

Next, drawbacks of the image communication system as above described (namely, the image communication system (e.g., a facsimile system) for receiving image code data and reproducing an image on a sheet of recording paper) will be described hereinbelow.

When recording paper corresponding to a regular paper size is used in such an image communication system, it becomes necessary for recording a received image in a reproduction area on recording paper with an appropriate size to perform enlargement/reduction processing of the received image before the recording thereof. For instance, a conventional facsimile system employing a laser beam printer (hereunder abbreviated as LBP) as an image recording means generally uses recording paper of regular paper sizes and thus is adapted to perform the enlargement/reduction processing.

FIG. 3 illustrates the configuration of such a conventional facsimile system. In this figure, reference numeral 5050 denotes a read-image processing unit; 5051 an LBP recording device; 5052 a compression/expansion device; 5053 an image conversion device; 5054 an image page memory; 5055 a compression data memory; 5056 a microprocessor unit (MPU) having a direct-memory-access (DMA) controller; 5057 RAM/ROM; 5059 a control unit having MPU 5056 and RAM/ROM 5057; 5060 a modem; and 5061 a network control unit (NCU).

Hereinafter, a receiving operation of the conventional facsimile system of FIG. 3 will be described by referring to a flowchart of a program shown in FIG. 4.

Under the control of the control unit 5059, image code data received in what is called a message sending procedure (corresponding to Phase C (namely, a phase of sending fax signals for the page being copied) of the standard facsimile protocol or procedure (see CCITT Recommendation T.30)) is demodulated by the modem 5060. Then, the demodulated data are serially stored in the compression data memory 5055 in step 5300 of FIG. 4. Thereafter, the code data stored in the compression data memory 5055 is read into the compression/expansion device 5052 whereupon the read code data is decoded. Subsequently, in step 5301, data obtained as the result of the decoding is stored in the image page memory 5054 as image data (namely, raw data). The above-mentioned processing of these steps is performed on each line. Incidentally, the image page memory 5054 has a memory capacity sufficient to store image data representing an image of one page. Upon completion of reception of the code data corresponding to an image of one page in step 5302, the program exits therefrom to YES-branch and advances to step 5303 whereupon the device continues to effect a decoding of the code data which has not been decoded. Upon completion of the decoding of the code data corresponding to an image of one page in step 5304, namely, when the program exits therefrom to YES-branch, parameters such as the number of lines of one page and the numbers of continuous white lines at the top and bottom of the page are obtained. Thus the control unit 5059 can determine a scaling ratio (namely, an enlargement ratio or a reduction ratio) on the basis of the parameters. In case where enlargement or reduction of an image represented by the image data, the control unit 5059 sets the determined scaling ratio in the image conversion device 5053 and causes the image conversion device 5053 to perform enlargement or reduction of the image represented by the image data stored in the image page memory 5054. Then, in step 5305, the control unit causes the LBP recording device to record the processed image data. Thereafter, when it is found in step 5306 that the final line of the enlarged or reduced image represented by the processed image data is recorded, the program exits therefrom to YES-branch and thus the processing of image data corresponding to the image of one page is completed.

This conventional image communication system, however, has drawbacks in that a mass image page memory is necessary and moreover, at the time of reception, this memory cannot be used for another purpose and thus the communication is uneconomical.

Next, drawbacks of the other image communication system as above described (namely, the image communication system for following a communication procedure to simultaneously transmit image code data to a plurality of image-receiving terminals by using a plurality of circuits or lines, for appreciating the receiving capability of each image-receiving terminal and for performing a code conversion of image code data according to the appreciated receiving capability of each image-receiving terminal) will be described hereinbelow.

An example of such a conventional image communication system is what is called a facsimile (Fax) mail system. FIG. 5 shows the configuration of a conventional facsimile mail system. This conventional facsimile mail system is adapted to receive facsimile data (namely, image code data) from a Group 4 transmitting terminal through an integrated services digital network (ISDN) circuit and to simultaneously transmit the received data to three Group 3 facsimile receiving terminals at the most by using Group 3 circuits #1 to #3. As shown in this figure, in this system, an ISDN interface circuit 5550, a memory 5551, a control unit 5552 and blocks 5553 respectively corresponding to the Group 3 circuits (thus the number of blocks 5553 is equal to that of the Group 3 circuits connected to this system) are connected to a system bus 5570.

As shown in this figure, each of the blocks (hereunder sometimes referred as Group 3 circuit corresponding blocks) 5553 contains a modem 5554, an NCU (namely, a network control unit) 5555, a compression/expansion device 5556 and an enlargement/reduction device 5557. Further, the compression/expansion device 5556, the enlargement/reduction device 5557 and an (external) memory 5558 are connected to an image bus 5559. The control unit 5552 is used to follow facsimile procedures and to control an operation of each of the remaining portions of this system, as well as data transmission. Furthermore, the control unit 5552 is provided with a microprocessor unit/DMA controller unit (MPU/DMAC) 5560 and a memory (RAM/ROM) 5561.

Data received from a Group 4 facsimile transmitting terminal is sent through the ISDN interface circuit 5550 to the memory 5551 and is stored in this memory. Upon completion of receiving this data, the control unit 5552 calls N Group 3 facsimile receiving terminals through the Group 3 corresponding blocks 5553, which biuniquely correspond to the Group 3 circuits #1 to #N. Subsequently, the control unit 5552 appreciates the receiving ability or capability (e.g., an employed coding method and paper size of reception recording paper) of each of the called facsimile receiving terminals in the course of the facsimile procedure and causes each of the corresponding blocks 5553 to perform code conversion (including paper size conversion and image conversion) of data stored in the memory 5551 to data meeting the receiving ability of the corresponding facsimile receiving terminals. Thereafter, the control unit 5552 transmits the converted data to the facsimile receiving terminals.

FIG. 6 illustrates an example of a communication sequence in case of this conventional facsimile mail system. As is seen from this figure, the receiving ability of the Group 3 facsimile receiving terminal connected to each Group 3 circuit is appreciated from a digital identification signal (DIS) received in Phase B of the facsimile procedure. At that time, code conversion processing (namely, decoding, enlargement/reduction processing and coding of received data) is started. Thereafter, the code conversion processing is finished before the system enters Phase C of the facsimile procedure. Incidentally, the code conversion processing may be performed in Phase C of the facsimile procedure.

Such a conventional facsimile mail system, however, has drawbacks in that the system should be provided with expensive Group 3 circuit corresponding blocks, the number of which is equal to that N of Group 3 circuits or lines respectively transmitting data to be simultaneously processed, and thus, in case where the number of the Group 3 circuits accommodated by or connected to the system is large, the structure of the system becomes extremely complex and the system becomes very costly.

The background causing such drawbacks is the fact that the code conversion rate of the Group 3 circuit corresponding block 5553 is small. Namely, in the Group 3 circuit corresponding block 5553, the received data is sent to the compression/expansion device 5556 to decode the data and then, the image data representing a restored image obtained as a result of the decoding is once stored in the external memory 5558. Thereafter, enlargement/reduction processing (namely, an image conversion) is performed on the image data, which is stored in the memory 5558, by the enlargement/reduction device 5557. Subsequently, image data obtained as a result of effecting the enlargement/reduction processing is sent from the memory 5558 to the compression/expansion device 5556 to perform a coding of the sent image data. Then, the coded data is sent back to the memory 5551. As described hereinabove, the code conversion is carried out by performing such a serial processing sequence. Further, image data of a reference line to be used at the time of effecting a coding or a decoding is stored in the external memory 5558. Thus, the number of times of accessing the image bus 5559 in relation to the code conversion processing is very large. In other words, access time related to the code conversion processing is long. This is also a limitation on a speeding-up of the processing.

The present invention is accomplished to eliminate the above-mentioned drawbacks of the conventional systems.

It is, accordingly, an object of the present invention to provide an image processing system which can perform operations necessary in a facsimile system (namely, a compression operation, an expansion operation, an image conversion operation and a code conversion operation).

Further, it is another object of the present invention to provide an image communication system which does not require a mass image page memory even when recording a received image on recording paper of a regular paper size at a high speed by using LBP or the like.

Moreover, it is a further object of the present invention to reduce the capacity of a memory for storing image code data and utilize this memory effectively.

Furthermore, it is still another object of the present invention to provide a facsimile mail system which has a simple and inexpensive structure being capable of meeting cases where the the number N of Group 3 circuits respectively transmitting data to be simultaneously processed is large.

Additionally, it is yet another facsimile mail system which can easily cope with increase in lines or circuits and restrain an associated rise in cost.

SUMMARY OF THE INVENTION

To achieve the foregoing object, in accordance with an aspect of the present invention, there is provided an image processing system which comprises processing means for performing a coding processing on image data, a plurality of line memories for storing image data related to the coding processing and coding data, external-bus connection control means for controlling a connection between the external bus and the system, an internal bus for transferring data to the processing means, the external-bus connection control means and the plurality of line memories, and operation control means for causing the processing means, the plurality of line memories and the external-bus connection control means to simultaneously perform an input operation of inputting image data from the external bus to the line memory and an output operation of outputting coding data to the external bus from the processing means or the line memory in parallel with each other.

Thus, in each operation of this system, a coding processing can be effected by using the line memory. Therefore, an access to an external bus, which is necessary in the conventional system, becomes unnecessary. Moreover, a coding operation, a data input operation of inputting data from and a data output operation of outputting data to the external bus can be performed in parallel with one another. Thus, a coding operation can be performed extremely quickly.

Further, to achieve the foregoing object, in accordance with another aspect of the present invention, there is provided an image processing system which comprises processing means for performing a decoding processing on code data obtained by coding image data, a plurality of line memories for storing image data related to the decoding, external-bus connection control means for controlling a connection between the external bus and the system, an internal bus for transferring data to the processing means, the external-bus connection control means and the plurality of line memories, and operation control means for causing the processing means, the plurality of line memories and the external-bus connection control means to simultaneously perform an input operation of inputting code data from the external bus to the processing means, an operation of performing the decoding and an output operation of outputting image data to the external bus from the processing means or the line memory in parallel with one another.

Thus, in each operation of this system, a decoding processing can be effected by using the line memory. Therefore, an access to an external bus, which is necessary in the conventional system, becomes unnecessary. Moreover, a coding operation, a data input operation of inputting data from and a data output operation of outputting data to the external bus can be performed in parallel with one another. Thus, a decoding operation can be performed very quickly.

Moreover, to achieve the foregoing object, in accordance with still another aspect of the present invention, there is provided an image communication system comprising:

receiving means for receiving code data corresponding to an image from a circuit;

compression expansion performing means for decoding the code data received by the receiving means to first image data indicating the image of one page, calculating an enlargement/reduction parameter required to determine an enlargement/reduction ratio from the first image data corresponding to one page and coding the first image data to re-coded data;

coded data storing means for storing the re-coded data obtained by the compression/expansion performing means;

control means for controlling the compression/expansion performing means to decode the code data to the first image data, code the first image data to the re-coded data, re-decode the re-coded data stored in the coded data storing means to second image data indicating the image and convert the second image data into enlargement/reduction image data by performing an enlargement/reduction operation for the second image data according to the enlargement/reduction parameter; and recording means for recording the enlargement/reduction image data obtained by the compression/expansion performing means on a recording paper having a fixed size under the control of the control means.

In the above configuration, the code data received by the receiving means is not stored in the coded data storing means to record an image obtained by decoding the code data on recording paper, but the re-coded data obtained by coding the first image data is stored in the coded data storing means to record an image obtained by decoding the re-code data on a recording paper. In this case, the first image data obtained by decoding the coded data is necessarily required to calculate an enlargement/reduction parameter required to determine an enlargement/reduction ratio. Therefore, a data volume of the re-coded data can be reduced by adopting an optimum data coding for the first image data as compared with a data volume of the coded data generally coded according to an MH, MR or MMR facsimile standard coding prescribed in CCITT Recomendation T4 and T6, and a memory capacity of the coded data storing means can be reduced.

Further, to achieve the foregoing object, in accordance with yet another aspect of the present invention, there is provided an image communication system comprising:

receiving means for receiving code data corresponding to an image from a circuit, the code data being coded according to a first data coding;

compression/expansion performing means for decoding the code data received by the receiving means to first image data indicating the image of one page, calculating an enlargement/reduction parameter required to determine an enlargement/reduction ratio from the first image data corresponding to one page and coding the first image data re-coded data, the re-coded data being coded according to a second data coding different from the first data coding;

coded data storing means for storing the re-coded data obtained by the compression/expansion performing means;

control means for controlling the compression/expansion performing means to decode the code data to the first image data, code the first image data to the re-coded data, re-decode the re-coded data stored in the coded data storing means to second image data indicating the image and convert the second image data into enlargement/reduction image data by performing an enlargement/reduction operation for the second image data according to the enlargement/reduction parameter; and recording means for recording the enlargement/reduction image data obtained by the compression/expansion performing means on a recording paper having a fixed size under the control of the control means.

In the above configuration, the coded data is generally obtained by coding image data indicating an image according to an MH, MR or MMR facsimile standard coding prescribed in CCITT Recommendation T4 and T6. Therefore, though a data volume of the coded data is considerably reduced as compared with a data volume of the image data in cases where the image is formed of many long runs, there is a case that a data volume of the coded data becomes five times that of the image data in cases where the image is formed of many short runs. In this case, assuming that the code data received by the receiving means is stored in the coded data storing means to record an image obtained by decoding the code data on a recording paper, the coded data storing means is required to have a large memory capacity.

In the present invention, the code data is not stored in the coded data storing means, but the re-coded data is stored in the coded data storing means to record an image obtained by decoding the re-code data on a recording paper. The re-coded data is, for example, obtained by coding the first image data according to an MG3 data coding. In the MG3 data coding, the first image data corresponding to one line of one page is initially coded according to the facsimile standard coding such as MH, MR or MMR data coding to obtain provisional coded data for each line. In cases where a data length of the provisional coded data is equal to or shorter than that of the first image data of one line (or a summed data length obtained by summing in the data length of the first image data of one line and ten and several bits of an expansion code), the provisional coded data is adopted as re-coded data. In contrast, in cases, where a data length of the provisional coded data is longer than that of the first image data of one line (or summed data length), a code obtained by adding the expansion code to the first image data of one line is adopted as re-coded data.

Therefore, the data volume of the re-coded data of one page can be reliably reduced, and a memory capacity of the coded data storing means can be reduced. For example, a maximum data volume of the re-coded data of one page is almost equal to that of the first image data of one page Moreover, to achieve the foregoing object, in accordance with another aspect of the present invention, there is provided an image communication system which comprises a recording device for recording image data on recording paper, a memory for storing data, first processing means for receiving code data corresponding to an image, second processing means for restoring image data representing the image by decoding the code data received by the first processing means and for performing a re-coding of the restored image data and for causing the memory to store re-coded data obtained as a result of the re-coding, third processing means for restoring image data by decoding the re-coded data after the second processing means finishes the processing to be performed on image data corresponding to an image of one page and for effecting enlargement/ reduction of an image represented by the image data obtained from the re-coded data by using an enlargement/ reduction ratio determined by the recording device and transferring data obtained as a result of effecting the enlargement/reduction to the recording device, and control means for causing the first processing means and the second processing means to operate simultaneously in parallel with each other and causing the recording device and the third processing means to operate simultaneously in parallel with each other.

In case of this image communication system, the re-coding of the restored image data is performed according to a coding method which is characteristic of the this system. Thus the required capacity of the compression memory can be reduced.

Furthermore, to achieve the foregoing object, in accordance with a further aspect of the present invention, there is provided an image communication system for transmitting image code data to a plurality of receiving terminals through a plurality of circuits, which system comprises a plurality of communication units for controlling connection between the system and each of the plurality of circuits, a code conversion device used in common correspondingly to the plurality of receiving terminals for performing a code conversion to generate image code data to be transmitted to each of the plurality of receiving terminals and a control unit for controlling operations of calling the plurality of receiving terminals, operations of effecting communication procedures to be performed to communicate with the plurality of receiving terminals and operations of performing code conversions to generate image code data to be transmitted to the plurality of receiving terminals.

Thus, the number of code conversion devices, which are very expensive in comparison with communication units, can be smaller than that of circuits or lines connected to the system. Therefore, the configuration of the entire image communication system can be simplified considerably. Consequently, the cost of the image communication system can be reduced very much due to decrease in number of code conversion devices to be provided in the system.

Additionally, to achieve the foregoing object, in accordance with an additional aspect of the present invention, there is provided an image communication system for transmitting image code data to a plurality of receiving terminals through a plurality of circuits, which system comprises a plurality of communication units for controlling connection between the system and each of the plurality of circuits, a code conversion device used in common correspondingly to the plurality of receiving terminals for performing a code conversion to generate image code data to be transmitted to each of the plurality of receiving terminals, and a control unit for controlling operations of calling the plurality of receiving terminals, operations of effecting communication procedures to be performed to communicate with the plurality of receiving terminals and operations of performing code conversions to generate image code data to be transmitted to the plurality of receiving terminals, wherein the code conversion device comprises processing means for performing a code conversion processing of image code data, a plurality of line memories for storing image data and code data related to the code conversion to be performed by the processing means, external-bus connection control means for controlling a connection between the code conversion device and an external bus, an internal bus for transferring data to the processing means, the plurality of line memories and the external-bus connection control means, and control means for causing the processing means, the plurality of line memories and- the external-bus connection control means to perform an operation of the processing means, an operation of inputting data from the external bus and an operation of outputting data to the external bus in parallel with one another.

Thus, in case of this image communication system provided with an improved code conversion device, a code conversion can be performed without accesses to the external bus except when image data to be converted is inputted to the system and image code data is outputted from the system. Moreover, the line memories for storing data to be required for performing a code conversion are provided in the code conversion device. Thus an access to such data can be effected at a high speed. Therefore, an extremely high speed code conversion can be achieved. Consequently, the number of expensive code conversion devices to be provided in the system can be reduced considerably. Further, even when the number of circuits to be connected to the system is large, an inexpensive image communication system can be provided.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 48 is a flowchart for illustrating a communication sequence to be performed by the facsimile mail system of FIG. 45;

DETAILED DESCRIPTION OF THE PREFERRED EMBODIMENTS

Hereinafter, the preferred embodiments of the present invention will be described in detail by referring to the accompanying drawings.

Figure 1:
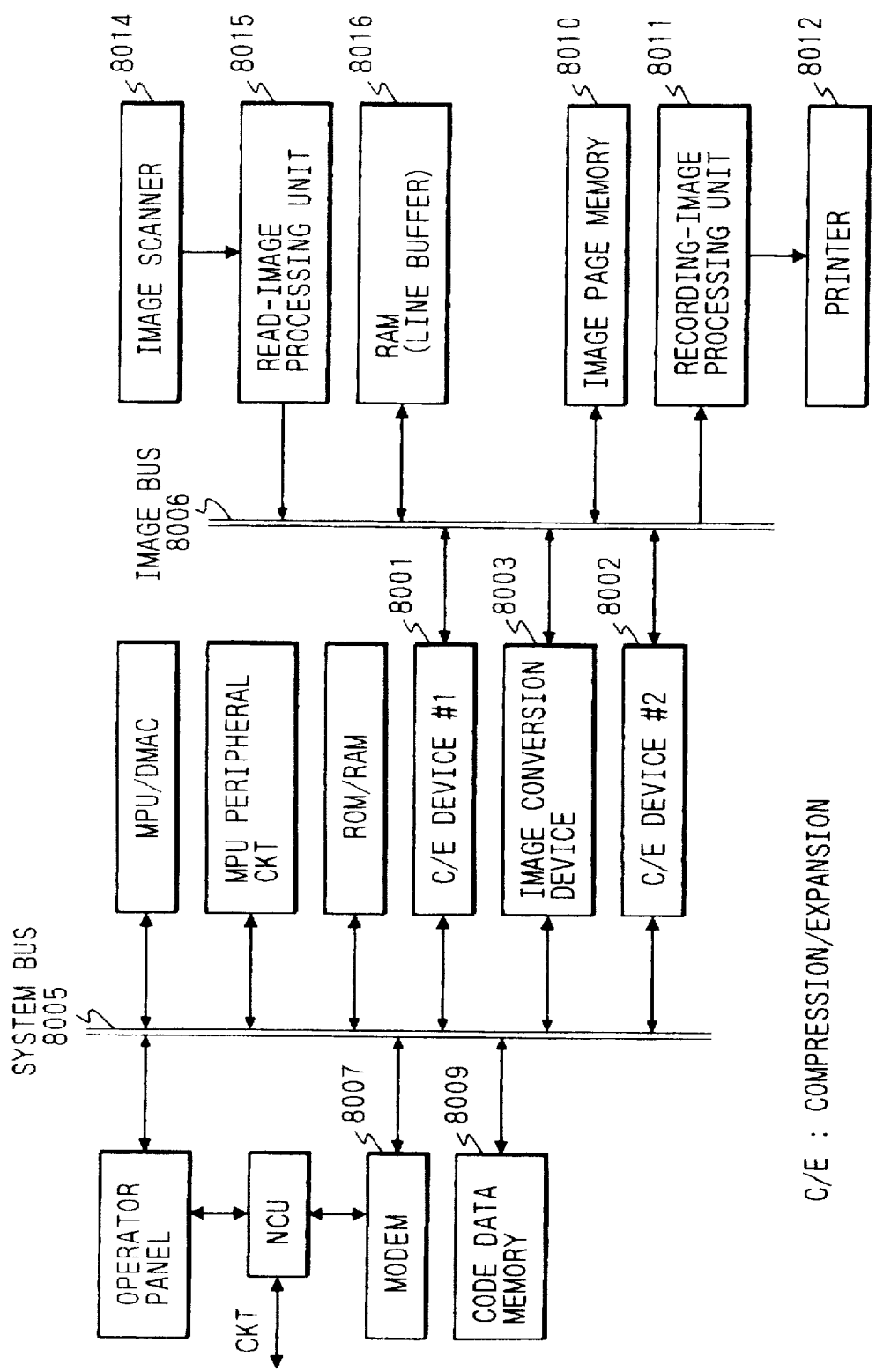
FIG. 1 is a schematic block diagram for illustrating the configuration of an example of a conventional facsimile system.
Figure 2:
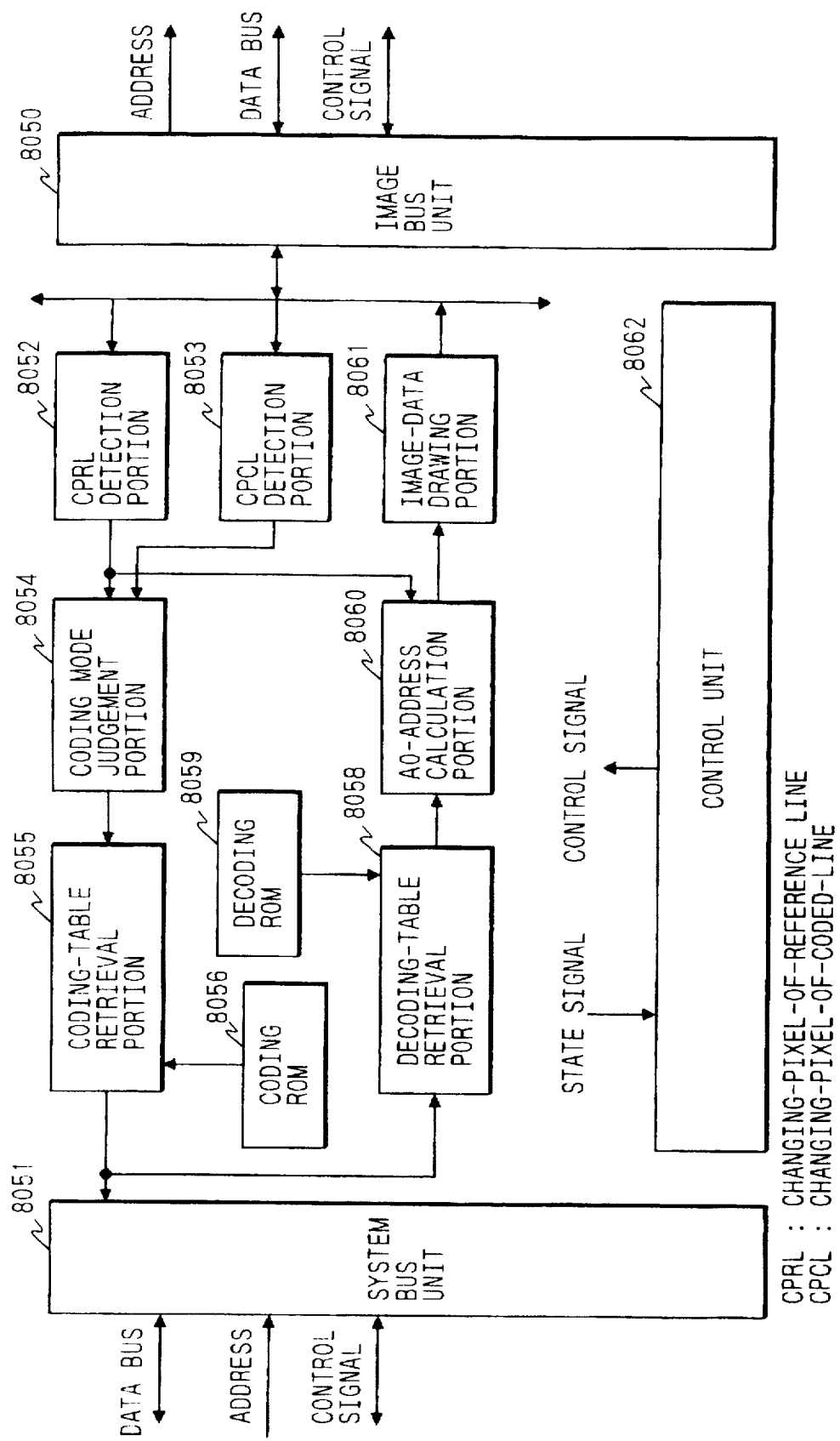
FIG. 2 is a schematic block diagram for illustrating the configuration of a conventional compression/expansion device.
Figure 3:
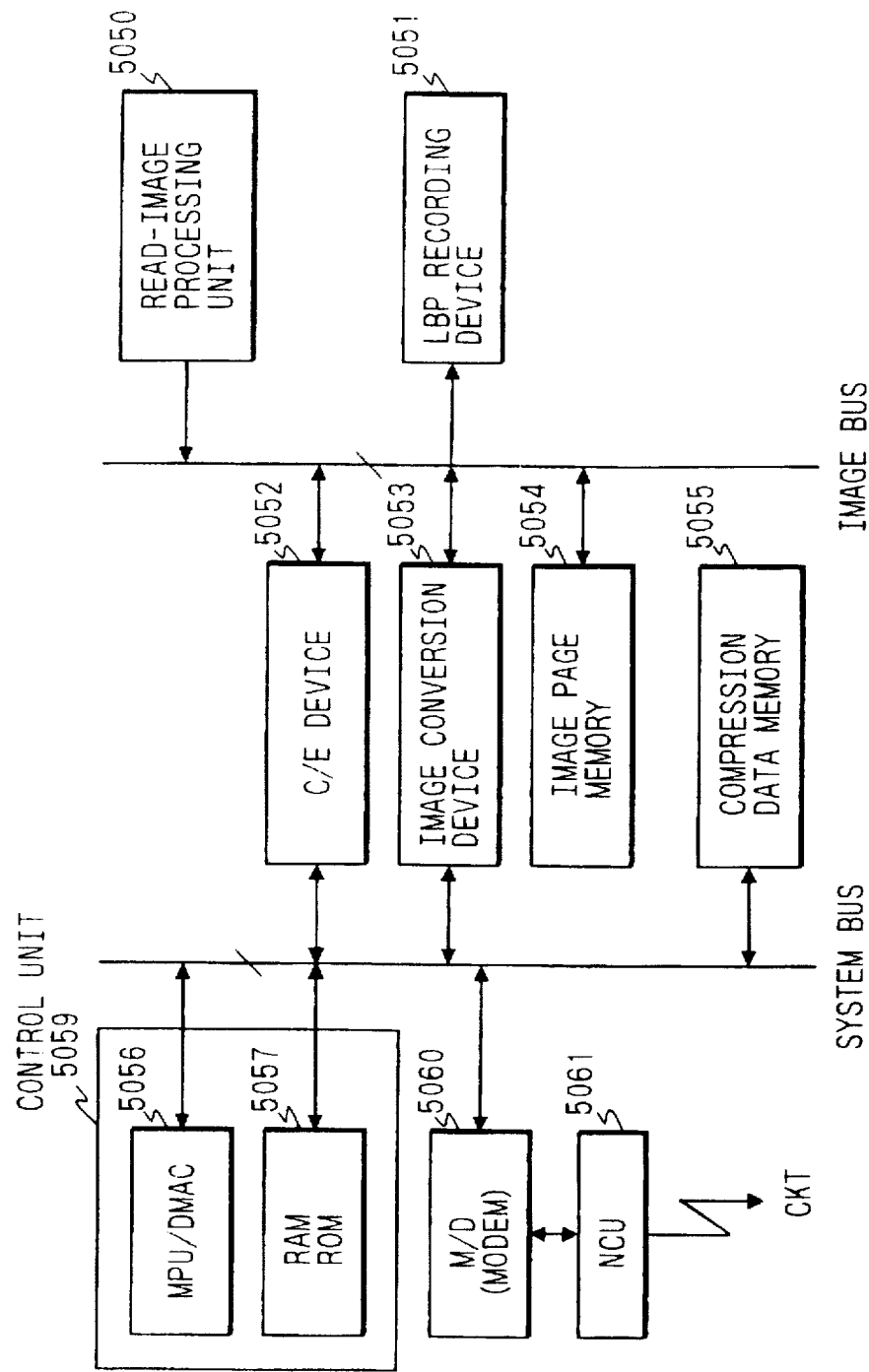
FIG. 3 is a schematic block diagram for illustrating the configuration of another example of a conventional facsimile system.
Figure 4:
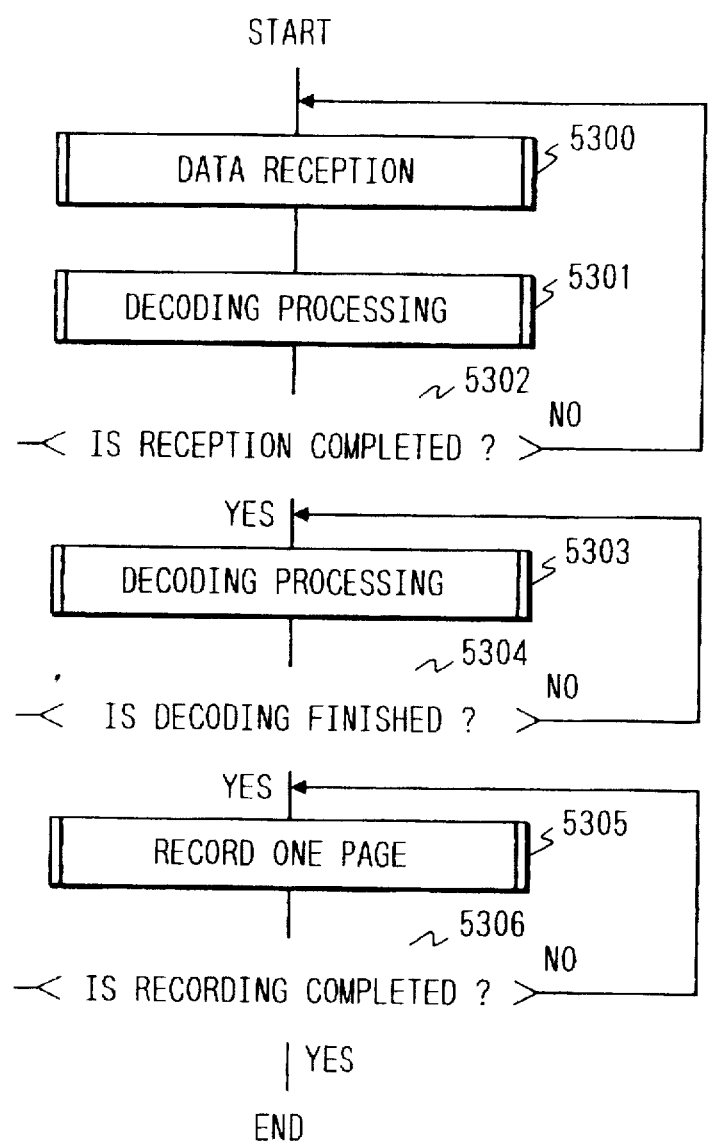
FIG. 4 is a flowchart for illustrating a receiving operation of the conventional facsimile system of FIG. 3.
Figure 5:
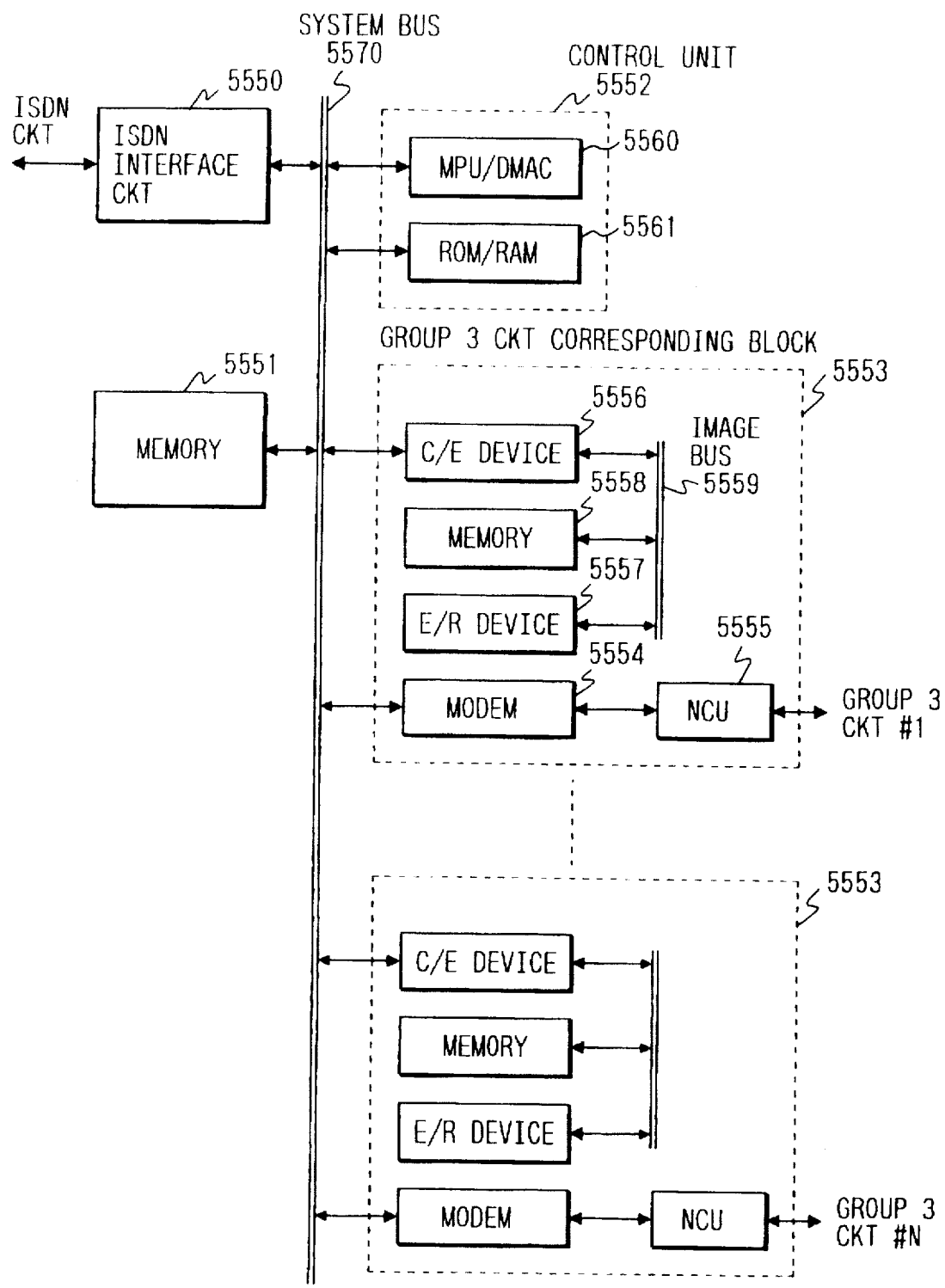
FIG. 5 is a schematic block diagram for illustrating the configuration of still another example of a conventional facsimile system.
Figure 6:
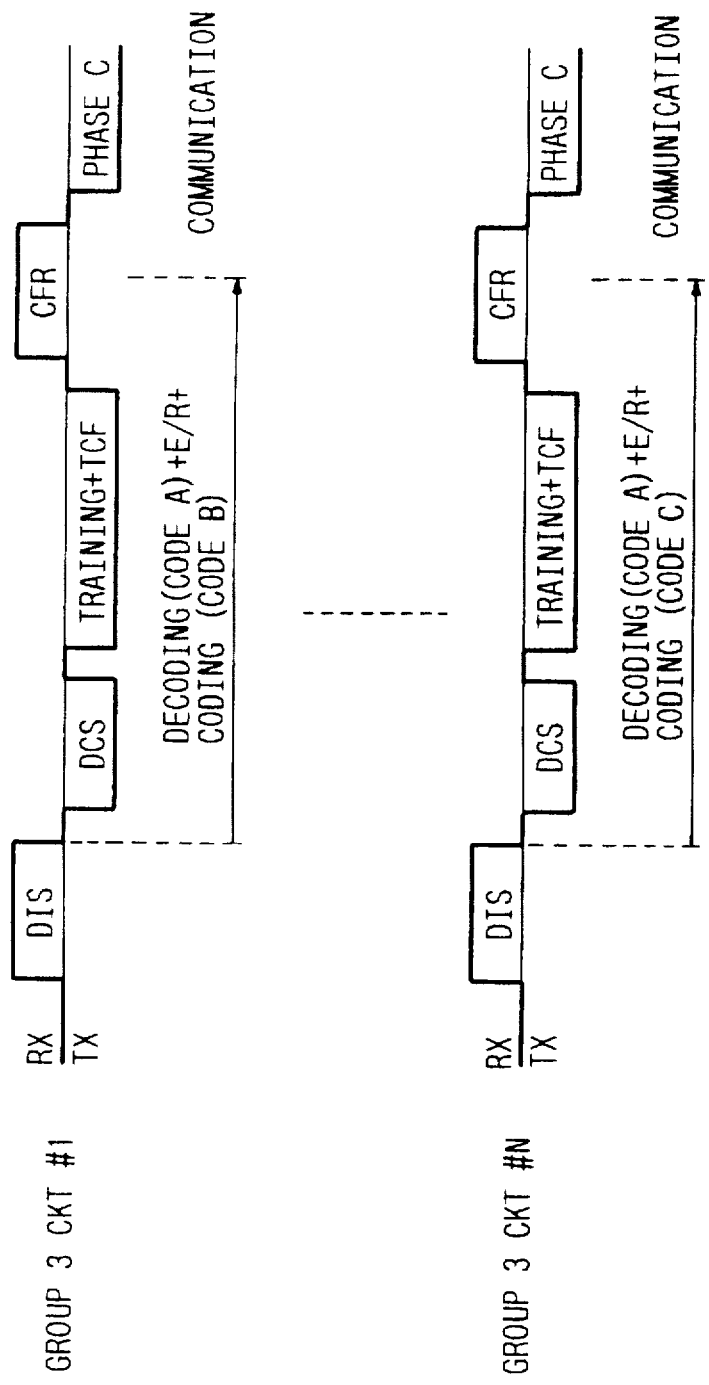
FIG. 6 is a flowchart for illustrating a communication sequence to be performed by the conventional facsimile system of FIG. 5.
Figure 7:
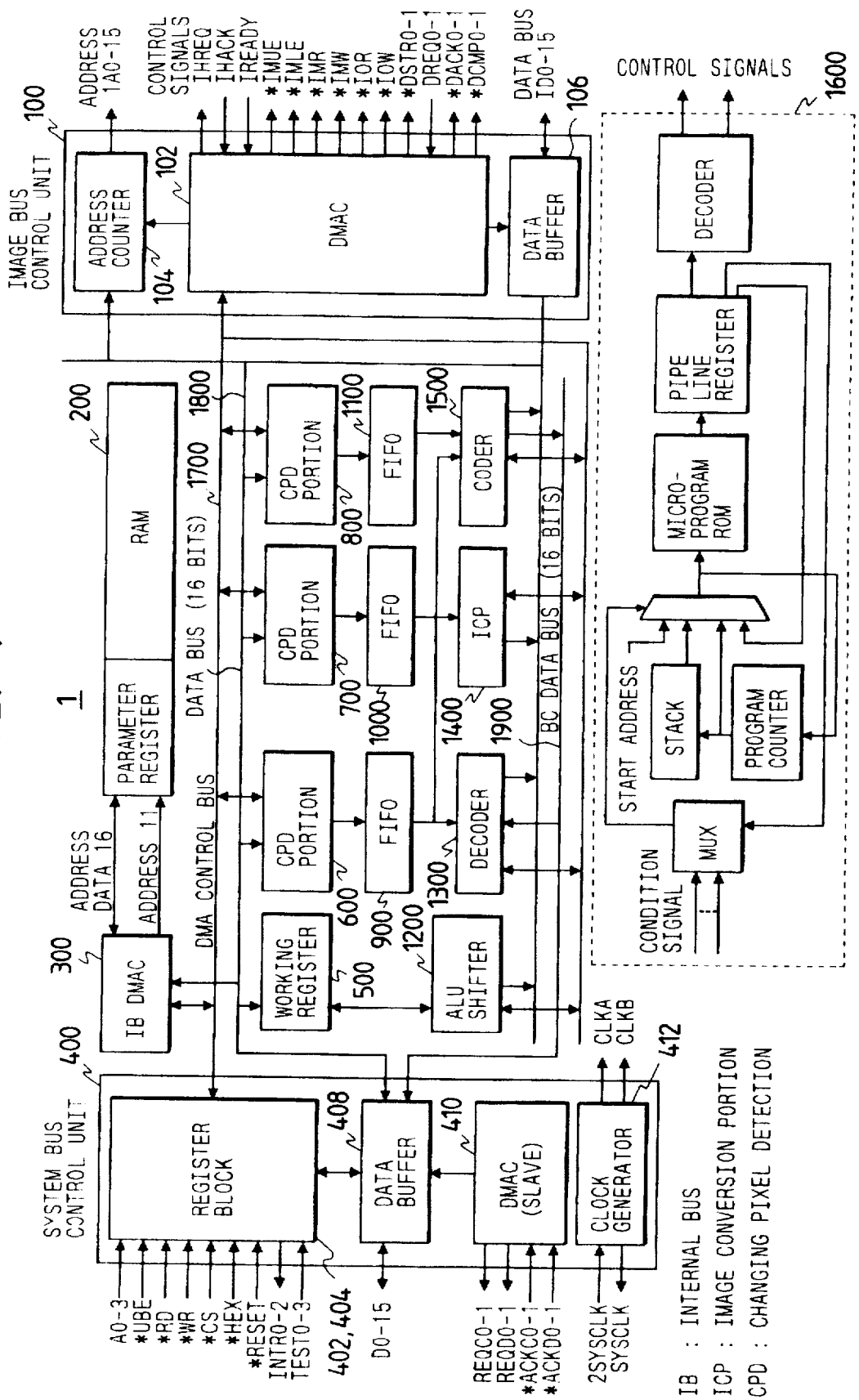
FIG. 7 is a schematic block diagram for illustrating the configuration of a compression/expansion device according to the present invention (namely, a first embodiment of the present invention)

FIG. 7 is a schematic block diagram for showing the configuration of a compression/expansion device according to the present invention (hereunder sometimes referred to as a first embodiment of the present invention). This compression/expansion device 1 is an image processing device having functions of a compression device, an expansion device, an image conversion (namely, enlargement/ reduction) device and a code conversion device.

1-1. Configuration of Facsimile System

Figure 8:
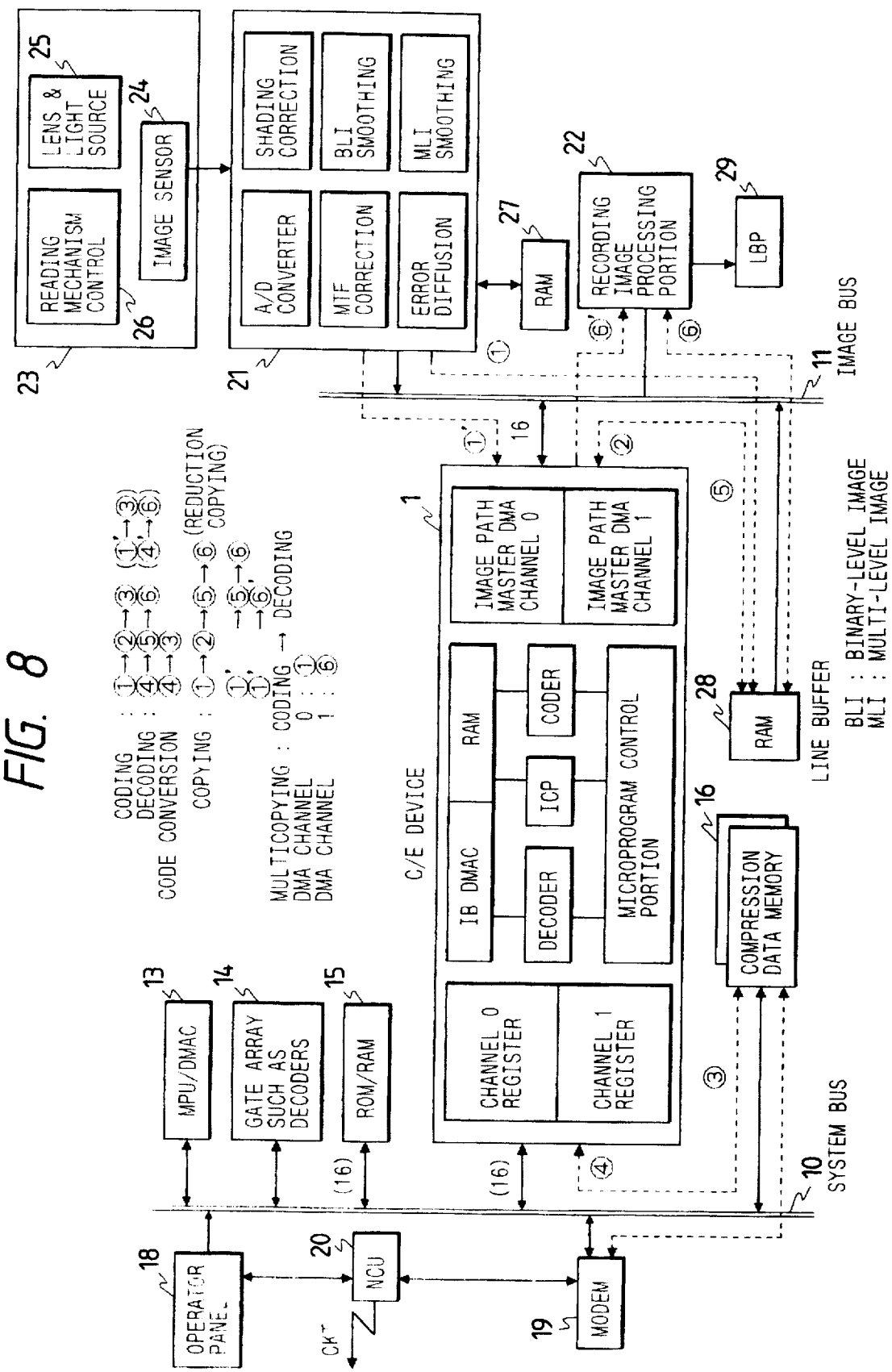
FIG. 8 is a schematic block diagram for illustrating the configuration of an example of a facsimile system employing the compression/expansion device according to the present invention as illustrated in FIG. 7.

FIG. 8 illustrates the configuration of an example of a facsimile system provided with this compression/expansion device 1. Incidentally, as shown in this figure, the compression/expansion device 1 is connected to both of a system bus 10 and an image bus 11.

As shown in this figure, a processor block 13 consisting of an MPU for controlling the entire facsimile system and the facsimile procedure and a DMA controller (DMAC), a peripheral circuit block 14 comprised of an gate array of address decoders or the like, a memory block 15 composed of a ROM and a RAM for storing control programs and data, a compression data memory 16 mainly used for storing compression data corresponding to an original image to be transmitted and to a received picture, an operator panel 18 consisting of switches and indicators used for operating the facsimile system, and a modem 19 for modulating and demodulating signals inputted from and outputted to circuits are provided on or connected to the system bus 10. Reference numeral 20 is a network control unit (NCU), through which the facsimile system is connected to a public telephone network.

On the other hand, a read-image processing portion 21, a recording image processing portion 22 and a RAM 28 are provided on or connected to the image bus 11. This RAM 28 serves as a line buffer to be used for image data input/output operation of the compression/expansion device 1. Further, a memory capacity of this RAM should be sufficient to store image data of several lines.

The read-image processing portion 21 is used for processing of an analog image signal inputted from an image scanner 23 and inputting of a resultant signal to the image bus 11. Further, the read-image processing portion 21 is provided with a RAM 27 serving as a working memory. An example of processing to be performed on an analog image signal by the read-image processing portion 21 is an analog-to-digital (A/D) conversion. Further, examples of processing to be performed on a digital image signal by the read-image processing portion 21 are a shading correction, a modulation transfer function (MTF) correction (namely, an edge or image enhancement), a binary-level image smoothing, a multi-level image smoothing, an error diffusion or distribution (namely, what is called a half-tone processing).

The image scanner 23 is used to scan the page of an original picture being sent (hereunder sometimes referred to as an original document) and to read image information from the scanned page. Further, as shown in FIG. 8, the image scanner 23 consists of a charge-coupled device (CCD) image sensor 24, a lens/light source portion 25 for illuminating the page and forming an optical image on a CCD image sensor 24, and a reading mechanism control portion 26 for controlling a mechanism for feeding the original document in the secondary scanning direction. A recording image processing portion 22 inputs image data from the image bus 11 and then performs necessary processing (e.g., a resolution conversion) on the image data. Thereafter, the recording image processing portion 22 gives the processed image data to a laser beam printer (LBP) 29 to print the image data.

1-2. Configuration of Entire Compression/Expansion Device

Next, the configuration of the entire compression/ expansion device 1 will be described hereinbelow by relating it with the configuration of the facsimile system of FIG. 8.

In FIG. 7, reference numeral 100 designates an image bus control unit for interfacing with the image bus 11; 200 a RAM, which is used as line memories and parameter registers for various internal processing and can be accessed by the MPU of a processor block of FIG. 8; 300 an internal-bus DMA control portion for controlling a DMA transfer to a RAM 200 through an internal data bus (hereunder sometimes referred to as a BE data bus) 1700; 400 an system bus control unit for interfacing with the MPU of FIG. 8; 500 a working register to be used as various registers; 600 to 800 a changing pixel detection portions each for detecting a changing pixel address at which the color (including black and white) represented by 16-bit image data changes; 900 to 1100 first-in first-out (FIFO) buffers; 1200 an arithmetic and logic unit (ALU); 1300 a decoder for decoding MH (Modified Huffman code)/MR (Modified Read code)/MMR (Modified Modified Read code); 1400 an image conversion portion for performing an image conversion (namely, enlargement/reduction) of an image represented by image data in the main scanning direction; 1500 a coder (or encoder) for generating MH/MR/MMR; and 1600 a microprogram control portion for controlling operations of the decode, the coder, the image conversion portion and so on.

Incidentally, the changing-pixel detection portions 600 to 800 and FIFO buffers 900 to 1100 may be included in corresponding processing blocks 1300 to 1500. Additionally, in such a case, devices, which are the same as the changing pixel detection portion 600 and the FIFO buffer 900, should be added to the system because the portion 600 and the buffer 900 are used in common by the blocks 1300 and 1500.

Reference numeral 1700 denotes a DMA control bus consisting of DMA transfer request signal lines and DMA transfer permission signal lines connected to various portions; 1800 a 16-bit internal data bus (hereunder sometimes referred to as a BE data bus) mainly used to transfer image data; and 1900 a 16-bit internal data bus (hereunder sometimes referred to as a BC data bus) mainly used to transfer code data.

Figure 12:
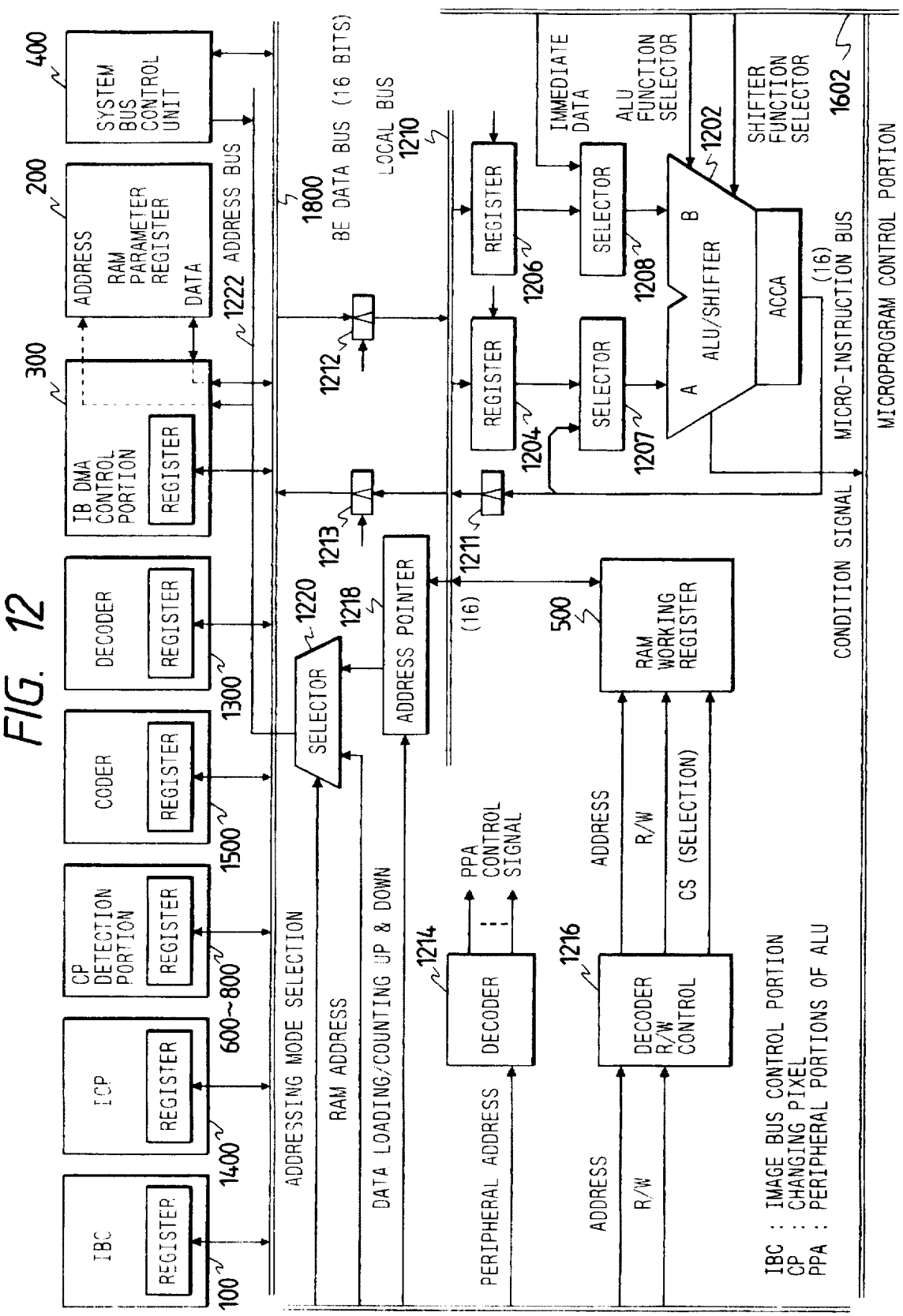
FIG. 12 is a schematic block diagram for illustrating the configurations of an arithmetic and logic unit and peripheral devices.

Incidentally, a microprogram control bus (not shown in FIG. 7) is provided between the microprogram control portion 1600 and each portion of the compression/expansion device (see, for instance, FIG. 12).

1-3. Configuration of Coder

Figure 9:
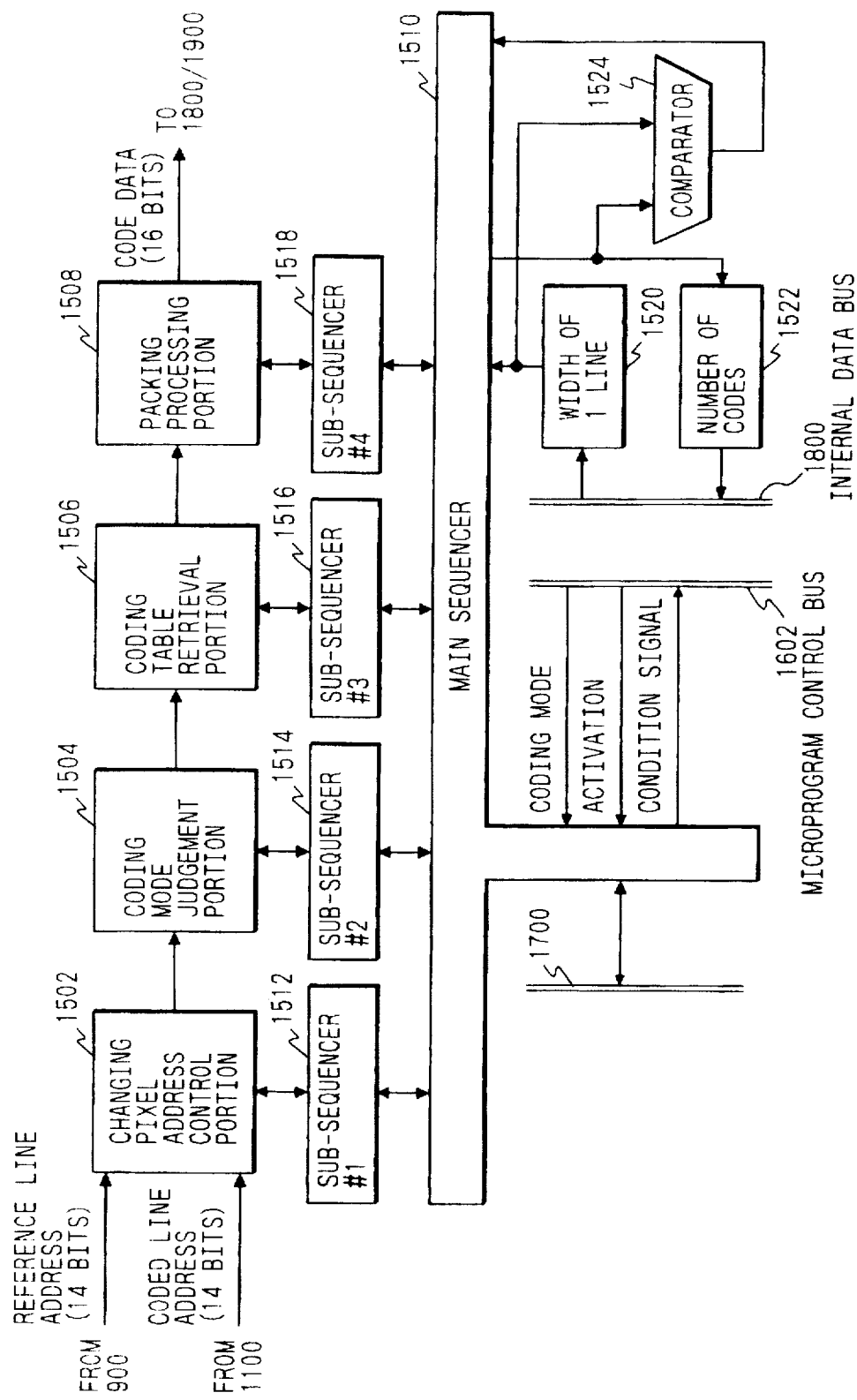
FIG. 9 is a schematic block diagram for illustrating the configuration of a coder or encoding circuit.

FIG. 9 is a schematic block diagram for illustrating the configuration of the coder 1500. As is seen from this figure, a changing pixel address control portion 1502 receives the changing pixel address of a reference line and that of a coded line from the FIFO buffer 900 and the FIFO buffer 900, respectively. Then, the changing pixel address control portion 1502 puts the received addresses in order and subsequently inputs them to a coding mode judgement portion 1504.

This coding mode judgement portion 1504 determines a coding mode (namely, one of path, vertical and horizontal modes) from inputted changing pixel address information. A coding table retrieval portion 1506 retrieves a coding table thereof on the basis of a result of the judgement on the coding mode and effects an assignment of a code.

Further, a packing processing portion 1508 performs a conversion (namely, what is called a word packing) of a variable length code outputted from the coding-table retrieval portion 1506 to 16-bit code data, each word of which has 16 bits. Then, the packing processing portion 1508 outputs the code data to the internal data bus 1800 or 1900 in word units. In FIG. 9, reference numeral 1510 denotes a main sequencer for controlling the entire coder 1500, which sequencer issues a DMA transfer request to the internal RAM 200; and 1512 to 1518 sub-sequencers for controlling the corresponding processing portions 1502 to 1508 under the control of the main sequencer 1510.

The coder 1500 has a register 1520, in which data representing the width of one line (namely, the number of words of image data corresponding to one line) is set, and a counter 1522 for counting the number of codes of one line (namely, the number of words of code data of one line). A value indicated by this counter 1522 can be outputted to the internal data bus 1800.

In FIG. 9, reference numeral 1524 designates a comparator provided in association with MG3-coding, namely, generation of MG3 codes (to be described later) for comparing the value indicated by the register 1520 with that indicated by the counter 1800. An output of the comparator 1524 representing the result of the comparison is reflected by a condition signal on a microprogram control portion 1602. The microprogram control portion 1600 can indicate a coding mode to the coder 1500 and control activation thereof and obtain a signal representing the state or condition of the coder 1500 through a microprogram control bus 1602.

1-4. Configuration of Decoder

Figure 10:
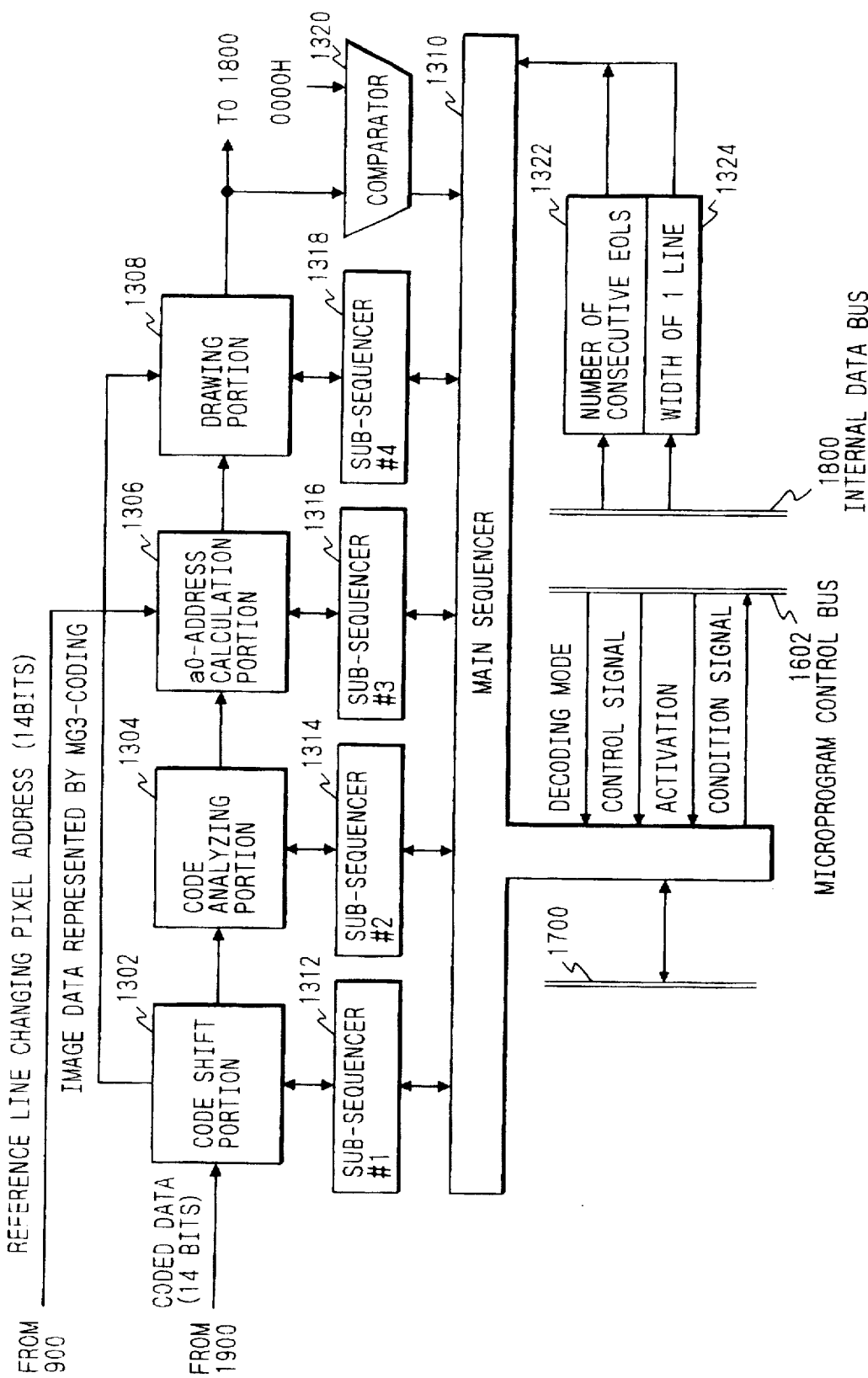
FIG. 10 is a schematic block diagram for illustrating the configuration of a decoder or decoding circuit.

FIG. 10 is a schematic block diagram for illustrating the configuration of the decoder 1300. As shown in this figure, a code shift portion 1302 shifts code data received from the internal data bus (namely, the BC data bus) 1900 by the length of decoded codes and supplies code data, which is not decoded, to a code analyzing portion 1304 at all times. The code analyzing portion 1304 retrieves a decoding ROM thereof on the basis of the code data and thereafter sends decoded codes to a drawing portion 1308. Incidentally, in case where an extended code obtained by the MG3-coding is detected, input image data is transferred from the code shift portion 1302 to the drawing portion 1308 as illustrated in FIG. 10.

In the instant application, the MG3-coding is defined as follows. First, original image data of one line is coded, namely, converted into facsimile standard code data (namely, MH, MR or MMR code). If the length of code data corresponding to one line exceeds that of the original image data (or the total length of the original image data and an extended code), data obtained by adding the extended code (represented by ten odd bits) to the original image data is outputted as coded output data. The MG3-coding is described more practically in the specification and drawings of the Japanese Patent Application No. H3-2669.

An a0-address calculation portion 1306 calculates a start address (namely, leading address) of a coded line or the address of a reference changing pixel a0 (see CCITT Recommendation T. 4) from changing pixel address information of a reference line, which information is inputted from the FIFO buffer 900, and from decoded code inputted from the code analyzing portion 1304. Further, the drawing portion generated image data from the address of the changing pixel a0 (hereunder sometimes referred to simply as an a0-address) and outputs the generated image data to the internal data bus (the BE data bus) 1800 in word (namely, 16 bits) units.

In FIG. 10, reference numeral 1310 denotes a main sequencer for controlling the entire decoder 1300; 1312 to 1318 sub-sequencers for controlling the corresponding function blocks 1302 to 1318 under the control of the main sequencer 1310. Incidentally, a DMA transfer request is outputted by the main sequencer 1310.

The decoder 1300 is provided with a comparator 1320 for detecting "white data" (namely, a word, each bit of which represents white) from the restored image data, and registers 1322 and 1324 in which data representing the number of consecutive EOL (end of line) and the width of one line (namely, the number of codes of one line) are set through the internal data bus (the BE data bus) 1800. Further, the main sequencer judges whether or not a line is a "white line" (namely, whether or not all bits of the line represent white pixels) and outputs a signal indicating a result of this judgement to the microprogram control bus 1602 as a condition signal.

Moreover, decoded data corresponding to each line is checked by the main sequencer 1310 to detect a decoding error. The microprogram control portion 1600 can indicate a decoding mode to the decoder 1300 and control the activation thereof and monitor the state thereof through the microprogram control bus 1602.

1-5. Configuration of Image Conversion Portion

Figure 11:
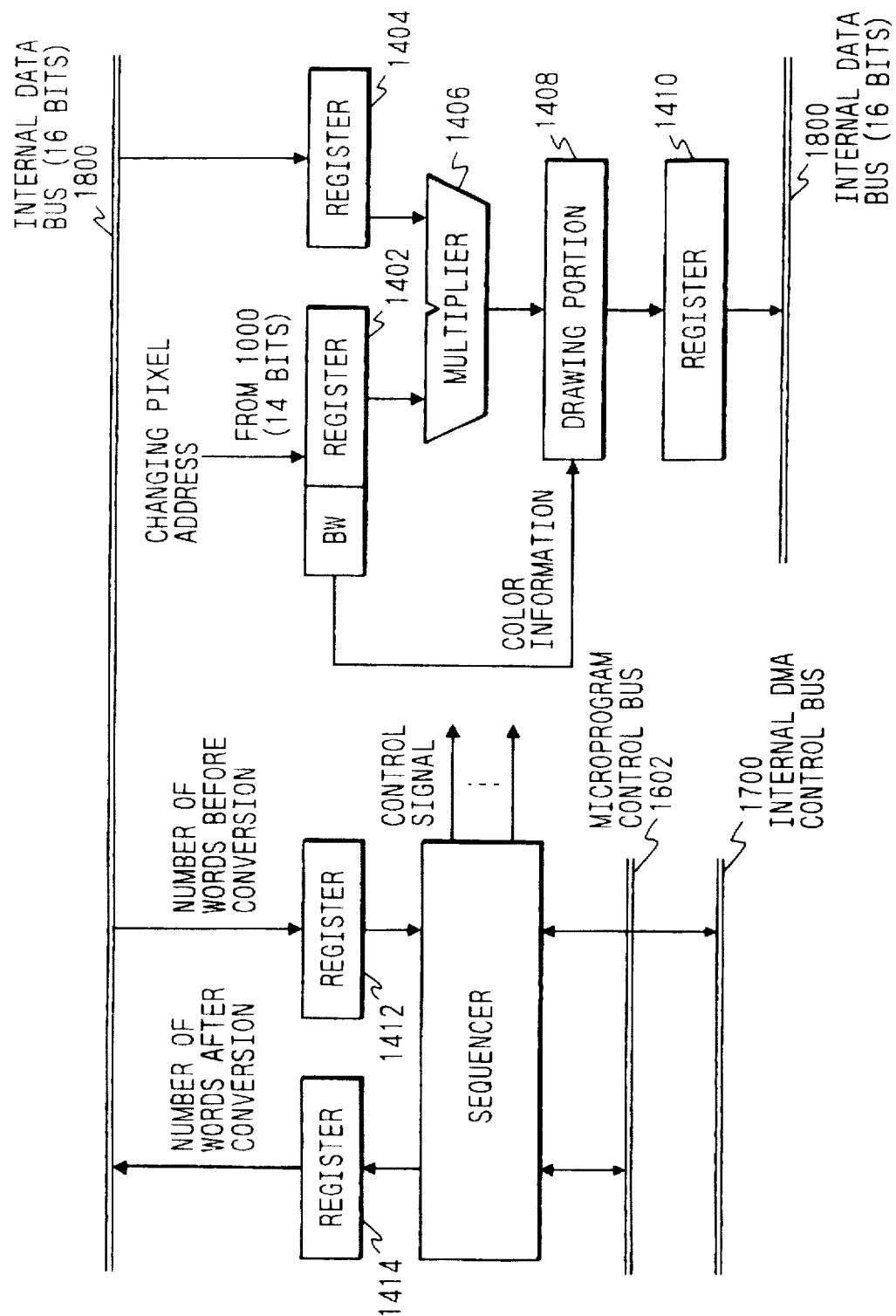
FIG. 11 is a schematic block diagram for illustrating the configuration of an image conversion portion.

FIG. 11 is a schematic block diagram for illustrating the configuration of the image conversion portion 1400. As is seen from this figure, a register 1402 holds a changing pixel address (14 bits) and color information (black (B)/white (W)) inputted from the FIFO buffer 1000. Further, an enlargement/reduction ratio (namely, a scaling ratio) is set in a register 1404 through the internal data bus (BE data bus). Furthermore, by multiplying the changing pixel address by the scaling ratio, the a multiplier 1406 calculates a changing pixel address to be obtained as a result of the enlargement/ reduction. Then, the multiplier 1406 supplies the calculated changing pixel address to a drawing portion 1408.

The drawing portion 1408 generates image data to be obtained as the result of the enlargement/reduction, on the basis of the received changing pixel address and the color information supplied from the register 1402. This image data is outputted to the internal data bus (namely, the BE data bus) through a register 1410 in word units. In FIG. 11, reference numeral 1412 represents a register, in which data indicating the width of one line (namely, the number of words corresponding to one line) before the conversion is set through the internal data bus 1800; 1414 a register for counting the number of words of one line (namely, the width of one line) after the conversion; and 1416 a sequencer for controlling each part of the image conversion portion 1400 and issuing a DMA transfer request.

1-6. Configuration of ALU and Working Register

FIG. 12 illustrates the configurations of the arithmetic and logic unit (ALU) 1200, the working register (RAM) 500 and their peripheral portions and the connections among this function block and other function blocks. In this figure, reference numeral 1202 denotes a 16-bit ALU (including a shifter) which is a primary part of the ALU 1200.

As is apparent from this figure, data received from the RAM 200 and forth is loaded into the ALU 1202 and necessary operations are effected in the ALU 1202. Results of the operations can be written to the RAM 200. Further, the registers provided in the RAM 500 can be operated and checked through the ALU 1202.

In FIG. 12, reference numerals 1204 and 1206 designate input registers for the ALU 1202; 1207 and 1208 selectors for selecting data to be inputted to the ALU 1202; 1210 a local bus for transferring data related to the ALU 1200; 1211 an output buffer for holding data to be outputted to the local bus 1210; 1212 and 1213 buffers used for transferring data between the local bus 1210 and the internal data bus (namely, the BE data bus) 1800; 1214 a decoder for decoding addresses of peripheral portions (hereunder sometimes referred to as peripheral addresses) on or connected to the microprogram control bus 1602 and outputting control signals to the peripheral portions of the ALU 1202; 1216 a read/write (R/W) control circuit (namely, a decoder) for controlling read/write operations of the working register 500; 1218 an address pointer device (namely, a counter) to be controlled by the microprogram control portion 1600; and 1220 a selector for selecting a value indicated by the address pointer device 1218 or an address given by the microprogram control bus 1602 and outputting the selected value or address to an address bus 1222.

1-7. Configurations of Microprogram Control Portion and System Bus Control Unit

Figure 13:
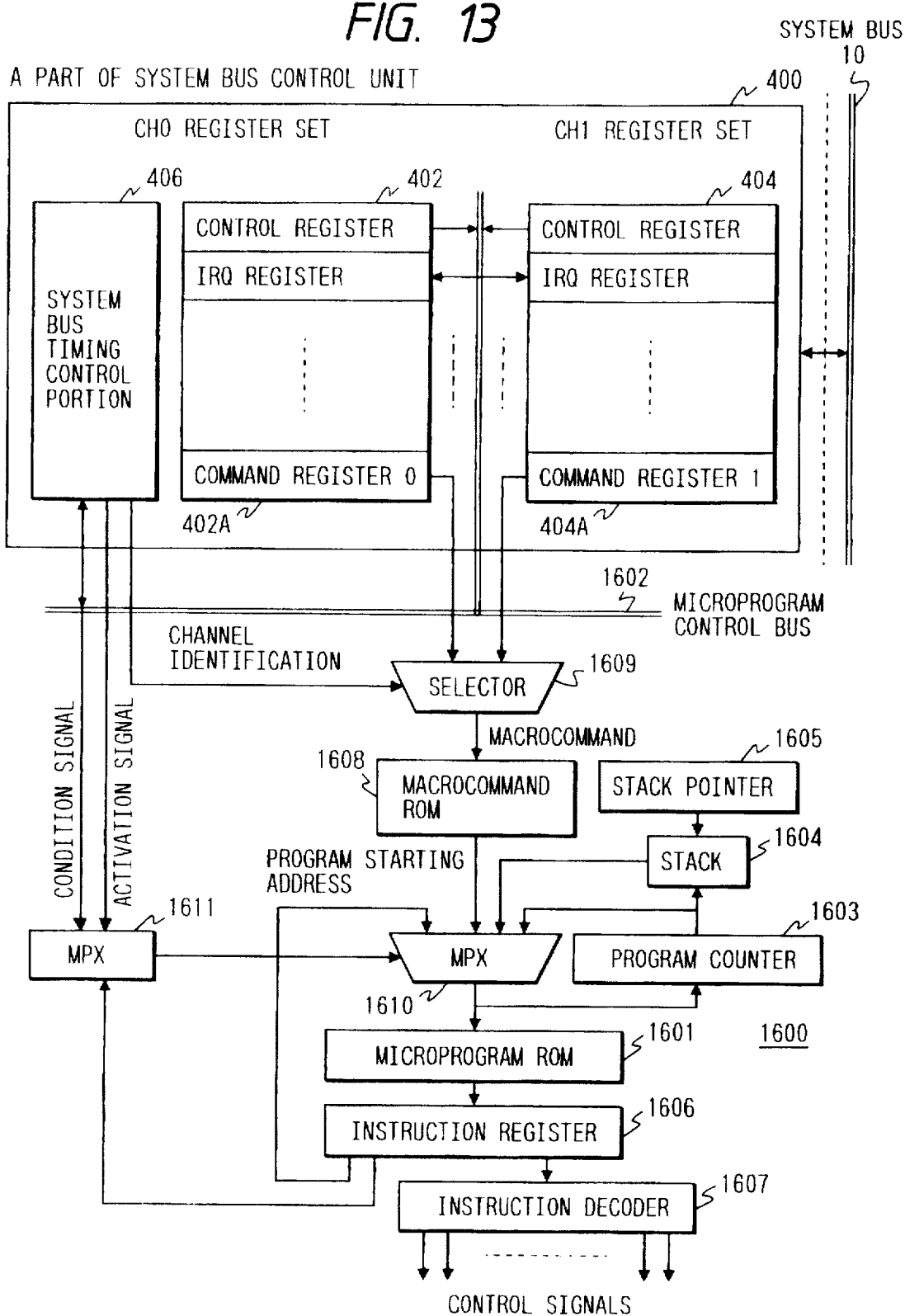
FIG. 13 is a schematic block diagram for illustrating the configurations of a microprogram control portion and a system bus control portion.

FIG. 13 is a diagram for illustrating the configurations of the microprogram control portion 1600 and the system bus control unit 400.

This compression/expansion device 1 (namely, the first embodiment) has two channels (namely, Channel 0 and Channel 1) as a coding channel and a decoding channel and can perform various processing such as a coding and a decoding by changing a channel to be used at the time of processing of data of each line. To facilitate such a processing, a register set 402 for Channel 0 (CH0) and a register set 404 for Channel 1 (CH1) are provided in the system bus unit 400. Moreover, the system bus control unit 400 is provided with a system bus timing control portion 406, a data buffer 408, a DMA controller 410 and a clock generator 412 as illustrated in FIG. 7.

The microprogram control portion 15600 has a general purpose configuration and is provided with a microprogram ROM 1601 for storing microprograms used to execute various commands, a program counter 1603, a stack 1604, a stack pointer device 1605, an instruction register 1606 and an instruction decoder 1607.

The microprogram control portion 1600 is further provided with a macrocommand ROM 1608 for storing a start address of a microprogram used to execute each macrocommand, a selector 1609 used for inputting macrocommands set in command registers of the register sets 402 and 404, a multiplexer 1610 for changing an input to the microprogram ROM 1601, and a multiplexer 1611 for inputting a condition signal from the microprogram control bus 1602 and an activation signal from the system bus control unit 400 to the multiplexer 1610 as control signals.

1-8. How to Use Internal RAM

Figure 14:
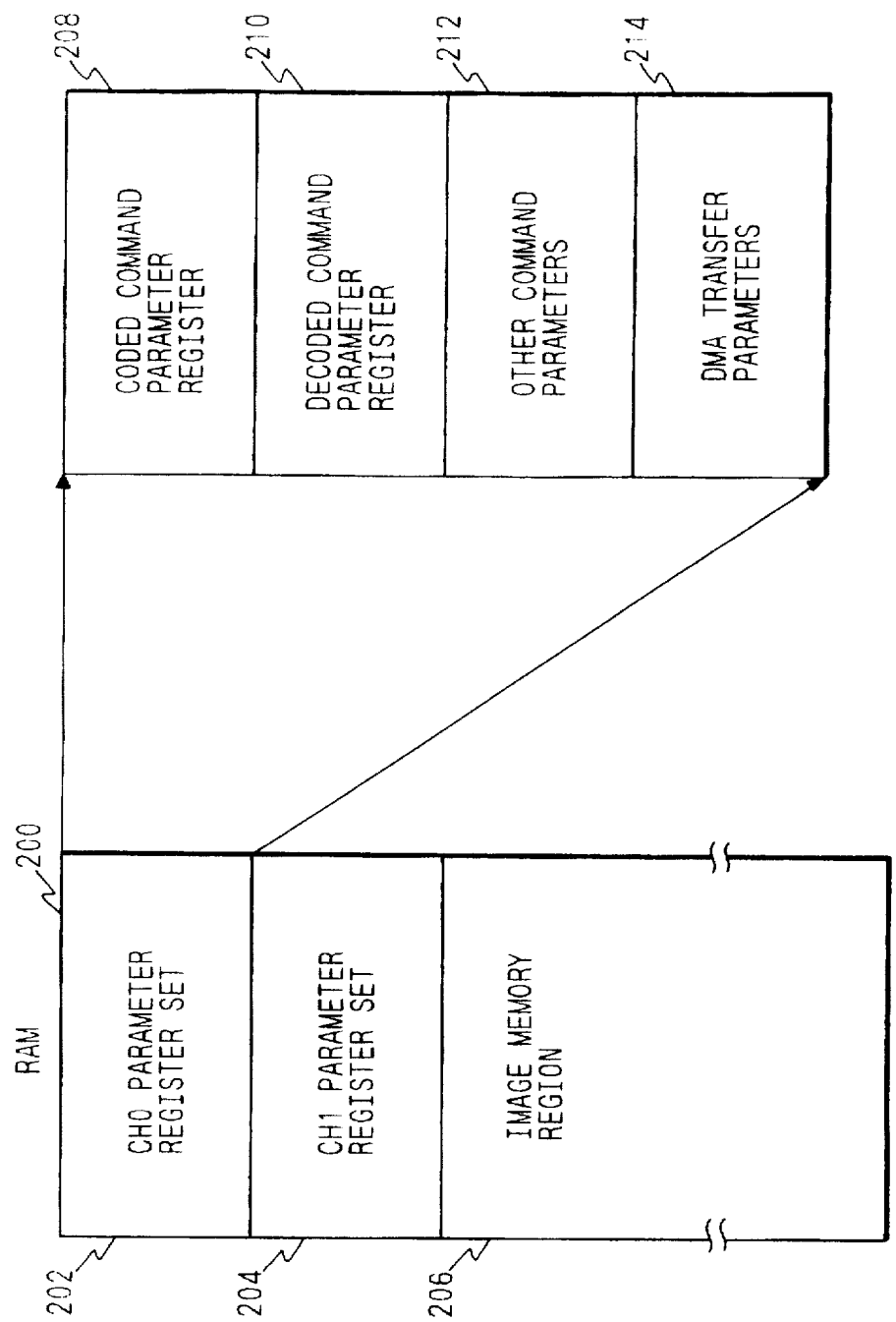
FIG. 14 is a diagram for illustrating how to use an internal RAM.

FIG. 14 illustrates how to use RAM 200. Further, a linear address space of the RAM 200 is divided into a region 201 including a parameter register set for Channel 0 (CH0), and another region 204 including a parameter register set for Channel 1 (CH1) and an image memory region 206. Moreover, each of the regions 202 and 204 is divided or partitioned into parameter register areas 208 to 214 for storing coding commands, decoding commands and other commands and DMA commands.

The image memory region 206 is further divided into a plurality of line memories for storing data according to the contents of a processing, as will be described later by referring to FIGS. 16 and 18.

1-9. Configuration of Image Bus Control Unit

Figure 15:
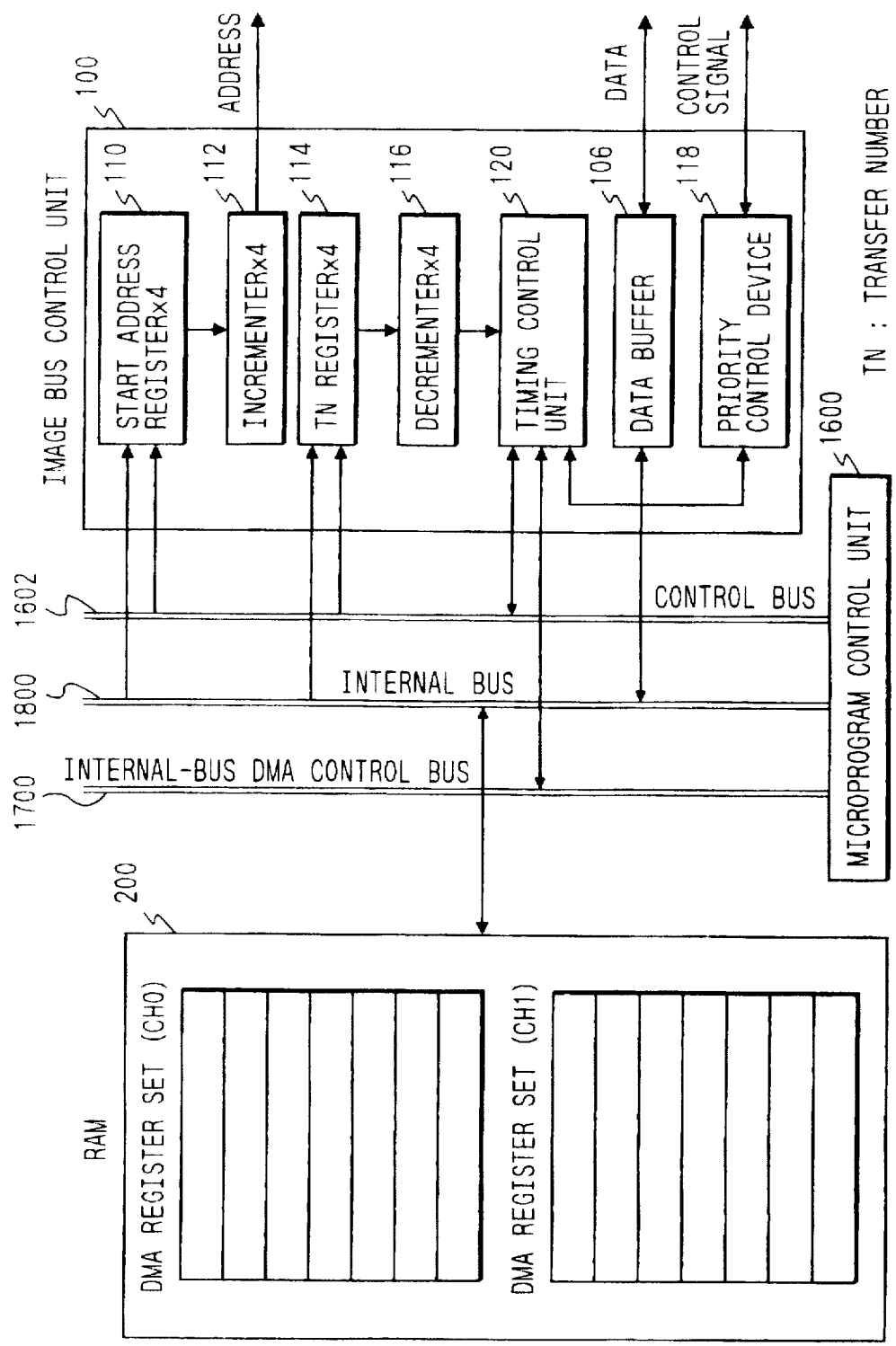
FIG. 15 is a schematic block diagram for illustrating the configuration of an image bus control portion.

FIG. 15 is a schematic block diagram for illustrating the configuration of the image bus control unit 100. The image bus control unit 100 is provided with the DMA controller 102, the address counter 104 and the data buffer 106 to be used for controlling a DMA transfer of image data. The following four kinds of DMA transfers of image data can be realized under the control of this image bus control unit 100. Namely, (a) Transfer of data from input/output (I/O) device (namely, read-image processing portion 21) on the image bus to a memory (namely, the RAM 28);

(b) Transfer of data from the memory (namely, the RAM 28) on the image bus to an I/O device (namely, the recording image processing portion 22);

(c) Transfer of data from the memory (namely, the RAM 28) on the image bus to the compression/expansion device 1; and (d) Transfer of data from the compression/expansion device 1 to the memory (namely, the RAM 28) on the image bus.

The address counter 104 consists of a set of four address registers 110 and a set of four incrementers 112 correspondingly to each DMA transfer. Similarly, the DMA controller 102 is provided with a set of four transfer number registers 116 and a set of four decrementers 116. Additionally, the DMA controller 102 is further provided with a priority control device 118 and a timing control portion 120, which are used for controlling the priority of a DMA transfer request.

1-10. Configuration of Line Memories and Address Register

Figure 16:
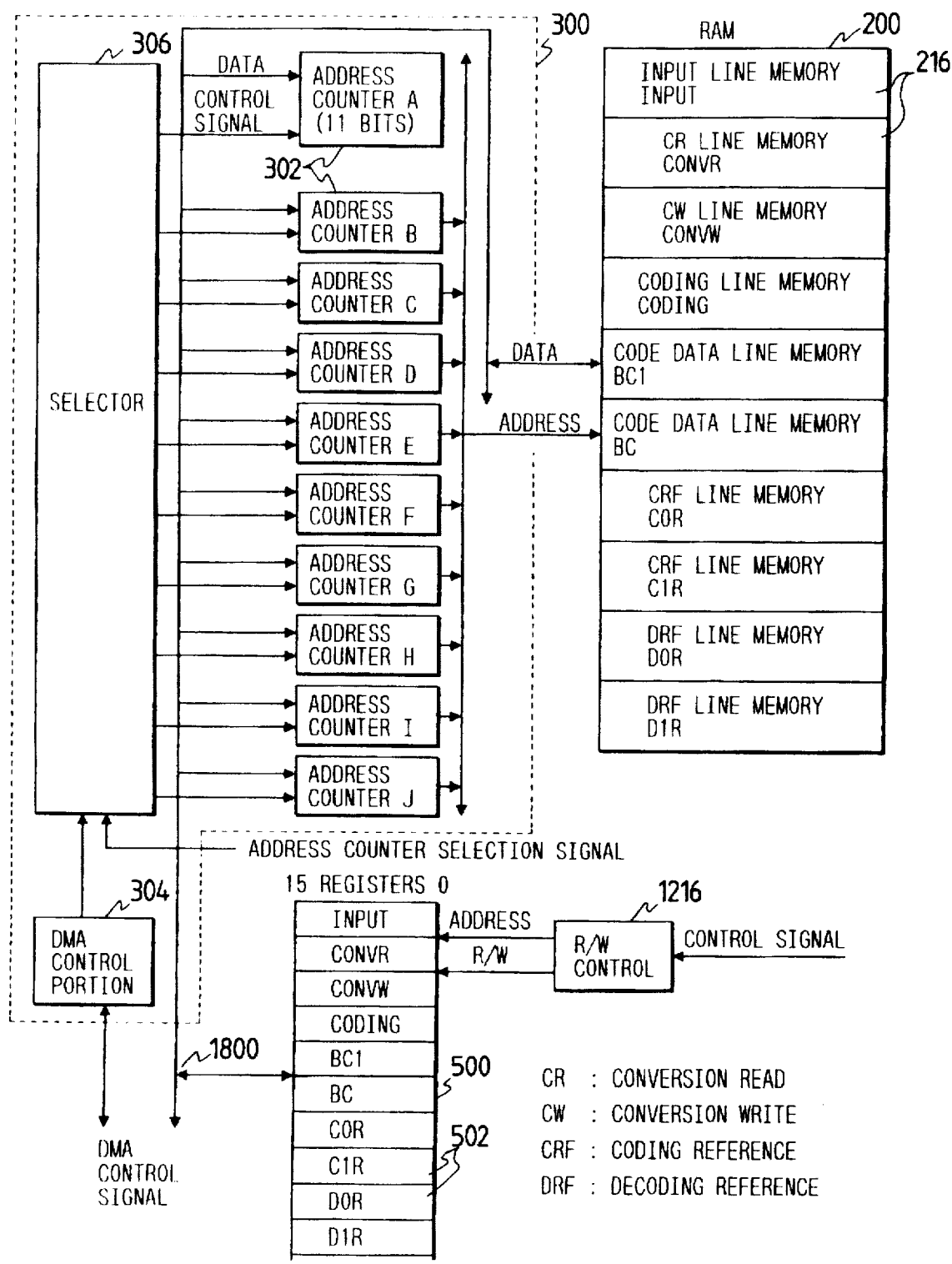
FIG. 16 is a diagram for illustrating the arrangement of line memories, address counters and address registers to be used for a coding command processing.
Figure 17:
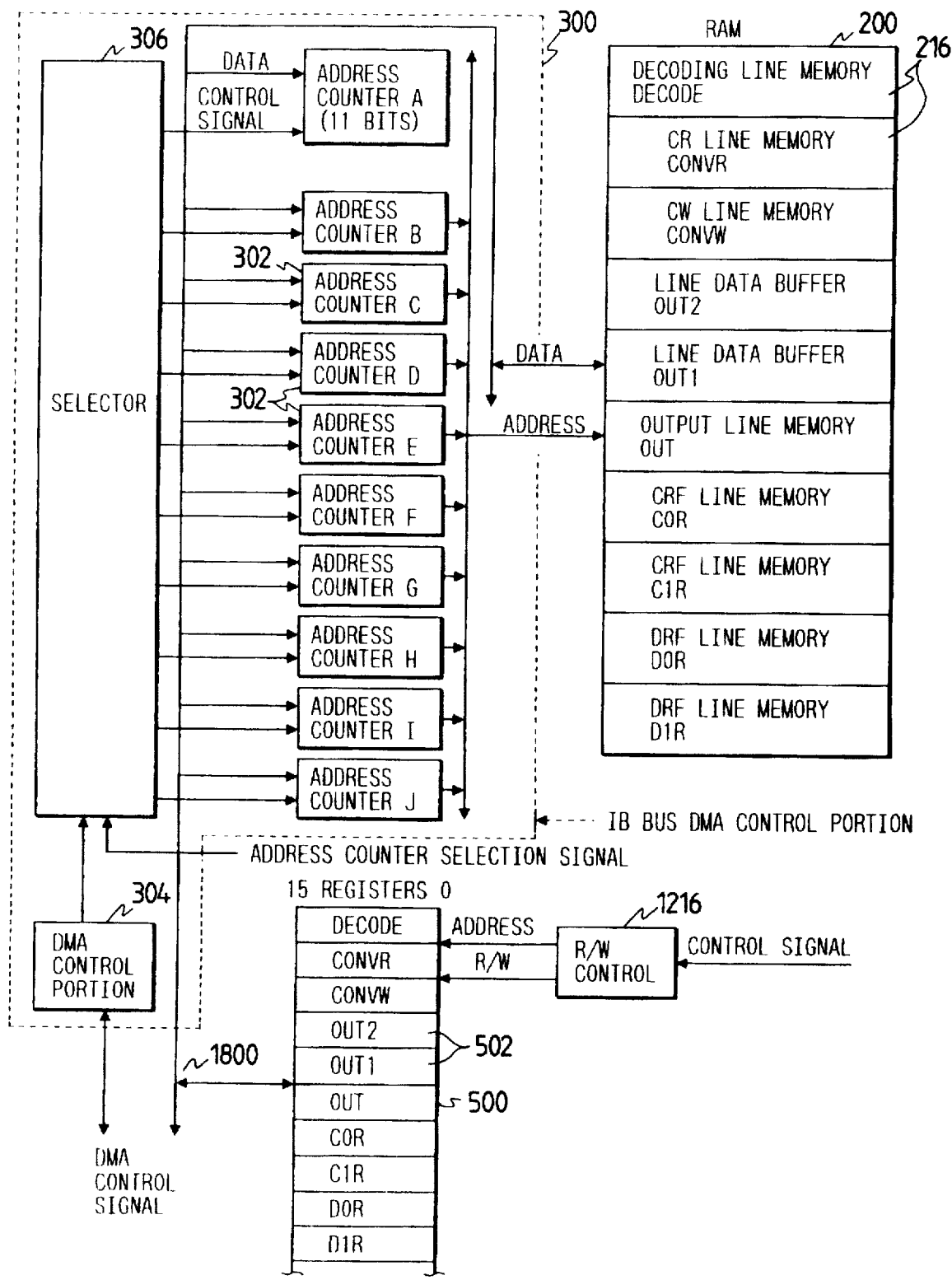
FIG. 17 is a diagram for illustrating the arrangement of line memories, address counters and address registers to be used for a decoding command processing.
Figure 18:
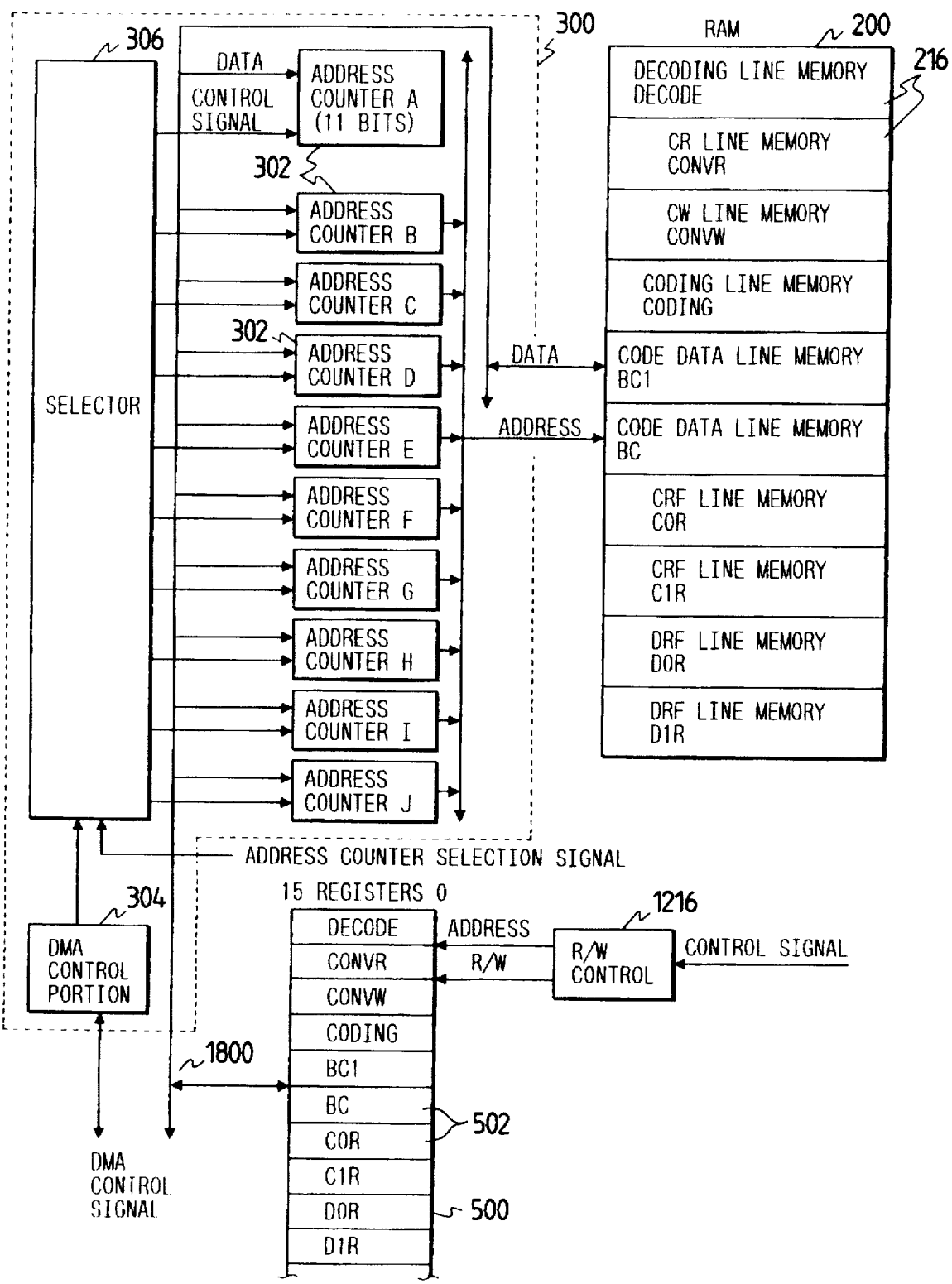
FIG. 18 is a diagram for illustrating the arrangement of line memories, address counters and address registers to be used for a code conversion processing.

FIGS. 16, 17 and 18 illustrate the internal structure of the internal bus DMA control portion 300, the contents of an address register 502 defined in the working register 500 by executing a microprogram and those of line memories defined in the image memory region 206 of the RAM 200, and the corresponding relation therebetween.

FIGS. 16, 17 and 18 illustrate a case of a coding command processing, a case of a decoding command processing, and a code conversion command processing, respectively. In the following description, when it is necessary to identify each of the address registers and the line memories, labels INPUT to D1R as indicated in FIGS. 16, 17 and 18.

The internal bus DMA control portion 300 is provided with address counters (A to J) 302, the number of which is equal to that of the line memories 216, a DAM control portion 304 for controlling DMA transfers among the processing blocks such as the RAM 200, the coder 1500 and the decoder 1300, and a selector 306 for selecting an address counter 302.

Further, the region of the line memories 216 of the RAM 200, the address counter 302 and the address register 502 correspond to one another biuniquely. There are line memories for a coding and a decoding of data of a reference line, which memories correspond to two channels. Thus an external MPU can easily cause the image processing unit 1 to operate as if there are two coders 1500 and two decorders 1300.

Figure 19:
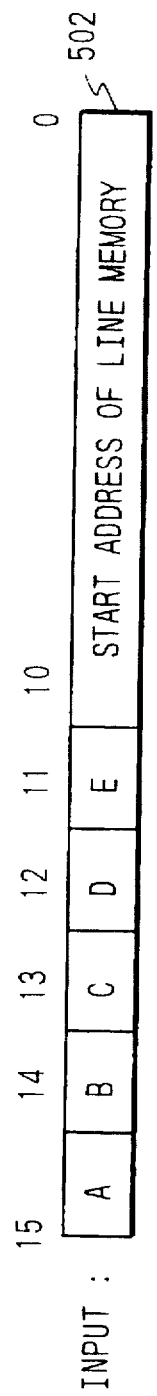
FIG. 19 is a diagram for illustrating the contents of an address register.

FIG. 19 illustrates the structure of the address register 502 defined in the working register 500. In this figure, INPUT address register 502 is illustrated by way of example. However, each of the other address registers 502 has a similar structure.

As illustrated in this figure, the lowest-order eleven bits of the address register 502 indicates a leading address of a line memory. The highest-order four bits (A to E) are flag bits, the meaning of which is as follows.

Namely, when the bit A is "1", this means that effective data is stored in a corresponding line memory.

When the bit B is "1", this means that the contents of a corresponding line memory is data representing an image to be reduced.

When the bit C is "1", this means that the contents of a corresponding line memory is the last-line data.

When the bit E is "1", this means that the contents of a corresponding line memory is data representing an image to be enlarged.

Incidentally, the meaning of the bit D changes with the address registers.

The ALU 1200 can operate and check these flag bits by executing microprograms.

1-11. Operation of Compression/Expansion Device

Hereinafter, an operation of the compression/expansion device 1 constructed as described hereinabove in case of being employed in the facsimile system of FIG. 8 will be described.

In the compression/expansion device 1, image data input/output paths are as follows:

(a) The read-image processing portion 21→the compression/expansion device 1;

(b) The read-image processing portion 21→the RAM 28→the compression/expansion device 1;

(c) The compression/expansion device 1→the recording image processing portion 22; and (d) The compression/expansion device 1→the RAM 28→the recording image processing portion 22.

The image bus control unit 100 of the compression/expansion device 1 supports such a DMA transfer of image data. Further, DMA channel 0 is used to transfer image data from the read-image processing portion 21 to the RAM 28. On the other hand, DMA channel 1 is used to transfer image data from the RAM 28 to the recording image processing portion 22 (see FIG. 7).

1-12. Description of Compression Operation

First, a compression operation will be outlined hereinbelow. Namely, the MPU of the processor block 13 of FIG. 7 indicates an operation by issuing a macrocommand to the compression/expansion device 1. The MPU first establishes various registers in the system bus control unit 400. This includes an indicating of coding channels CH0 and CH1.

Upon completion of the establishment of the registers, a coding command is written to a command register 402A or 404B of the system bus control unit 400 of FIG. 13 corresponding to an indicated channel. This command is sent through a selector 1609 to a macrocommand ROM which decodes the received command and outputs a signal indicating a start address of a coding program. The coding program stored from this start address in the microprogram ROM 1601 is executed. Each processing block of the compression/expansion device 1 is controlled by a program written to the microprogram ROM 1601.

FIG. 16 illustrates the line memory 216 and the address register 502 defined in case of a coding command processing as previously described. The contents or roles of the line memories are as follows:

Line memory INPUT stores image data of input lines (namely, serves as an input buffer);

Line memory CONVR stores image data of lines obtained before a main scanning conversion;

Line memory CONVW stores image data of lines obtained as a result of the main scanning conversion;

Line memory CODING stores image data of coded lines;

Line memory BC1 stores coded data (namely, serves as an output buffer;

Line memory BC stores coded data (namely, serves as an output buffer);

Line memory C0R stores image data of a reference line for the coding channel 0;

Line memory C1R stores image data of a reference line for the coding channel 1;

Line memory D0R stores image data of a reference line for the decoding channel 0; and Line memory D1R stores image data of a reference line for the decoding channel 1.

FIG. 16 shows an example of a flowchart of the coding program briefly. Hereinafter, a compression operation will be described by referring to this flowchart.

When a coding command is issued, data representing necessary parameters is loaded into the working register 500 from of parameter register set region 202 (corresponding to CH0) or 204 (corresponding to CH1) of the RAM 200 in step 2001. In the address register 502, the start address of a region of the line memory 216 having the same label is set.

Subsequently, in steps 2002 and 2003, a DMA transfer operation is effected when a request for a DMA transfer on the image bus 11 occurs (namely, a request for a data transfer from the read-image processing portion 21 to the RAM 28 and a request for a data transfer from the RAM 28 to the recording image processing portion 22). When a DMA transfer is performed, the microprogram sets a start address and the number of words to be transferred (hereunder sometimes referred to as a transfer word number) in the start address register 110 and the transfer number register 114 of the image bus control unit 100, respectively. Then, the microprogram activates the control unit and sets an activation flag as "1" (see FIG. 15). Thereafter, the image bus control unit 100 performs the DMA transfer.

Next, in step 2004, image data of one line is inputted from the RAM 28 serving as a line buffer on the image bus 11 to the line memory INPUT of the RAM 200 of the compression/expansion device 1.

Figure 23:
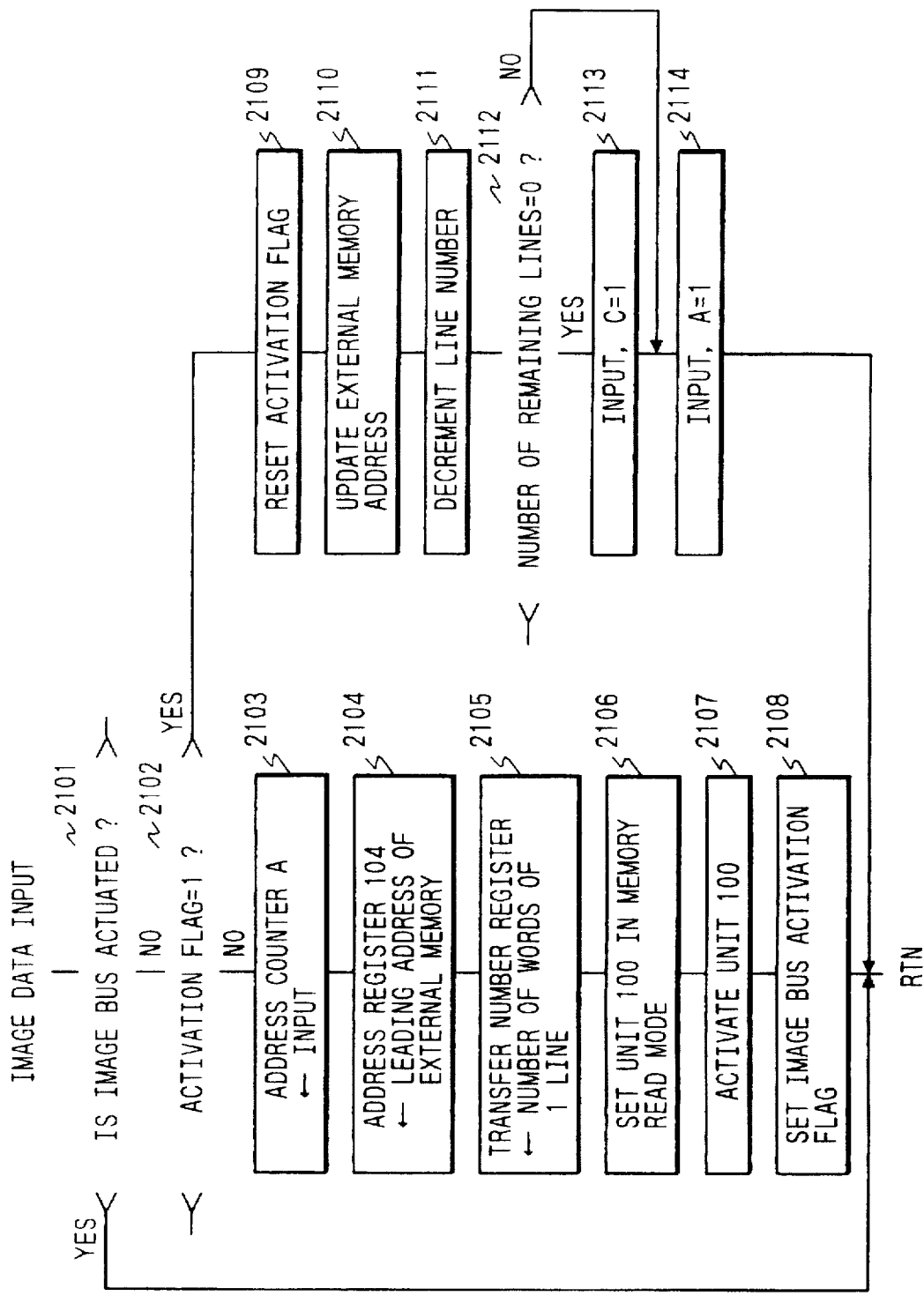
FIG. 23 is a flowchart for illustrating an image data input operation.

FIG. 23 illustrates a flowchart of a program for performing this image data input processing in step 2004. As shown in step FIG. 23, it is confirmed in steps 2101 and 2102 that the image bus control unit 100 is not operating (namely, is not actuated) and the activation flag of the image bus control unit 100 is reset. If confirmed, the leading address of the line memory INPUT is sent from the address register INPUT through the internal data bus 1800 to an address counter A (see FIG. 16) of the internal bus DMA control portion 300 and is set therein in step 2103. Subsequently, an address of the external RAM 28 is set in one of the address registers 104 of the image bus control unit 100 in step 2104 (see FIG. 15).

Here, it is assumed that image data is inputted through the path (b) (namely, the read-image processing portion 21→the RAM 28→the compression/expansion device 1).

Next, in step 2105, data representing the number of words corresponding to one line is set in one of the transfer number register 114 (see FIG. 15) of the image bus control unit 100. Then, in step 2106, the image bus control unit 100 is set to be in a memory read mode. Subsequently, the image bus control unit 100 is activated in step 2107, and the activation flag is set as "1" in step 2108.

After the activation, a memory read address is incremented by the incrementer 112 each time the image bus control unit 100 reads data of one word. On the other hand, the decrementer 116 decrements the transfer word number.

The image data read by the image bus control unit 100 is transferred therefrom to the line memory INPUT of the RAM 200 through the internal data bus (namely, the BE bus). This transfer of image data is effected by issuing a DMA transfer request to the RAM 200 by the image bus control unit 100 and then transferring a control of the internal data bus 1800 from the DMA control portion 304 of the internal bus DMA control portion 300 to the image bus control unit 100. When image data of one word is transferred to the line memory INPUT, the address counter A of the internal bus DMA control portion 300 is incremented.

The foregoing operation is repeated until the transfer word number set in the image bus control unit 100 becomes 0. During the transfer of image data, the program returns quickly on the basis of judgement made in step 2101.

Upon completion of the transfer of image data of one line, it has come to the state that the image data of one line is stored in the line memory INPUT. Operations to be performed after the inputting of the image data of one line is effected in step 2109 and steps subsequent to step 2109.

In step 2109, the activation flag set in step 2108 is reset. Then, in step 2110, a leading address of a storage region of the external RAM 28, in which image data of the next line is stored. Then, in step 2111, the number of lines to be successively processed in accordance with the coding command is decremented and the number of the remaining lines is calculated. Then, it is determined in step 2112 from a result obtained in step 2111 whether or not the line corresponding to image data inputted immediately before that time is the last line. If so, the flag C of the address register INPUT is set as "1" in step 2113. Then, in step 2114, the flag A of the address register INPUT is set as "1". The state of each of the flags A and C is transferred to the following steps in a process of exchanging the contents of the address registers as will be described later.

Figure 20:
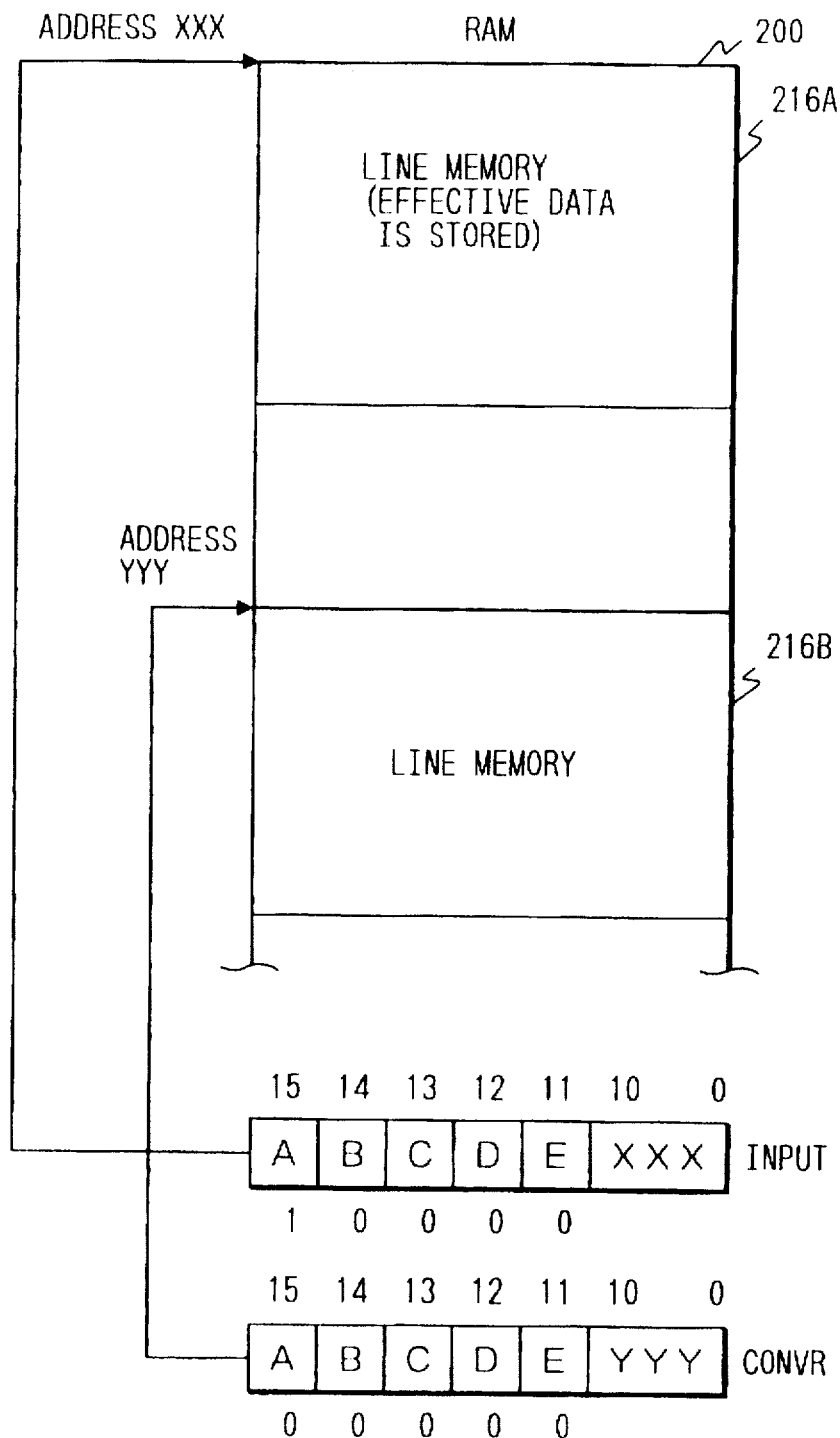
FIG. 20 is a diagram for showing the state of line memories of RAM before data is transferred between the line memories.

FIG. 20 illustrates a state of the line memory INPUT in which data of one line is stored. Incidentally, it is assumed that a memory region 216A from an address XXX is employed as the line memory INPUT. Upon completion of inputting of image data to the line memory INPUT, the flag A of the address register INPUT is set as "1". Thus, it turns out that effective data is stored in the line memory INPUT.

The address register CONVR indicates YYY. Further, the flag A is "0". Thus, it turns out that a memory region 216B from an address YYY is employed as the line memory CONVR and this memory region is empty.

Figure 22:
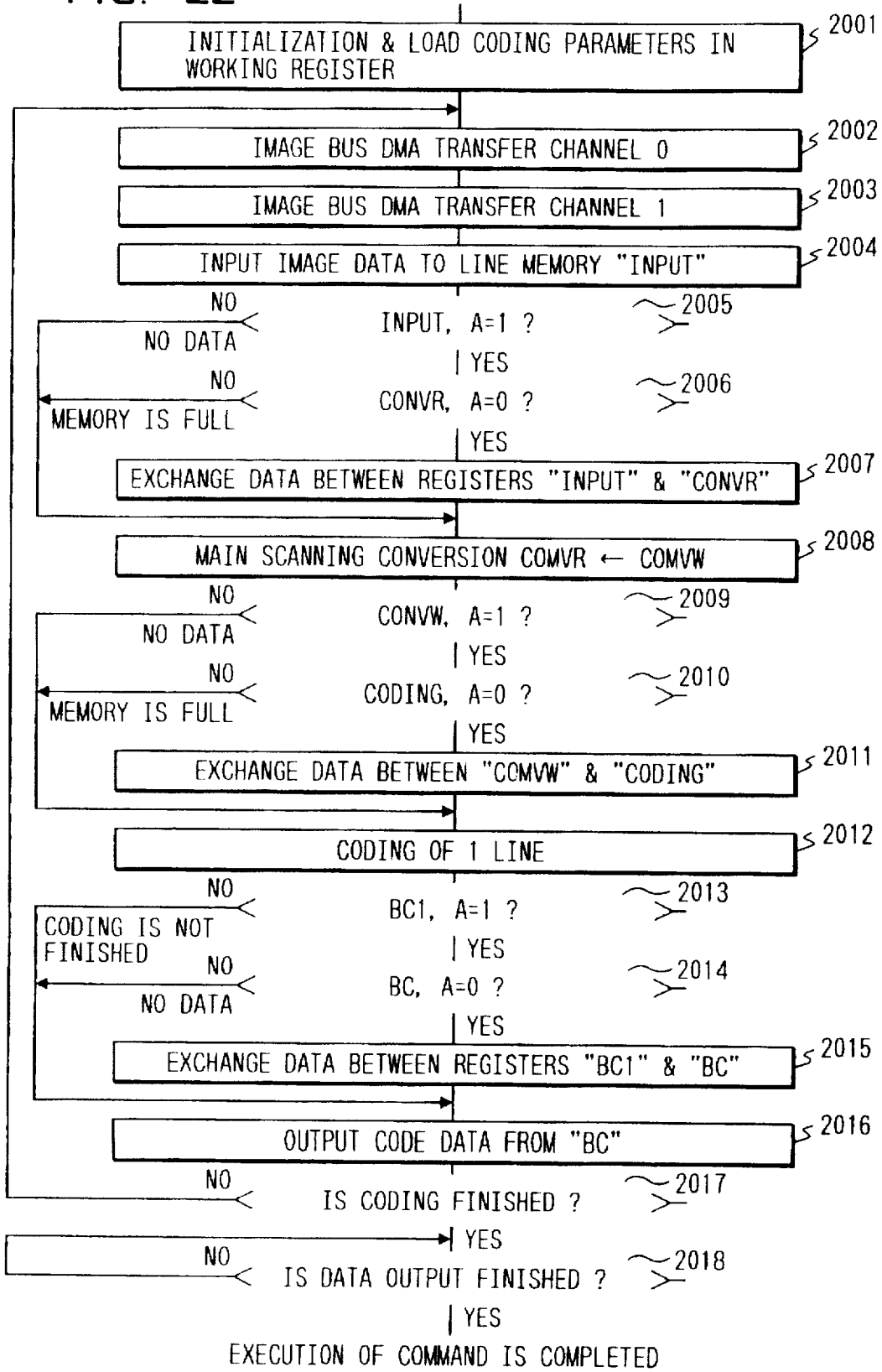
FIG. 22 is a flowchart for illustrating a compression operation.

Turning back to the flowchart of FIG. 22, the microprogram checks in step 2005 whether or not the flag A of the address register INPUT is 1. If so, it is further checked whether or not the flag A of the address register CONV is 0.

If the flags A of the address registers INPUT and CONVR are 1 and 0, respectively (namely, if effective data is stored in the line memory INPUT, and the line memory CONVR is empty), the contents of the address registers INPUT and CONVR are exchanged for each other in step 2007.

Figure 21:
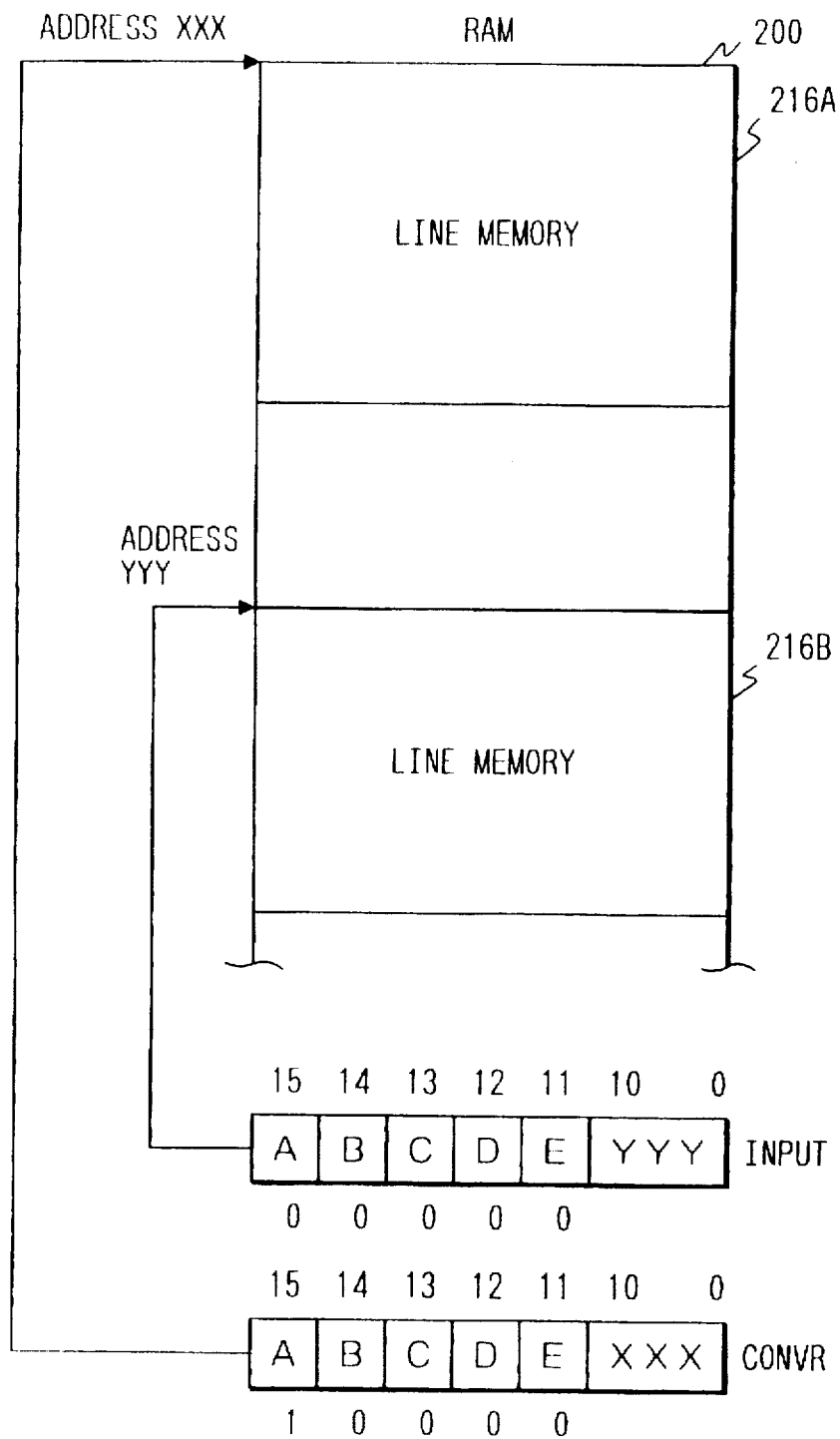
FIG. 21 is a diagram for showing the state of line memories of RAM after data is transferred between the line memories by exchanging the contents of address registers.

This exchange of data between the line memories INPUT and CONVR will be described hereinbelow by referring to FIGS. 20 and 21. FIG. 20 illustrates a state of these line memories before the processing is performed in step 2007. FIG. 21 illustrates a state of the line memories INPUT and CONVR after the contents thereof are exchanged. As shown in FIG. 21, the address register CONVR indicates the leading address XXX of the memory region 216A and on the other hand, the address register INPUT indicates the leading address YYY of the memory region 216B. Therefore, practically, the data inputted to the line memory INPUT is just as good as transferred to the line memory CONVR and conversely an empty region is as good as transferred to the line memory INPUT.

As explained hereinabove, the data is not actually transferred to the line memories of the RAM 200. Thus this data exchange can be effected in a moment.

Referring now to FIG. 22, a processing to be performed in step 2008 is an enlargement/reduction processing (namely, an image conversion) in the main scanning direction. In this processing, data stored in the line memory CONVR is converted and the converted data is written to the line memory CONVW.

In this step 2008, the microprogram performs the following setting operation before activating the image conversion portion 1400. Namely, as shown in FIG. 16, the leading addresses set in the address registers CONVR and CONVW are loaded into the address counters B and C of the internal bus DMA control portion 300, respectively. Then, the MPU of the processor block 13 (see FIG. 7) sets the enlargement/reduction ratio, which has been set in the parameter register 208 of the RAM 200, in the register 1404 of the image conversion portion 1400 (see FIG. 11). Moreover, data indicating the number of words of the line memory CONVR is set in the register 1412. After such an initialization operation, the program activates the image conversion portion 1400 and exits from step 2008.

DMA transfer of the image data stored in the line memory CONVR to the changing pixel detection portion 700 is then performed, and the transferred image data is converted by the changing pixel detection portion 700 into changing pixel data. Further, address information on the converted data is inputted to the register 1402. Then, subsequently, a value indicated by the register 1402 is multiplied by a value indicated by the register 1404 by the multiplier 1406. As a result, the changing pixel address data after the conversion is obtained. The drawing portion 1408 produces converted image data on the basis of the changing pixel address data and the color information stored in the register 1402. Subsequently, DMA transfer of the converted image data, which is thus obtained, to the line memory CONVW is performed. The method of effecting the DMA transfer of data from the line memory CONVR and the DMA transfer of data to the line memory CONVW in such a case is similar to that of performing the DMA transfer of data from the image bus control unit 100 to the RAM 200. Upon completion of image data of one line, the flag A of the address register CONVW is set as "1".

In case where reduction in the secondary scanning direction is needed, a judgement on whether or not the data stored in the line memory CONVW represents a thinned line, as well as a flag control operation, is performed subsequently to the main scanning conversion of data of one line. The contents of such a processing will be described later. If judged so, the flag A of the address register CONVW is not set.

Thereafter, it is judged in steps 2009 and 2010 whether or not effective data obtained as the result of the conversion is stored and whether or not the line memory CODING for a coding is empty. When the flag A of the address register CONVW is 1 and that of the address register CODING is 0, the contents of these registers CONVW and CODING are exchanged for each other. The leading addresses of the exchanged data after the conversion are loaded into the corresponding address counter 302. Thereby, the exchange of the data between the line memories CONVW and CODING is performed. This exchanging operation is not performed in case where the data stored in these line memories is those of thinned lines.

In step 2012, a coding of the data stored in the line memory CODING is effected. If the coder 1500 is not operating, the microprogram sets the coding mode (corresponding to MH, MR, MMR or MG3) for the coder 1500. Further, the microprogram sets data representing the width of one line in the register 1520 and activates the coder 1500. However, in case where the data stored in the memory CODING representing thinned line, the flag A of the address register CONVW is 0 and thus the program does not activate the coder 1500.

The activated coder 1500 performs the coding of the image data stored in the line memory CODING by referring to data stored in one of the coding reference line memories C0R (corresponding to CH0) and C1R (corresponding to CH1). Thereafter, results of the coding are written to the coding data memory BC1. Incidentally, the reading of data from the line memory CODING and the writing of data to the line memory BC1 are effected through the DMA control portion 300. An operation of the internal bus DMA control portion 300 is similar to that in case of data transfer from the image bus control unit 100 to the RAM 28.

Further, the changing pixel address of the coded line is detected by the changing pixel detection portion 800, and the changing pixel address of the reference line is detected by the changing pixel detection portion 600.

Upon completion of data of one line, the flag A of the address register BC1 is set as "1". Further, the contents of the address register CODING is exchanged for the contents of the address counter C0R (corresponding to CH0) or C1R (corresponding to CH1). Thereby, the reference line is updated.

When the microprogram confirms the completion of the coding in steps 2013 and 2014 and the fact that the line memory BC is empty, the exchange of the data between the line memories BC1 and BC is performed by exchanging the contents of these line memories.

Thereafter, in step 2016, code data is outputted from the line memory BC to the system bus 10 by the DMA transfer. At that time, it is necessary to know a quantity of code data to be outputted. The quantity of code data is found by referring to the contents of the counter 1522 of the coder 1500 (see FIG. 9) when the coding is finished.

Then, in step 2017, it is judged whether or not the coding of data of lines, the number of which is established, is completed. If not completed, the program returns to step 2002. In contrast, if completed, the execution of the coding command is finished when all of the code data are outputted in step 2018.

The judgement on the termination of the execution of the coding command is made on the basis of whether or not the coding of the last line indicated by the corresponding flag C set as "1", is finished. The state of the flag C is propagated through the address registers as follows.

Namely, if the flag C corresponding to the address register INPUT is 1, the flag C corresponding to the address register CONVR becomes 1 (INPUT, C=1>CONVR, C=1). Further, if the flag C corresponding to the address register CONVR is 1, the flag C corresponding to the address register CONVW is set as 1 upon completion of the image conversion. Furthermore, if the flag C corresponding to the address register CONVW is 1, the flag C corresponding to the address register CODING becomes 1 (if CONVR, C=1, CONVW, C=1 after the image conversion, and further CONVW, C=1→CODING, C=1).

1-13. Outline of Compression Operation

As described above, after the line memories of the internal RAM 200 are filled with data, the image-data input processing (step 2004), the image conversion processing (step 2008), the coding processing (step 2012) and the code data output processing (step 2016) are effected in parallel with one another. Furthermore, these processing and the DMA transfer on the image bus (steps 2002 and 2003) can be performed in parallel with one another.

Therefore, the compression processing time of the compression/expansion device 1 can be expressed by the following equation:

$$\text{(The Compression Processing Time)} = \max\{\text{Image Data Input Time, Image Conversion Time, Coding Time, Code Data Output Time}\} \quad (2)$$

Figure 24:
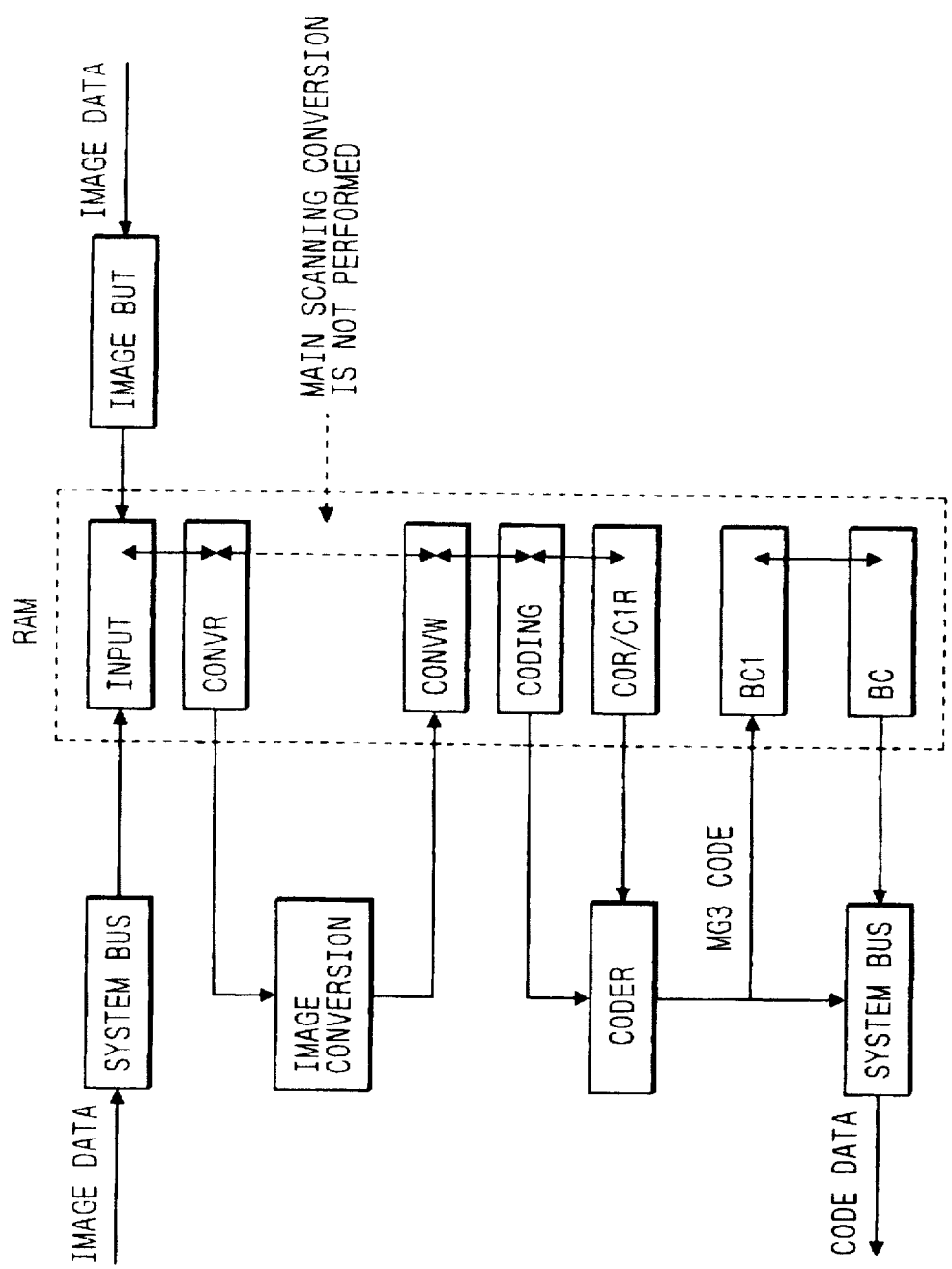
FIG. 24 is a diagram for illustrating a manner of using the line memories, as well as a data flow, at the time of performing a compression operation.

FIG. 24 illustrates how to use the line memories in the coding command processing. As is seen from this figures the line memories INPUT and CONVR are used by being toggled. Further, the line memories CONVW, CODING, C0R/C1R are used in a circulating manner, and the line memories BC1 and BC are used by also being toggled.

Incidentally, in case where the main scanning conversion is not effected, data stored in the line memory CONVW is directly transferred to the line memory CODING as indicated in FIG. 24.

Additionally, in the foregoing description, image data is inputted from the image bus 11. However, as illustrated in FIG. 24, data to be coded may be inputted from the system bus 10 of the compression/expansion device 1. Moreover, in the foregoing description, coded data is outputted to the system bus 10 through the RAM 200. However, coded data may be directly outputted from the coder 1500 to the system bus 10.

1-13. Description of Expansion Operation

First, a compression operation will be outlined hereinbelow. The MPU first establishes various registers in the system. This includes an indicating of coding channels CH0 and CH1.

Upon completion of the establishment of the registers, a decoding command is written to a command register 402A or 404A of the system bus control unit 400. This command is decoded by a macrocommand ROM 1608 and outputs a signal indicating a start address of a decoding program. The decoding program stored from this start address in the microprogram ROM 1601 is executed.

FIG. 17 illustrates the line memory 216 and the address register 502 defined in case of a coding command processing as previously described. The contents or roles of the line memories are as follows:

Line memory DECODE stores image data of lines to be decoded;

Line memory D0R stores image data of a reference line for the decoding channel 0;

Line memory D1R stores image data of a reference line for the decoding channel 1;

Line memory CONVR stores image data of lines obtained before a conversion;

Line memory CONVW stores image data of lines obtained as a result of the conversion;

Line memory OUT2 serves as an output buffer;

Line memory OUT1 serves as an output buffer; and

Line memory OUT serves as an output line buffer.

Code data is decoded by referring to the line memories D0R (corresponding to CH0) or D1R (corresponding to CH1) and the decoded data is distributed or stored in the line memory DECODED. Upon completion of decoding of code data corresponding to one line, the contents of the line memory DECODE is transferred to the line memory D0R or D1R and is referred to at the time of decoding the next line. Simultaneously with this, the contents of the line memory D0R or D1R are transferred to the line memory CONVR as an object of an image conversion. Then, the image conversion is performed on the data transferred to the line memory CONVR. Further, the converted image data is written to the line memory CONVW.

If the line memory OUT2 is empty, the converted data stored in the line memory CONVW is immediately sent to the line memory OUT2. In such a case, if the line memory OUT1 is empty, the data having been already stored in the line memory OUT2 is immediately transferred to the line memory OUT1. At that time, if the line memory OUT is empty, the data having been stored in the line memory OUT1 is immediately transferred to the line memory OUT. This data is then outputted to an external circuit.

Thus, each of the line memories CONVW, OUT", OUT1 and OUT operates as an FIFO buffer for inputting and outputting data in line units.

Figure 25:
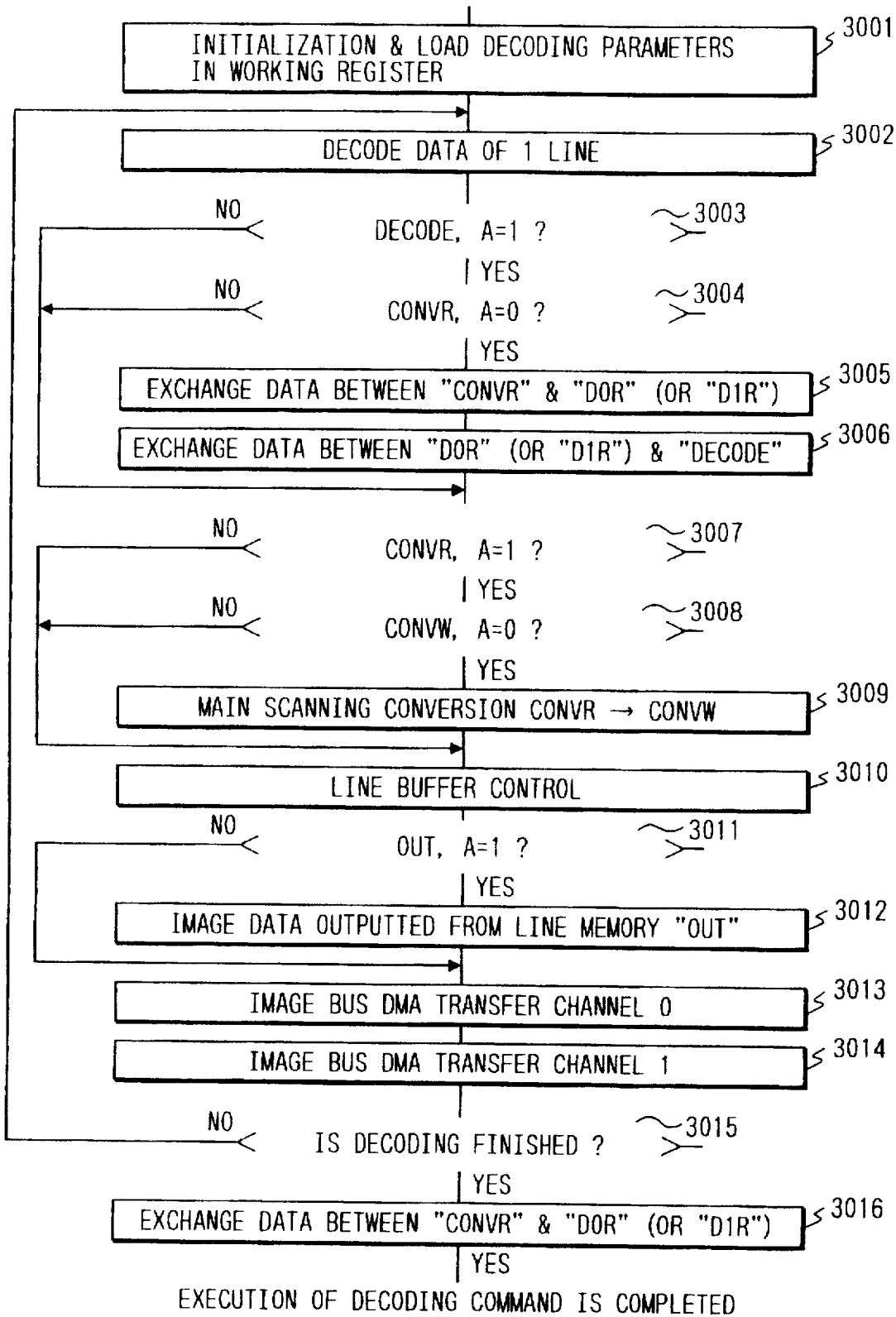
FIG. 25 is a flowchart for illustrating an expansion operation.

FIG. 25 shows an example of a flowchart of the decoding program briefly. Hereinafter, a decoding command processing will be described by referring to this flowchart.

In step 3001, data representing parameters necessary for the decoding command processing is loaded into the working register 500 from of parameter register set region 202 (corresponding to CH0) or 204 (corresponding to CH1) of the RAM 200 in step 3001.

Next, in step 3002, a decoding of code data corresponding to one line is effected. This processing will be described in detail later by referring to FIG. 26.

Subsequently, in step 3003, the flag A of the address register DECODE is checked and moreover, it is judged whether or not the decoding of data of one line is finished. Then, it is further judged in step 3004 whether or not the line memory CONVR is empty. IF the flag A of the address register DECODE is 1 and that of the address register CONVR is 0, the contents of the address register CONVR is exchanged for those of the address register D0R or D1R in step 3005. Subsequently, in step 3006, the contents of the address register D0R or D1R is exchanged for those of the address register DECODE. Further, an exchange of data between the corresponding line memories is effected.

Thereby, the data having been just decoded or restored is transferred to the line memory D0R or D1R. Thus a preparation for restoring the next line of an image to be restored has been made. Further, the data used up is transferred to the line memory CONVR as data representing a reference line. Moreover, a memory region used for storing the data, the conversion of which has been finished, is transferred to the line memory DECODe. Thereby, preparations for restoring the next line and for performing the next image conversion has been made.

Then, in steps 3007 and 3008, it is checked whether or not there is data to be converted and whether or not the line memory CONVW is empty. Subsequently, an image conversion in the main scanning direction is performed by the image conversion portion 1400. The contents of this conversion is the same as those of the processing to be effected in step 2008 of FIG. 22. Further, in case where reduction in the secondary scanning direction is needed, a judgement on whether or not the data stored in the line memory CONVW represents a thinned line, as well as a flag control operation, is performed subsequently to the main scanning conversion of data of one line. The contents of such a processing will be described later.

Further, in step 3011, it is checked whether or not there is any data to be converted. Moreover, in step 3012, the data stored in the line memory OUT is outputted to an external circuit in step 3012. Subsequently, if there is a request for a DMA transfer of data on the image bus, this transfer operation is performed in steps 3013 and 3014. This is the same as the processing in steps 2002 and 2003 of FIG. 22.

Then, in step 3015, it is judged whether or not the execution of the decoding command is over. If termination conditions are not met, the program returns to step 3002. If the conditions are satisfied, the data moved to the line memory CONVR is put back to the line memory D0R or D1R in step 3016 as a preparation for the next decoding command.

Figure 26:
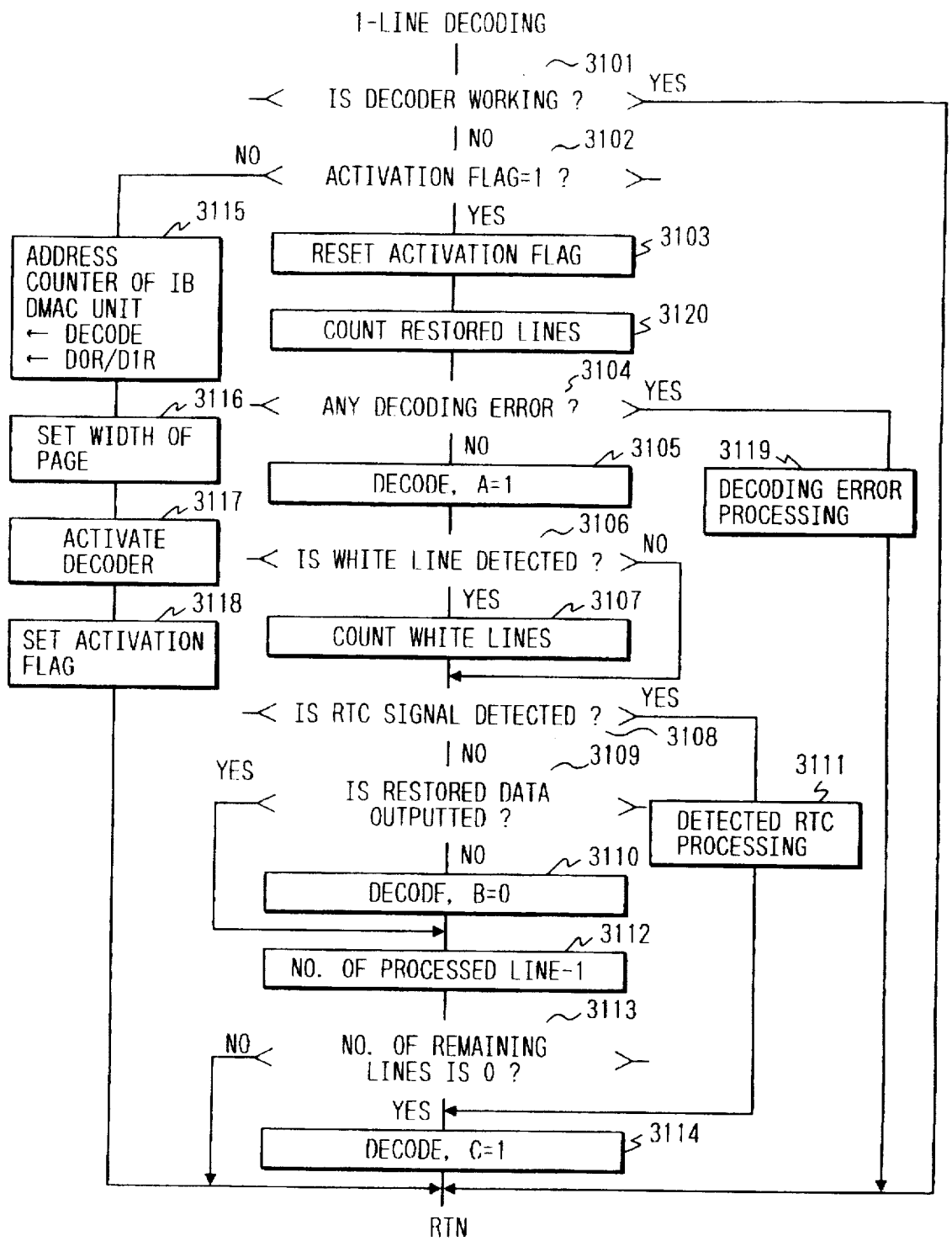
FIG. 26 is a flowchart for illustrating an operation of decoding of data of one line.

FIG. 26 is a detailed flowchart of a decoding of 1 line, which is effected in step 3002 of FIG. 25. First, the system checks a condition signal indicating that the decoder 1300 is working. If not working, the activation flag of the decoder 1300 is checked in step 3102 for the purpose of judging whether or not the activation flag is already set (namely, the activation has been conducted).

If it is confirmed that the the activation flag has been already set (namely, the activation has been conducted), the program advances to step 3103. If the activation flag is reset, the program advances to step 3115. Further, if the decoder 1300 is operating, the program immediately returns to the program of FIG. 25.

In case where the decoder 1300 is not working, a process flow is as follows. First, in step 3115, the contents of the address registers DECODE and D0R (or D1R) of the working register 500 are loaded into the the address counters A and I (or J) of the internal bus DMA control portion 300 to prepare for the activation of the decoder 1300.

Thereafter, each time one word is accessed in response to a DMA transfer request issued from the decoder 1300, these address counters are automatically incremented and indicate an address, to which restored data is written, and another address, from which the reference line data is read.

Then, in step 3116, the number of words of one line is set in the register 1324 of the decoder 1300 and an internal register (not shown) of the reference-line-changing-pixel detection portion 600. After making such a preparation, the decoder 1300 is activated in step 3117. Then, in step 3118, the activation flag corresponding to the decoder 1300 is set as "1" and the program returns. The processing described hereinabove is a leading processing of one line.

Further, in step 3103 and steps subsequent thereto, the system performs a part of the processing after the decoder 1300 decodes data of one line and the decoded restored data.

In step 3103, the activation flag set in step 3118 is reset. Subsequently, in step 3104, a condition signal indicating whether or not a decoding error occurs in step 3104.

If a decoding error occurs, a decoding error processing is performed in step 3119. For instance, the line corresponding to the decoding error occurring (hereunder sometimes referred to as an error line) is replaced with a line just preceding to the error line or with a white line (to be described later).

In step 3106, a condition signal from the decoder 1300, which indicates whether or not the restored line is a white line (namely, all of the pixels of the restored line are white pixels), is checked. Each time one word is restored, the decoder 1300 checks by using the comparator 1320 of FIG. 10 whether or not the word having been just restored is "white data" (namely, all of the bits of the word represent white). Furthermore, at the time of completing the decoding of code data corresponding to one line, the microprogram can judge from the condition signal whether or not this line is a white line.

If the line is a white line, a counter for counting successive white lines appearing at the top portion of one page of the original image or a counter for counting successive white lines appearing at the bottom portion of one page of the original image is incremented in step 3107 (incidentally, these counters are provided in the working register 500).

Then, in step 3108, the system checks a condition signal from the decoder 1300 indicating whether or not an RTC (return to control) code is detected. Next, in step 3109, it is judged whether or not the restored data is outputted to an external circuit. This judgement is conducted by referring to a specific register of the register set 402 (corresponding to CH0) or 404 (corresponding to CH1) of the system bus control unit 400. The contents of this register are established by the MPU of the processor block 13.

If data representing this line is not outputted, the flag B of the address register DECODE is set in step 3110 as "1". Data representing a line, the corresponding flag of which is set as "1", is ignored and is not outputted to an external circuit when outputting data from the system. Thereby, the MPU performs a control operation such that each page can be cut along the white line (hereunder sometimes referred to as a cutting line) at the top or bottom thereof.

Next, in step 3112, the number of lines to be processed consecutively, which is set by the MPU, is decremented and thus the number of the remaining lines is found. Then, in step 3113, the number of the remaining lines is checked. If the number of the remaining lines is 0, the flag C indicating the last line, which is provided in the address register DECODE, is set as "1" in step 3114. If the number of the remaining lines is not 0, the program immediately returns.

Incidentally, in step 3120, a counter (provided in the working register 500) for counting the number of restored lines is incremented. The number of lines of one page can be obtained from the value indicated by this counter. When the processing of one page is completed, the microprogram causes the decoding command parameter register region 210 of the RAM 200 corresponding to one of the channel to store the number of lines of the page. This region can be directly accessed from the MPU.

Figure 27:
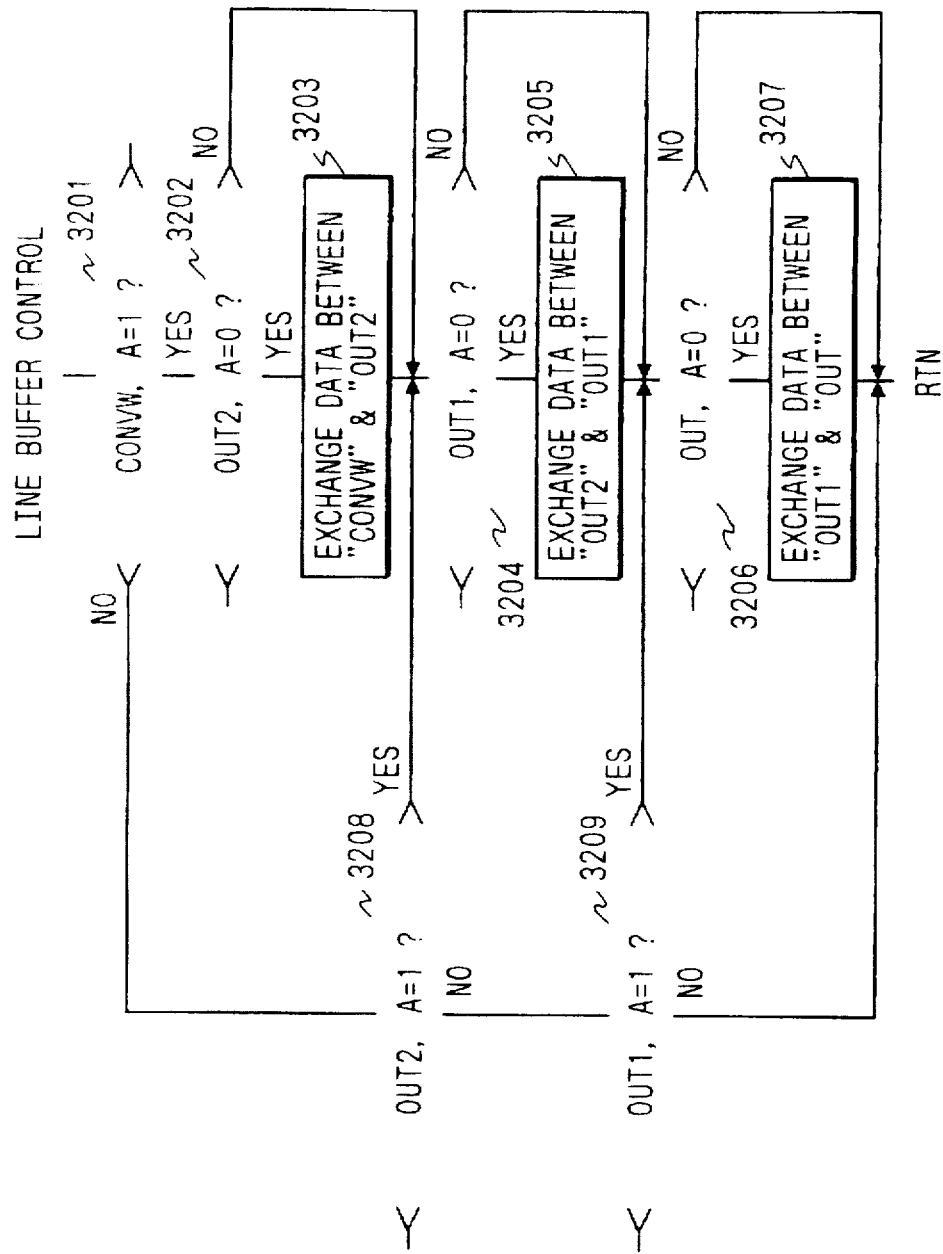
FIG. 27 is a flowchart for illustrating a line-buffer control operation.

FIG. 27 is a detailed flowchart of a program for performing the line buffer control operation in step 3010 of FIG. 22.

As shown in this figure, it is confirmed in steps 3201 and 3202 that the flag A of the address register CONVW is 1 and that of the address register OUT2 is 0. Subsequently, in step 3203, the contents of the address register CONVW are exchanged for those of the address register OUT2.

Thereby, the data having been stored in the line memory CONVW is transferred to the line memory OUT2. Further, an empty memory region is substituted for the transferred data and is provided in the line memory CONVW. Moreover, the flag A of the address register OUT2 and that of the address register CONVW become 1 and 0, respectively.

Additionally, the exchange of data between the line memories OUT1 and OUT2 is performed in steps 3208, 3204 and 3205 and on the other hand the exchange of data between the line memories OUT1 and OUT is effected in steps 3209, 3206 and 3207. Further, in step 3207, the flag A of the address register OUT is set as "1". In the foregoing processing, each of the line memories CONVW, OUT2, OUT1 and OUT become used as an FIFO buffer for outputting data in line units.

Figure 28:
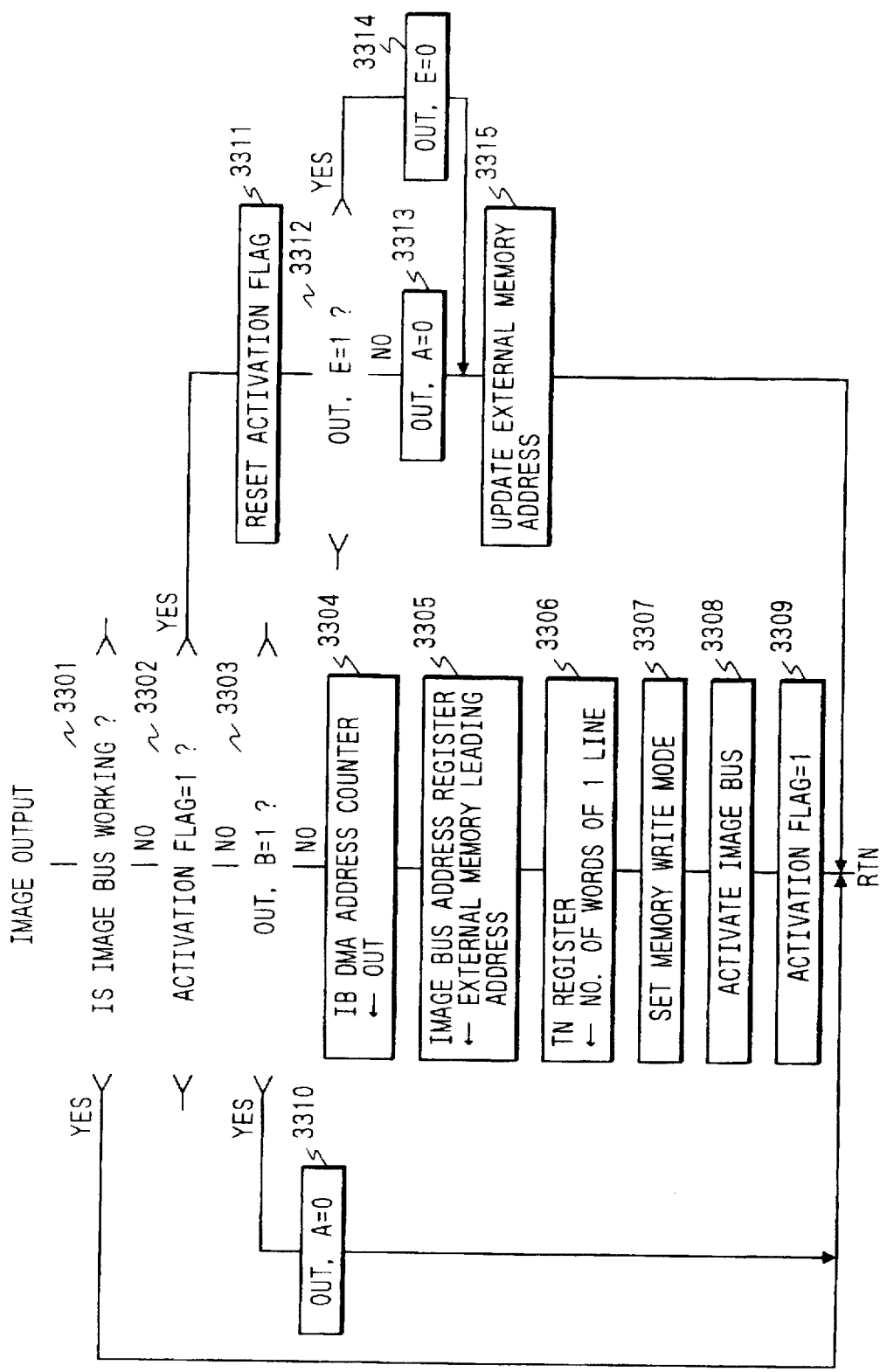
FIG. 28 is a flowchart for illustrating an image output operation.

FIG. 28 is a detailed flowchart of a program for performing the image data output processing in step 3012 of FIG. 26. Namely, it is first checked in step 3301 whether or not the image bus control unit 3301 is working. If the unit 3301 is working, the program returns. Conversely, if not, it is further checked in step 3302 whether or not the activation flag of the image bus control unit 100 is set. If the activation flag is "1", this means that the image bus control unit 100 has been already activated but is not working. Therefore, the program exits from step 3302 to a branch consisting of step 3311 and steps subsequent thereto.

If the unit 100 is not activated, the program commences a leading-portion-line processing. Namely, in step 2303, it is checked whether or not the flag B of the address register OUT, and further it is judged whether or not the data stored in the line memory OUT should be outputted.

If the flag B is not "1", the data stored in the memory OUT should be outputted and thus a preparation for outputting the data by using a DMA transfer is made. Namely, the leading address is first loaded from the address register OUT into the address counter 302 corresponding to the line memory OUT, which counter is provided in the internal bus DMA control portion 300, in step 3304. Then, an address of the external RAM 28 is set in one of the address registers 104 of the image bus control unit 100 in step 3305. Subsequently, the number of words used for an output line is set in one of the transfer (word) number register 114 of the image bus control unit 100 in step 3306. Further, in step 3307, an operating mode of the image bus control unit 100 is established. In this case, the operating mode is set to be a memory write mode. Then, the image bus control unit 100 is activated in step 3308. Moreover, the activation flag in the memory write mode of the image bus control unit 100 is set in step 3309 as "1", and subsequently the program returns.

If it is found in step 3303 that the flag B is "1", an data output operation is not performed. Further, in step 3310, the flag A of the address register is reset as "0" in step 3310. Thereby, the contents of the line memory OUT becomes ignored. Moreover, a thinning of lines can be achieved by this processing.

Furthermore, it is a line-end processing that the system performs in step 3311 and steps subsequent thereto. Namely, in step 3311, the activation flag of the image bus control unit 100, which is set in step 3309, is reset. Thereafter, it is determined in step 3312 by checking the flag E of the address register OUT whether or not the output line is an object to be enlarged in the secondary scanning direction.

If not (namely, the flag E is 0), a second output of the data from the line memory OUT is not needed. Thus, the flag A of the address register OUT is reset as "0" in step 3313. Then, the program frees the line memory OUT. In contrast, if the output line is an object to be enlarged (the flag E is 1), the flag E of of the address register of the address register OUT is reset in step 3314. Therefore, in the latter case, the flag A of the address register OUT is "1". Consequently, the data stored in the line memory OUT is outputted again, with the result that the enlargement of the output line (namely, an interpolation of the line) in the secondary scanning direction can be achieved. Next, in step 3315, the address of the external RAM 28 is updated with the intention of outputting the next line. Then, the program returns.

The judgement on the termination of the execution of the decoding command is made on the basis of whether or not the data, the corresponding flag C of which is set as "1", is outputted. The state of the flag C (namely, the flag indicating the last line) is propagated through the address registers as follows.

Namely, if the flag C corresponding to the address register DECODE is 1, the flag C corresponding to the address register CONVR becomes 1 (DECODE, C=1→CONVR, C=1). Further, if the flag C corresponding to the address register CONVR is 1, the flag C corresponding to the address register CONVW becomes 1 upon completion of the image conversion. Then, the flag C of the address register OUT is set as 1 (Namely, if CONVR, C=1, then CONVW, C=1 after the image conversion OUT, C=1).

Hereinafter, the expansion operation will be summarized.

As described above, after the line memories of the internal RAM 200 are filled with data, the decoding processing (step 3002), the image conversion processing (step 3009), and the image data output processing (step 3012) are effected in parallel with one another. Furthermore, these processing and the DMA transfer on the image bus (steps 3013 and 3014) can be performed in parallel with one another.

Therefore, the expansion processing time of the compression/expansion device 1 can be approximately expressed by the following equation:

(The Expansion Processing Time)=max {Decoding Time, Image Conversion Time, Image Data Output Time}  (3)

Figure 29:
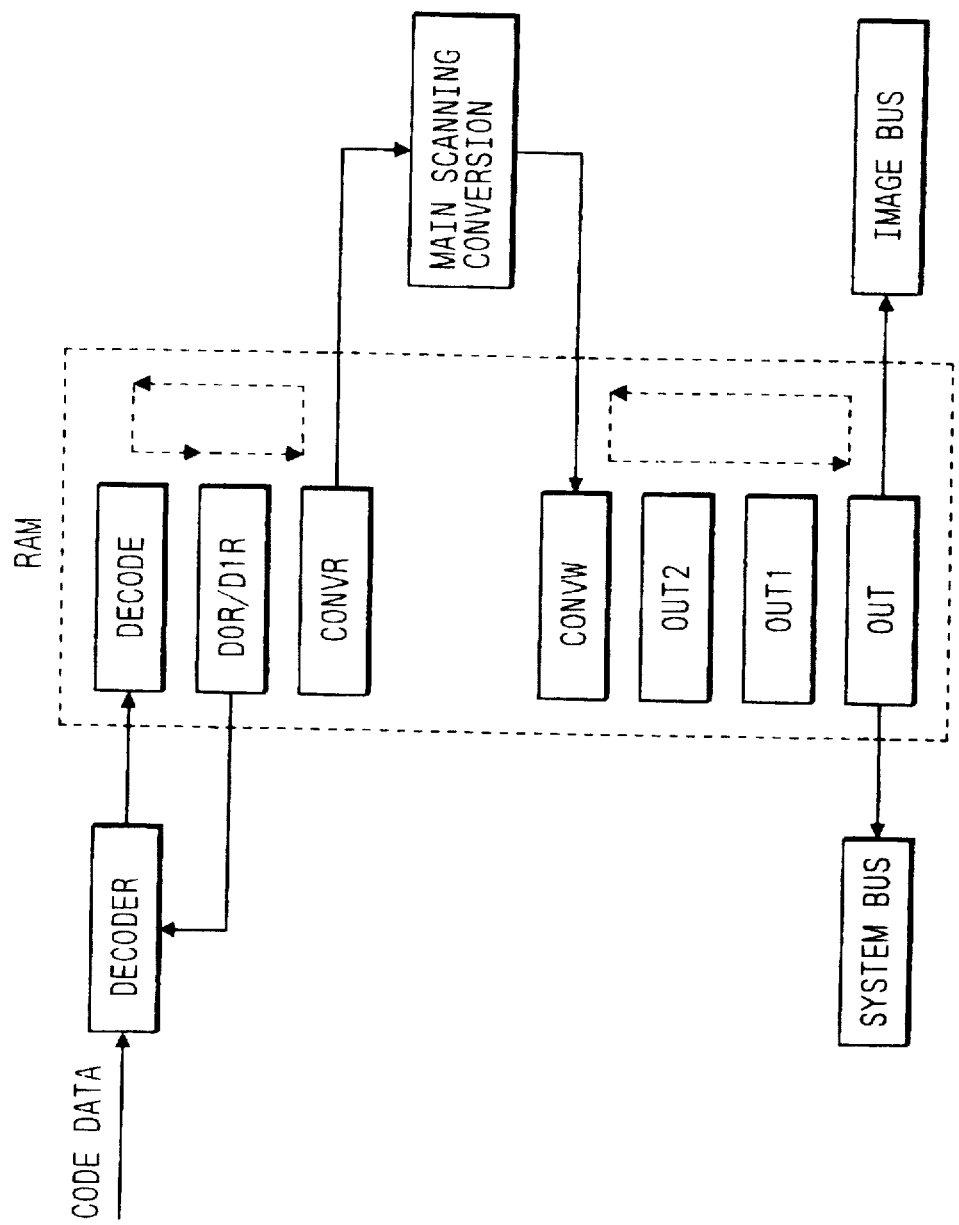
FIG. 29 is a diagram for illustrating a manner of using the line memories, as well as a data flow, at the time of performing an expansion operation.

FIG. 29 illustrates how to use the line memories in the decoding command processing. As is seen from this figure, the line memories DECODE, D0R/D1R and CONVR are used in a circulating manner. Further, the line memories CONVW, OUT2, OUT1 and OUT are also used in a circulating manner.

1-14. Description of Code Conversion Operation

Next, a code conversion operation of this embodiment of the present invention will be described hereinbelow. Incidentally, in the instant application, the term "code conversion" is defined as the changing of inputted code data from a certain type (for instance, MR) to another type (for example, MMR).

When performing a code conversion operation, code data to be converted is inputted from the system bus 10 and is then decoded by the decoder 1300. Subsequently, the restored data (namely, the data obtained by decoding the inputted code data) is written to the line memory DECODE. By effecting the decoding operation as above described, an image conversion is performed on data stored in the line memory CONVR. Thus far, the above-mentioned part of the code conversion operation are the same as the corresponding part of the above described expansion operation.

Thereafter, data stored in the line memory CONVW are objects of the coding. Therefore, the rest of the code conversion operation is the same as the compression operation.

Code data of one page can be converted from a type to another type by performing a sequence of the decoding, the image conversion processing and the coding on code data of a line and repeatedly effecting such a sequence on all lines serially.

Figure 31:
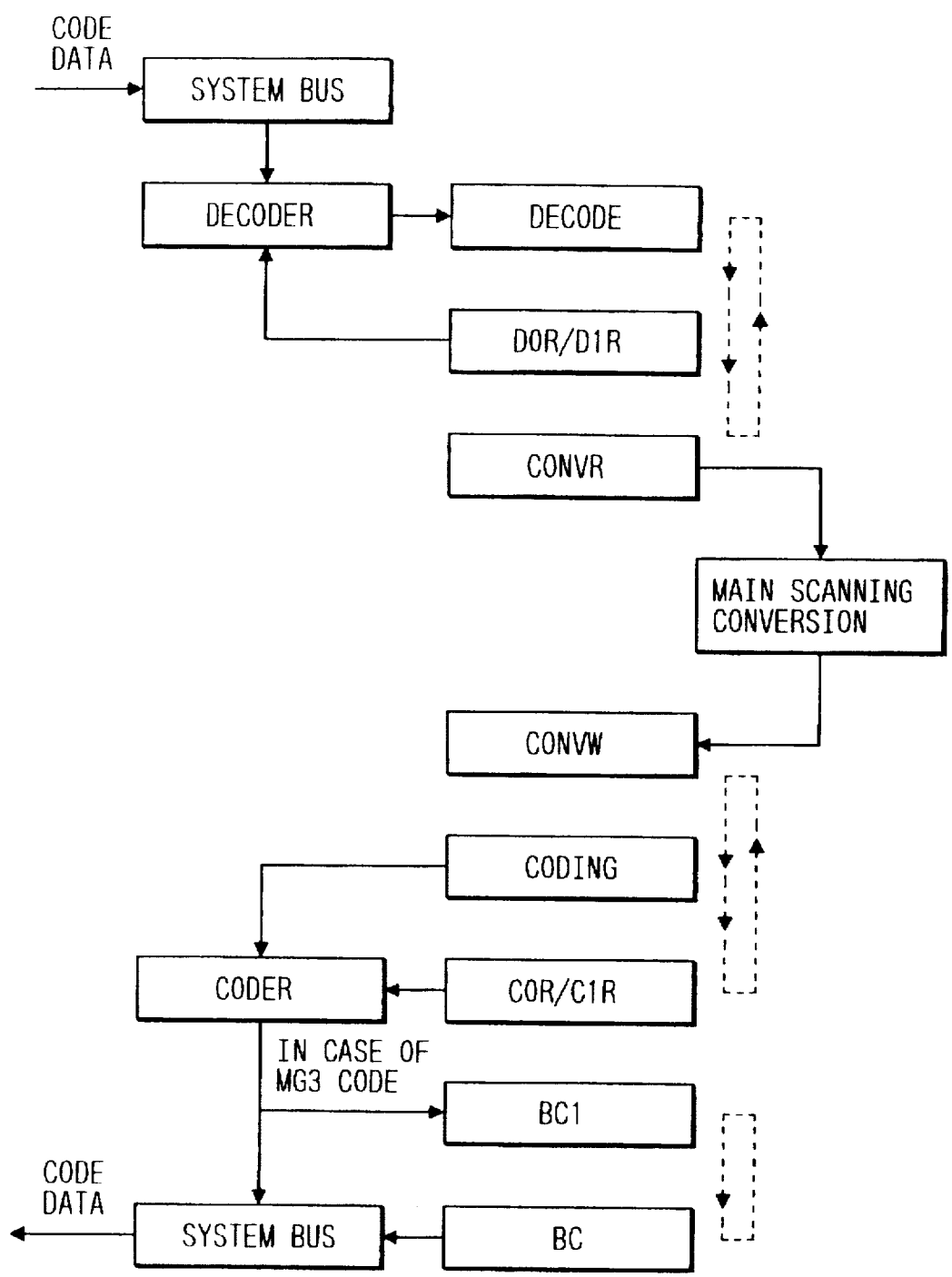
FIG. 31 is a diagram for illustrating a manner of using the line memories, as well as a data flow, at the time of performing a code conversion operation.

In case of this code conversion operation, the address registers 502 and the line memories 216 of FIG. 18 are defined as described previously. FIG. 31 is a diagram for illustrating how to use the line memories.

Figure 30:
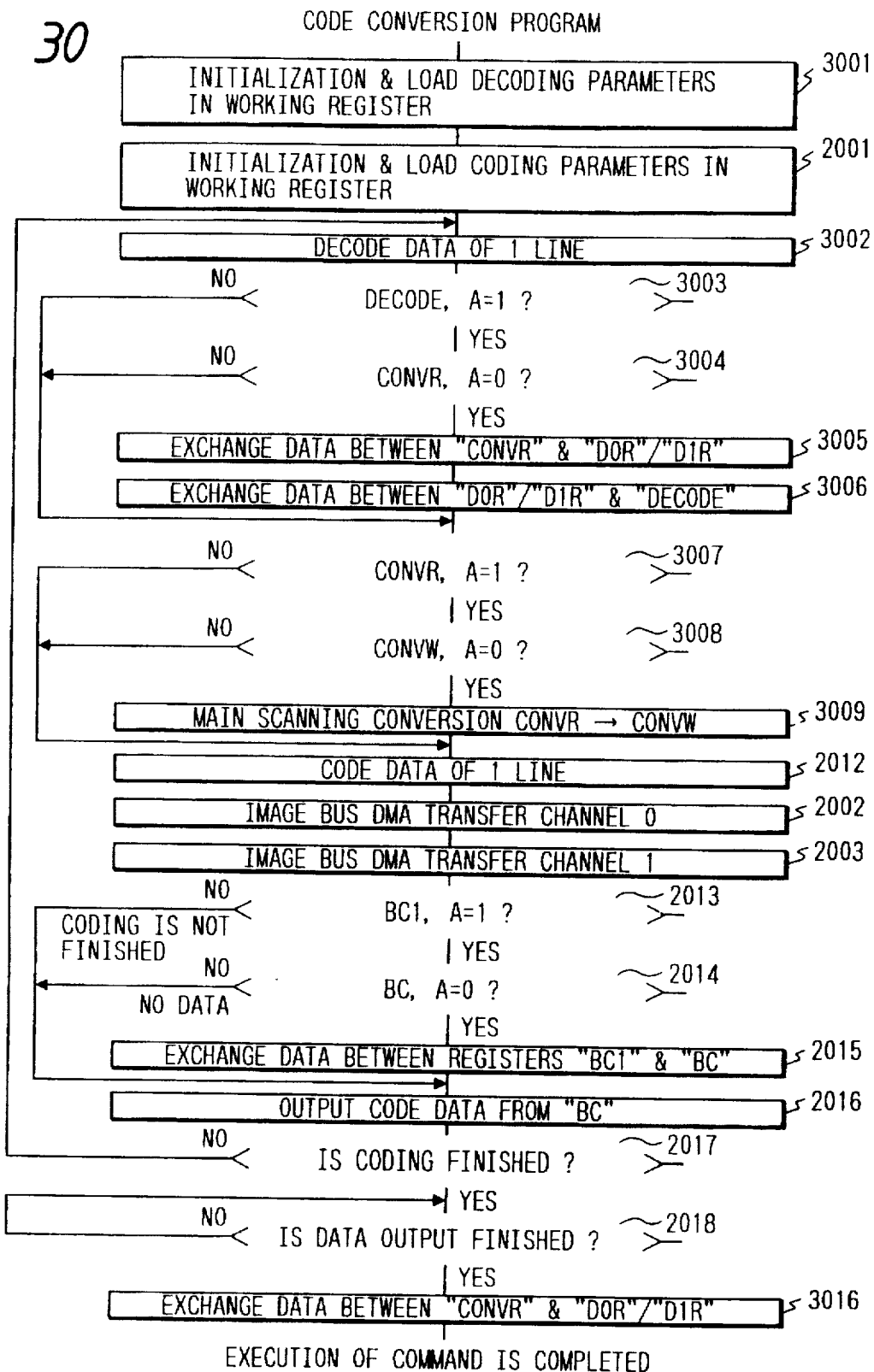
FIG. 30 is a flowchart for illustrating a code conversion operation.

FIG. 30 is a flowchart of a program for performing a code conversion. Incidentally, steps indicated by like reference numbers are the same as the corresponding steps of FIGS. 23 and 26. Thus the descriptions of such steps are omitted herein.

As can be easily understood from FIG. 30, (a) the decoding, the image conversion, the coding and the DMA transfer of data on the image bus can be performed in parallel with one another; and (b) Even when a decoding error occurs, a decoding error is checked and a decoding error processing is performed (see step 3119 of FIG. 26) during a decoding of code data of one line in step 3002. Therefore, code data obtained as a result of the code conversion does not contain a decoding error.

Incidentally, in the code conversion operation or the expansion operation, the number of lines of one page and that of white lines serially arranged in a row at the top portion and the bottom portion of the page are found in steps 3120 and 3107 of FIG. 26 during the decoding operation is carried out in step 3002. Further, data representing such numbers are stored in the decoding command parameter register region 210 of the RAM 200 upon completion of the code conversion or expansion operation. The MPU reads these parameters and uses the read parameters for determining the enlargement/reduction ratio and the cutting lines at the top and bottom of each page.

1-15. Description of Image Conversion (Reduction) in Secondary Scanning Direction Reduction in the secondary scanning direction can be effected by thinning one line at a regular interval of a fixed number of lines, and on the other hand, enlargement in the secondary scanning direction can realized by copying (or interpolating) one line at a regular interval of a constant number of lines.

Hereinafter, an operation of performing a reduction in the secondary scanning direction (especially, a method for determining thinning lines (namely, lines to be thinned) will be described by way of example.

Figure 32:
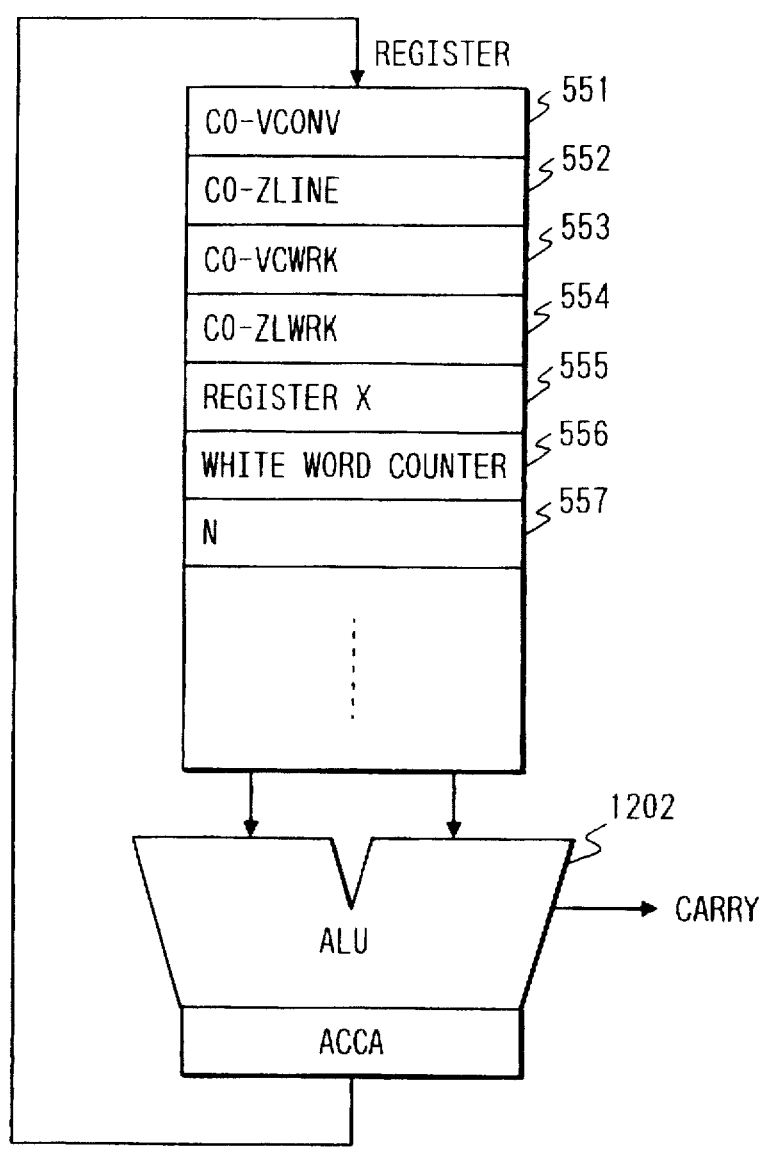
FIG. 32 is a diagram for illustrating parameters used for performing an image conversion in a secondary scanning (namely, vertical scanning) direction.

FIG. 32 is a diagram for illustrating an operation of performing an image conversion (namely, reduction in this case) in the secondary scanning direction. Parameters, which are stored in the registers 551 to 557 of the working register 500 and are connected with the image conversion (namely, the reduction) in the secondary scanning direction, are as follows:

C0-VCONV (a secondary scanning conversion ratio): the register 551;

C0-ZLINE (a constant number of lines (to be described later)): the register 552;

C0-VCWRK (a working register): the register 553;

C0-ZLWRK (a working register): the register 554;

REGISTER X (a register indicating an address of the RAM 200): the register 555;

NON-WHITE-WORD-COUNTER: the register 556; and N (a constant): the register 557.

Incidentally, these parameters are used for Channel 0.

Next, a conventional process or algorithm for determining thinning lines, by which a white line is not preferentially thinned, will be described hereinbelow.

Namely, each time effective data of one line is obtained and stored in the line memory CONVW, the parameter C0-VCONV is accumulated by the 16-bit ALU 1202. A value obtained as a result of this accumulation is the parameter C0-VCWRK. Further, when an overflow occurs and a carry is generated by the ALU 1202 as the result of the accumulation effected correspondingly to effective data of a line, this line becomes an object to be thinned.

Such a carry is generated by the 16-bit ALU 1202 every (65536/(C0-VCWRK)) lines. Namely, let M denote (65536/(C0-VCWRK)). One line is thinned every M lines. Thus, a reduction ratio is given by $$R=(M-1)/M=1-(1/M)$$

The MPU of the processor block 13 determines the parameter C0-VCONV from the value of the reduction ratio R obtained according to this equation and sets the determined parameter C0-VCONV in the compression/expansion device 1.

Figure 33A:
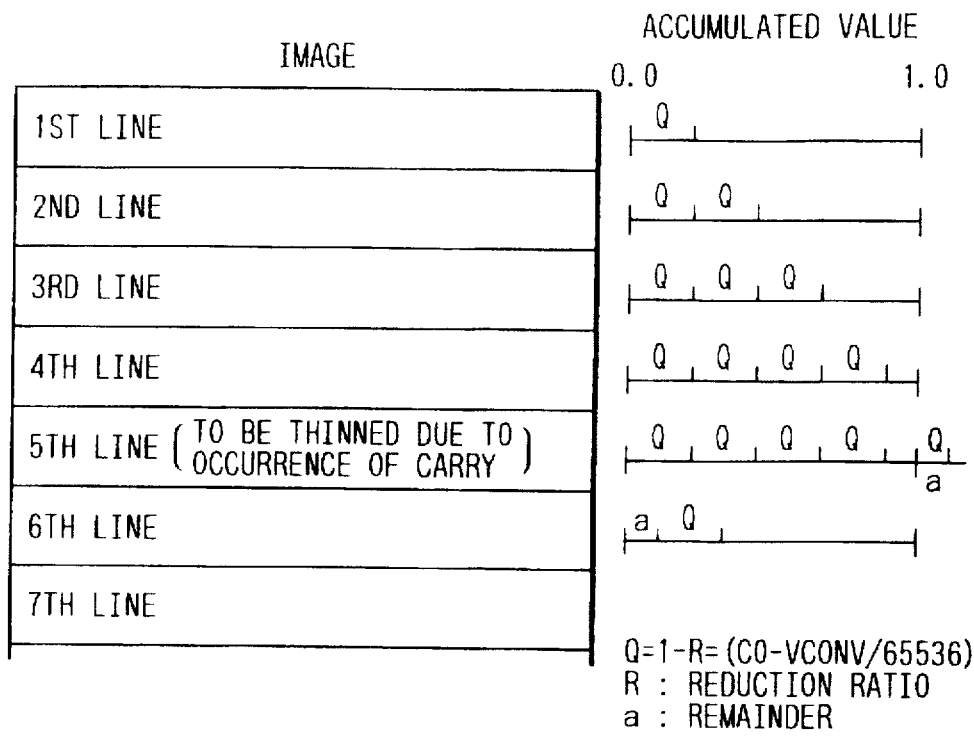
FIG. 33(a) is a diagram for illustrating how to determine thinning lines to be thinned for the purpose of reduction in the secondary scanning direction.

FIG. 33(a) is a diagram for illustrating a process of the accumulation of the parameter C0-VCONV. Referring to this figure, there are shown lines of an image and the parameter (namely, the value obtained as the result of the accumulation) C0-VCONV corresponding to each line left and right. In case of the example illustrated in this figure, a carry occurs correspondingly to a fifth line. Thus this line should be a thinning line, namely, should be thinned.

Such an algorithm is of the prior art as described above.

Figure 33B:
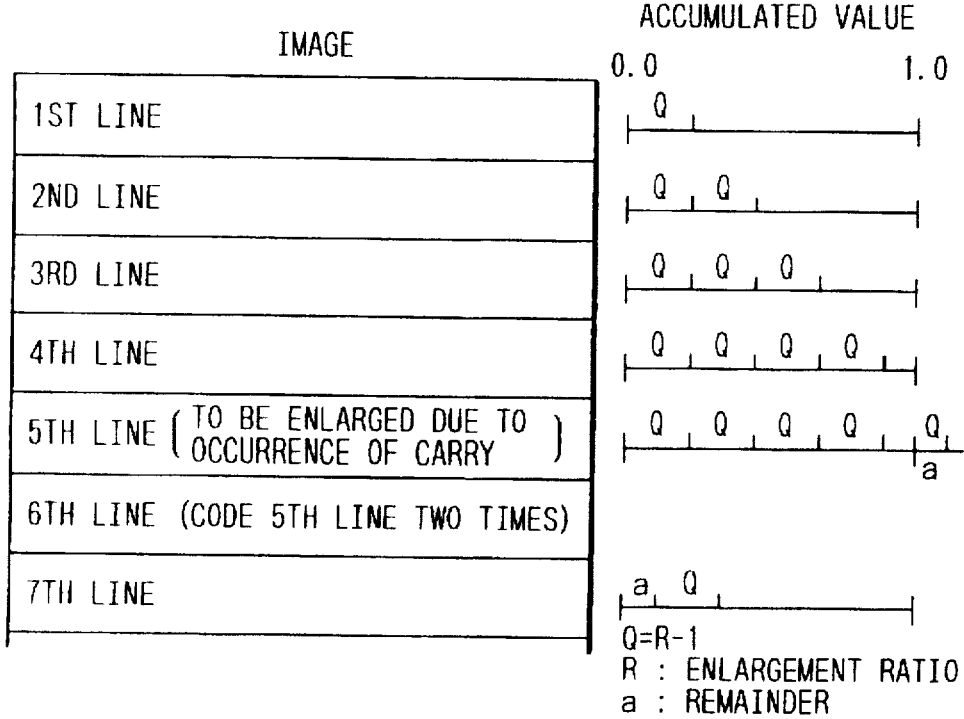
FIG. 33(b) is a diagram for illustrating how to determine copying lines to be copied for the purpose of enlargement in the secondary scanning direction.

Incidentally, in case of enlargement in the secondary scanning direction, copying lines (namely, lines to be copied) can be determined according to a similar algorithm. FIG. 33(b) illustrates an accumulation process to be effected in determining the copying lines. In case of the example illustrated in this figure, a carry is generated correspondingly to a fifth line. Thus the fifth line should be an object, on which an enlargement is performed. Consequently, this line should be coded two times.

Additionally, the compression/expansion device 1 can employ either the conventional algorithm or an improved algorithm which will be described hereinbelow.

Figure 34:
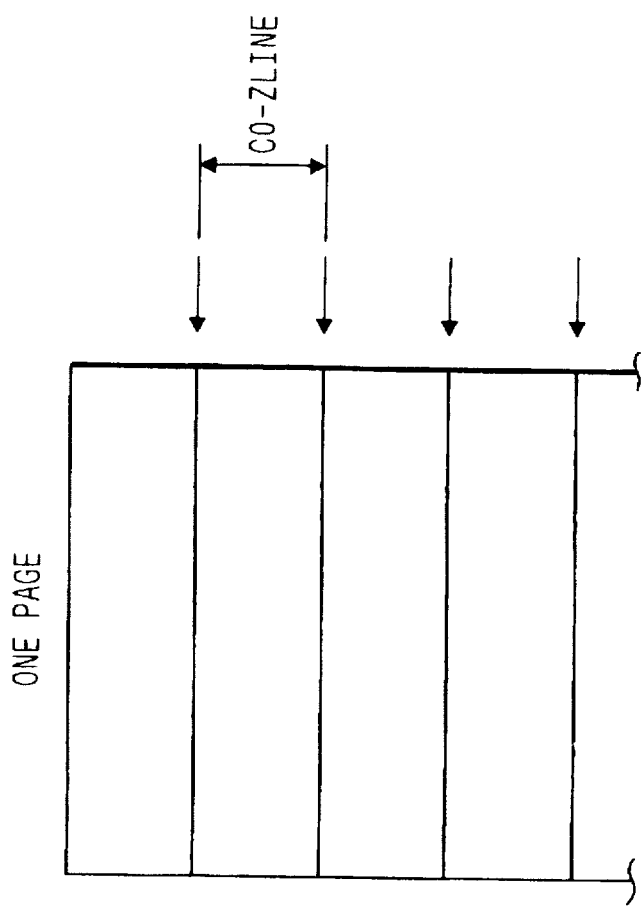
FIG. 34 is a diagram for illustrating how to determine thinning lines according to an improved algorithm.

FIG. 34 is a diagram which illustrates an improved algorithm for performing a reduction in the secondary scanning direction. In this figure, arrows indicate lines, correspondingly to each of which a carry occurs. Note that in case of the above described algorithm, a line, correspondingly to which a carry is generated, should be thinned unconditionally, and as a result a fine line is lost. Consequently, the conventional algorithm has a drawback in that picture quality is degraded.

This improved algorithm can prevent such degradation in picture quality by preferentially thinning a white line. Namely, the parameter C0-ZLINE is first set as smaller than the interval between a thinning line and the nest thinning line. Then, lines located within the value indicated by the parameter C0-ZLINE from a line, correspondingly to which a carry occurs, are searched for a white line. If a white line is found, this white line is thinned. If white lines are found, the last line of such a range (namely, the (C0-ZLINE)th line from the line, correspondingly to which a carry occurs) is thinned.

Incidentally, the term "a white line" indicates a line, the words composing data of which includes non-white ones of the number equal to or less than a number N preset by the MPU. For instance, if N=0, a line, all of the words composing data of which are white ones, is searched for. Incidentally, a white word is a word representing a white pixel. Thus, a non-white word is a word other than the white word.

Figure 35:
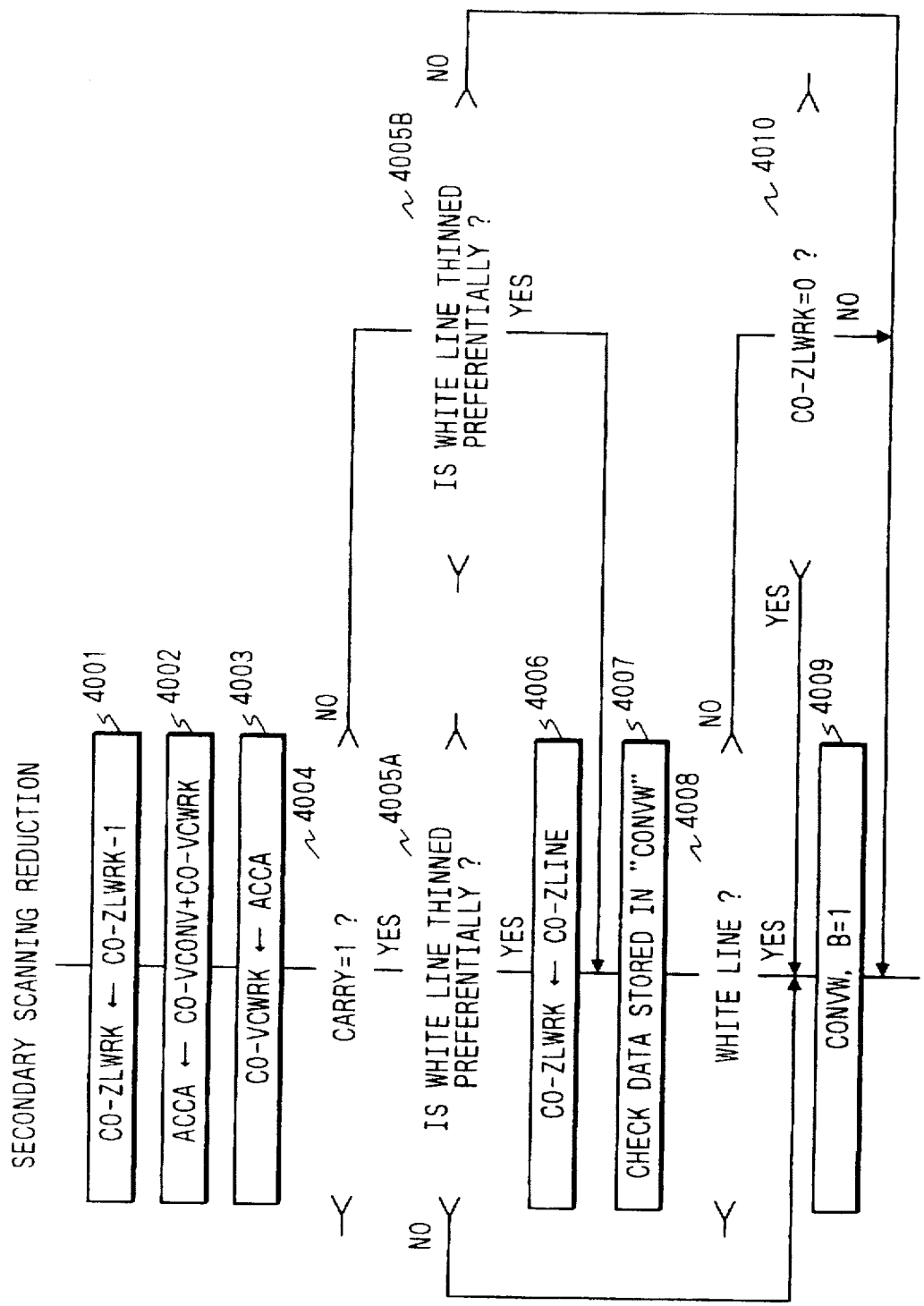
FIG. 35 is a flowchart for illustrating an operation of determining thinning lines and setting a flag.

FIG. 35 is a flowchart of a program for performing an operation of determining a thinning line and setting a corresponding flag. This operation is performed by executing a microprogram written to the microprogram ROM 1601. Further, this operation is effected every time data of one line is generated and written to the line memory CONVW (in step 3009 of FIGS. 25 or 30 or step 2008 of FIG. 22 immediately after the main scanning conversion is finished). According to the flag set in this operation, a thinning line is actually thinned in the restored data output operation (for instance, in step 3012 of FIG. 25 in case of the decoding operation) subsequent to the operation of FIG. 35.

As shown in FIG. 35, the parameter C0-ZLINE is decremented in step 4001. Subsequently, the parameter C0-VCONV is added to the parameter C0-VCWRK in step 4002. Then, the parameter C0-VCWRK is updated in step 4003 by using a value obtained in step 4002. Thereafter, it is checked in step 4004 whether or not a carry is generated by the ALU 1202 (incidentally, the carry is included in the condition signal outputted from the ALU 1202).

If a carry is generated, it is further checked in step 4005A whether or not the setting of specific registers 402 and 404 is effected by the MPU by thinning a white line preferentially (namely, according to the improved algorithm). Conversely, if not generated, the same is checked in step 4005B. If it is found in step 4005B that the setting of these registers is not effected according to the improved algorithm (namely, according to the conventional algorithm), the program returns. In contrast, if it is found in step 4005B that the setting of these registers is effected according to the improved algorithm (namely, by preferentially thinning a white line), the program advances to step 4007.

If it is found in step 4005A that the setting of these registers is effected by preferentially thinning a white line, the program advances to step 4006 whereupon the initial value of the parameter C0-ZLINE is set as a value of the parameter C0-ZLWRK. Then, the program further goes forward to step 4007. In contrast, if it is found in step 4005A that the setting of these registers is not effected by preferentially thinning a white line, the program advances directly to step 4009.

Figure 36:
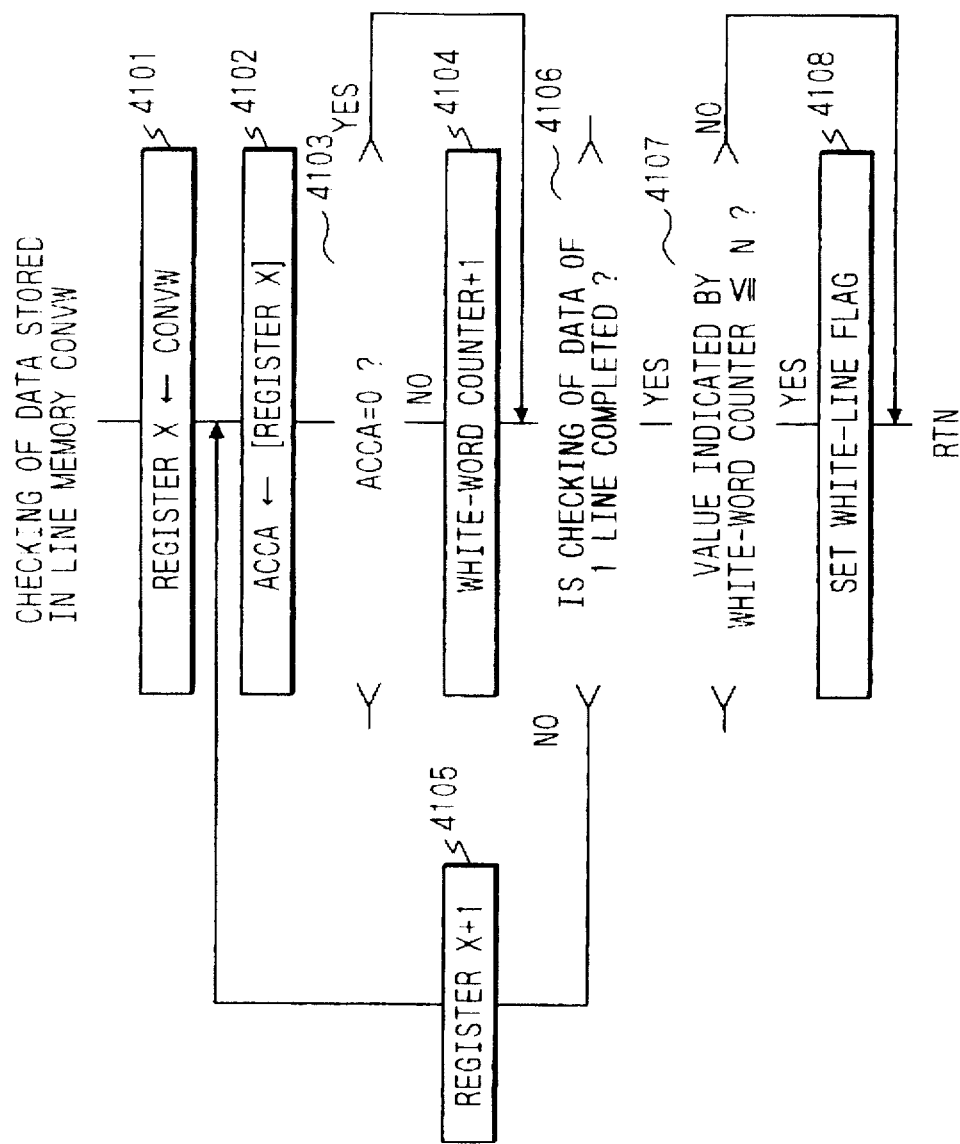
FIG. 36 is a flowchart for illustrating an operation of checking data of a CONVW line memory.

In step 4007, the data stored in the line memory CONVW is checked and it is judged whether or not the checked data meets the conditions of a thinning line, the contents of which are illustrated in FIG. 36. Then, the result of the judgement is checked in the next step 4008. If it is judged that the data represents a white line, it is further judged in step 4010 whether or not the searching of the range of the value indicated by the parameter C0-ZLINE is completed. If judged as not completed, the program returns.

If judged as completed, or if judged in step 4008 as a white line, the flag B of the address register CONVW is set in step 4009 as "1", and then the program returns. Thus, in the subsequent step (namely, step 3013 of FIG. 25), the data stored in the line memory CONVW is treated as representing a thinning line (namely, an object to be thinned).

FIG. 36 is a detailed flowchart of a program for performing a processing in step 4007. Namely, the leading address of the line memory CONVW is first set in the register X in step 4101. Then, in step 4102, the contents of data stored at an address indicated by the register X is loaded into an accumulator (ACCA) of the ALU 1202. This processing is to read data of one word (namely, 16 bits) from the RAM 200 through the internal data bus 1800 of FIG. 7.

Subsequently, it is judged in step 4103 which of white data (namely, all of the 16 bits of the read data represent white pixels) and non-white data (namely, the 16 bits of the read data include at least one bit representing a black pixel) the read data is. If the read data is non-white data, the non-white word counter (namely, the register 556) is incremented in step 4104. Then, it is judged in step 4106 whether or not the checking of the data of one line is completed. If not completed, the register X is incremented in step 4105 and the program returns to step 4102 and the foregoing process is repeated.

If completed, it is determined in step 4107 whether the number counted by the non-white word counter is equal to or less than the preset number N. If equal to or less than N, a flag indicating that the checked line is a white line is set in step 4108. In step 4008 of FIG. 35, this flag is checked.

Incidentally, as is apparent from the foregoing description, the compression/expansion device 1 of this embodiment may be adapted to perform only the image conversion. Alternatively, the compression/expansion device 1 of this embodiment may be adapted to perform the expansion operation without outputting data and can check errors in the code data and detect the number of lines of a page and the number of white lines at the top and bottom portions of each page at a high speed.

1-16. Example of Operation of Facsimile System

Figure 37:
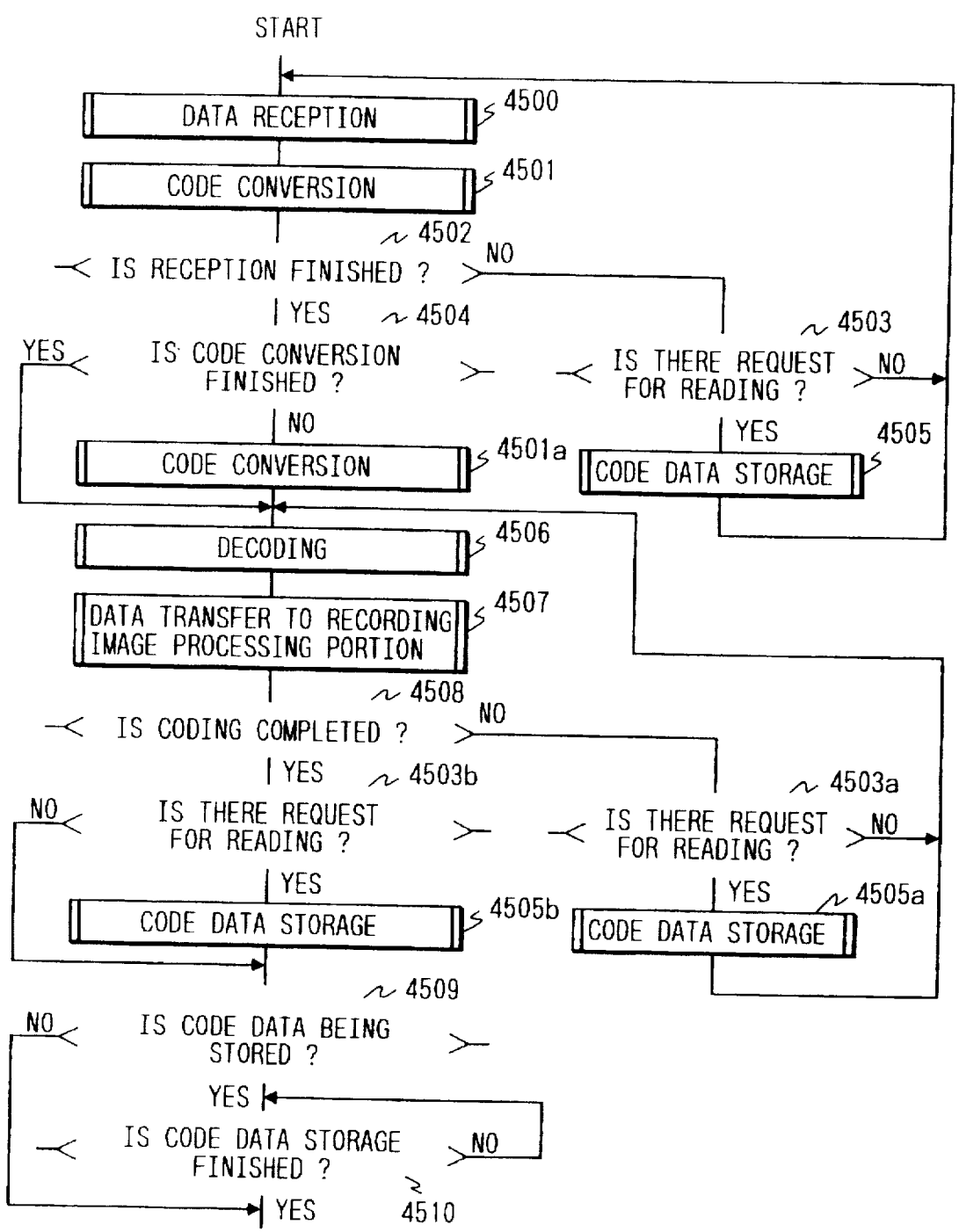
FIG. 37 is a flowchart for illustrating an operation of the facsimile system of FIG. 7.

Next, an example of an operation of the facsimile system of FIG. 8, which operation is connected with the compression/expansion device 1, will be described hereinbelow. FIG. 37 is a flowchart of a program for performing such an example of an operation of the facsimile system.

First, in step 4500, received code data of one line is transferred from the modem 19 to the compression data memory 16. The received code data is facsimile standard code data. Then, in step 4501, a code conversion of the received code data of one line is performed by the compression/expansion device 1. The data obtained as the result of this code conversion (hereunder sometimes referred to as converted code data) is transferred to the compression data memory 16. Incidentally, the decoding channel and the decoding channel used at that time are indicated by the MPU.

Further, it is checked in step 4502 whether or not the reception of the data of one page is finished. If not finished, it is checked in step 4503 whether or not there is a request for reading of image data representing the original image to be transmitted to this facsimile system. If there is such a reading request, the image data representing the original image is read by the compression/expansion device 1 from the RAM 28. Alternatively, the image data is directly inputted from the read-image processing portion 21. Then, the read image data (of one line) is compressed. Further, code data obtained by the compression is transferred to the compression data memory 16. The coding channel used at that time is indicated by the MPU.

When the processing of step 4505 is finished, the program returns to step 4500. Further, if it is judged in step 4503 that there is no request for reading of the image data, the program returns to step 4500 directly.

Upon completion of the reception of the image data of one page, it is judged in step 4504 whether or not the code conversion of the code data of one page is finished. If not finished, the code conversion of the remaining part of the code data is performed by the compression/expansion device 1 in step 501a consecutively.

When the code conversion of the code data corresponding to the image data of one page is completed, the compression/expansion device 1 performs an expansion of the converted code data corresponding to the image data of one page, which code data is stored in the compression data memory 16, and thereafter effects a transfer of the restored image data obtained by the code conversion to the recording image processing portion 22. At that time, the MPU determines the enlargement or reduction ratio for adjusting the size of the recording image (namely, the image to be recorded by the LBP) to that of recording paper used in the LBP on the basis of the number of lines of one page, which is obtained by the compression/expansion device 1 when the code conversion is performed, and the MPU indicates the determined ratio to the compression/expansion device 1. Similarly, the MPU can indicate cutting lines at the top and bottom portions of the page on the basis of the white lines arranged in a row at the top and bottom portions of the page. Moreover, the MPU indicates the decoding channel to be used.

When finishing the processing of step 4507, it is checked in step 4508 whether or not the code data corresponding to the image data of one page is completed. If not, it is further checked in step 4503a whether or not there is a request for reading image data representing the original image to be transmitted to the facsimile system. If there is not such a request, the program returns to step 4506. If there is such a request, a compression of the image data of one line is performed in step 4505a and then the program returns to step 4506.

If it is judged in step 4508 that an expansion and recording processing of code data of one page is completed, it is further checked in step 4503b whether or not there is a request for reading the image data of another page. If there is such a request, the compression/expansion device 1 commences a sequence of processing (namely, inputting and compressing) on the image data corresponding to the remaining part of the original image from the currently processed line to the transmitted last line thereof in step 4505b. Furthermore, the sequence of processing is performed until the termination thereof is detected in step 4509 or 4510.

Thus, the code conversion operation of the received code data, the expansion and recording operations of the converted code data and the compression operation of the original image data can be performed by using only one of the compression/expansion device 1 of the present invention in parallel with one another. Further, the system employing the compression/expansion device of the present invention can obtain the parameters used to determine the enlargement/reduction ratio and the cutting lines at the top and bottom portions of a page when the code conversion is performed. Thereby, the system can perform the necessary enlargement/reduction and the cutting of the white lines simultaneously with the expansion of the converted code data. Further, the LBP usually records image data at a regular speed of 1 line/milli-second (ms). The compression/expansion device 1 of the present invention can easily follow the recording operation of the LBP 2 effected at such a speed. Therefore, a mass image page memory is not necessary for storing the restored image data of one page or so.

Moreover, in case where the code data corresponding to the original image, which is stored in the compression data memory 16, is transmitted, the compression/expansion device 1 of the present invention converts the stored code data to another type of code data, which meets the performance of a receiving facsimile system, and then modulates the code data obtained as the result of the code conversion and finally transmits the modulated code data to the circuits.

Incidentally, this facsimile system can perform a copying operation (namely, what is called an isometrical copying operation, a reductive copying operation, or a multiple copying operation) of printing a document, the corresponding image data of which is read by the image scanner 23. This will be briefly described hereinbelow.

The isometrical copying is performed by employing one of the following methods. A first method is to perform a DMA transfer of original image data to the recording image processing portion 22 through the RAM 28 under the control of the image bus control unit 100 of the compression/ expansion device 1. Further, a second method is to directly input original image data from the read-image processing portion 21 to the internal RAM 200 of the compression/ expansion device 1 and thereafter transfer the input image data to the recording image processing portion 22 directly.

Further, the reductive copying is achieved by first inputting original image data to the internal RAM 200 of the compression/expansion device 1 through the external RAM 28 and next performing a reduction on the inputted image data and finally outputting the resultant data to the recording image processing portion 22 through the external RAM 28.

Moreover, the multiple copying is effected as follows. Namely, original image data is compressed by the compression/expansion device 1. Then, the compressed data is stored in the compression data memory 16. Next, the compression/expansion device 1 performs an expansion on the code data (namely, the compressed data). Subsequently, the restored data (namely, the expanded data) is transferred to the recording image processing portion 22. The foregoing process is repeated a given number of times, which is equal to the number of necessary duplicates. Apparently, a reductive multiple-copying can be achieved by performing a reduction on the compressed data instead of performing the expansion in the foregoing process.

As is apparent from the foregoing description, the first embodiment has the following advantages.

Namely, in case of the first embodiment, line memories necessary for an image processing are provided in the internal memory. Thus, the number of times of accessing the external bus can be decreased considerably. Further, an image processing and a data input/output operations can be effected in parallel with each other in the first embodiment. As a result, the processing speed can be greatly increased.

Moreover, memory regions obtained by dividing the linear address space of the internal memory according to a processing to be performed is used as line memories. Thus, the first embodiment can flexibly cope with various processing to be performed on data representing a variety of images.

Furthermore, the first embodiment can perform a compression operation at a high speed by coding line memories of the internal memory and performing a high-speed DMA data transfer to the line memory and effecting the internal processing and the data input/output processing in parallel with each other.

Further, the first embodiment can perform an image conversion at a high speed simultaneously with image data compression by effecting the image conversion by using the line memories of the internal memory.

Additionally, the first embodiment can perform an expansion operation at a high speed by effecting the decoding of the code data by using the line memories of the internal memory and effecting the internal processing and the data input/output processing through the external bus in parallel with each other.

Moreover, the first embodiment can perform an image conversion at a high speed simultaneously with image expansion by effecting the image conversion by using the line memories of the internal memory.

Furthermore, the first embodiment can perform an image data compression, a code data expansion and a code conversion by effecting each of a decoding, a coding and an image conversion by using the line memories of the internal memory. Simultaneously, the first embodiment can perform an image conversion at a high speed.

In addition, the first embodiment can easily control parallel operations of effecting the internal processing, which should be performed for the compression, expansion and code conversion, and the data input/output processing to be performed through the external bus by establishing the one-to-one correspondence among the line memory regions of the internal memory, the address registers for holding the leading addresses of the line memories and the flag information, and the DMA transfer address counter.

Further, in case of the first embodiment, overhead due to the data transfer between the line memories can be eliminated and the processing can be carried out more quickly by effecting the data transfer between the line memories without actual data transfer therebetween.

Furthermore, for instance, in case where data input/output operation of an image processing unit is effected through a line buffer of the line buffer, the data transfer between the line buffer and the Input/Output (I/O) device can be achieved without interrupting the operation of the image processing unit. Consequently, reduction in processing speed, which is due to data queuing, can be prevented.

Moreover, when performing a code conversion which includes a decoding and coding, the number of lines of one page and the number of white lines (namely, cutting lines) at the top and bottom portions of one page can be obtained as data representing attributes of the conversion code and can be read by the control portion connected to the external bus. Therefore, for example, in case that the image processing unit (or this embodiment) is used as a compression/ expansion device of a facsimile system, a mass image page memory for storing the restored image data because the control portion thereof can determine a reduction ratio for adjusting the size of an image to be recorded to a recording paper size and also determine the cutting lines before effecting the expansion of the converted code data, and can perform an image conversion for regulating the size of an image, which should be recorded, simultaneously when effecting an enlargement of an original image, and can directly restore image data after the regulation of the size and record the restored image.

Further, this embodiment can cut white lines in a row at the top or bottom portion of one page and can perform an expansion operation without outputting data, by controlling data output each time data of one line is processed.

Furthermore, in the expansion or code conversion operation, this embodiment can obtain data free from a decoding error by performing the error processing of a decoding error. In addition, the checking and error-processing of a decoding error are conducted in the device (namely, this embodiment). Therefore, reduction in the processing speed can be prevented.

Besides, this embodiment can perform enlargement/ reduction in the secondary scanning direction simultaneously with an enlargement/code conversion operation or a code conversion operation.

Further, preservability of a fine line (e.g., a ruled line) of an image can be improved by preferentially thinning a line having a small number of black pixels in the reduction of the secondary scanning direction.

Additionally, an image processing system of the present invention can be operated as two compression, expansion, or code conversion devices by the external control device by changing a channel between the coding and decoding channels.

Next, another embodiment of the present invention will be described hereinafter.

Figure 38:
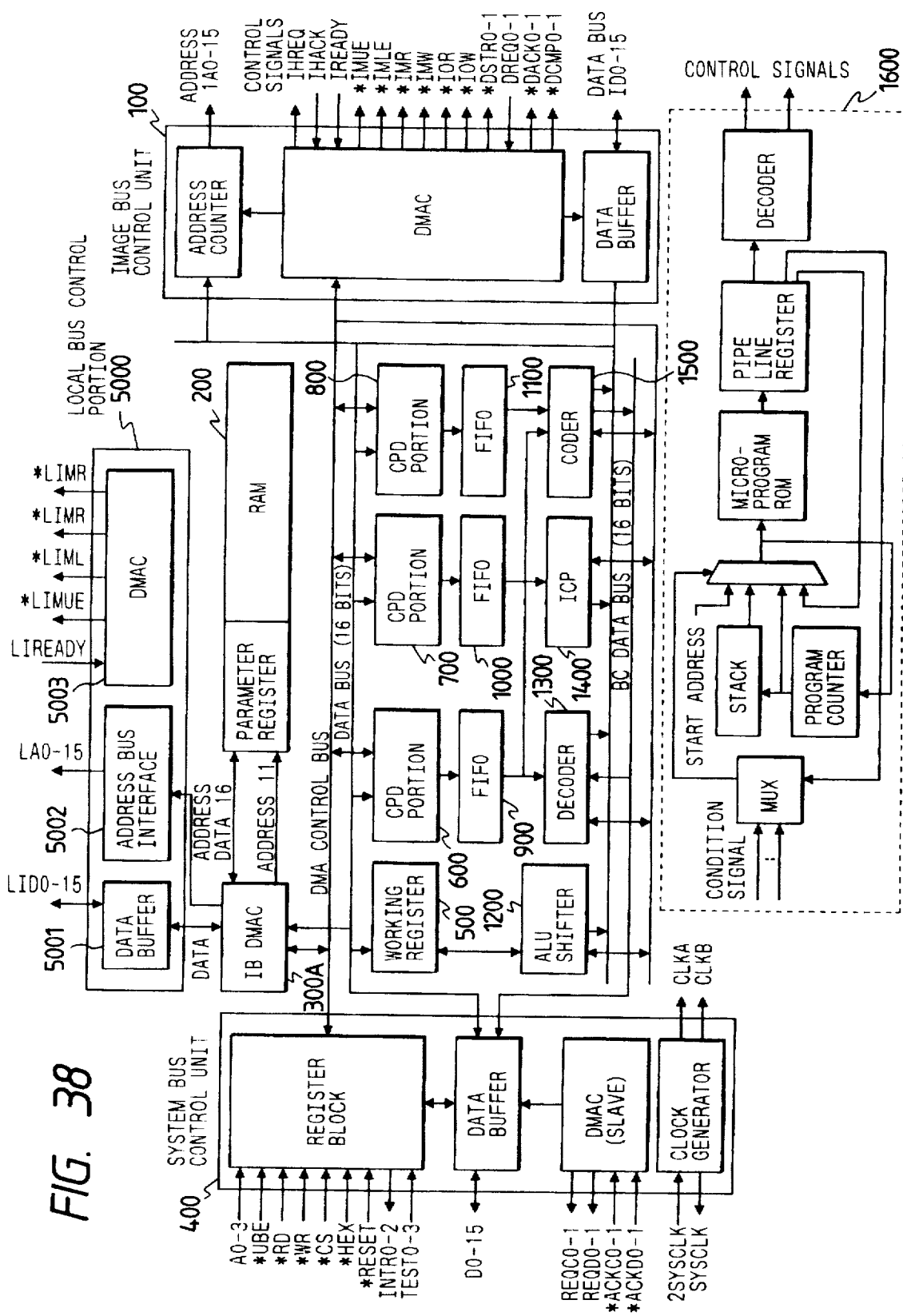
FIG. 38 is a schematic block diagram for illustrating the configuration of another example of a compression/expansion device according to the present invention (namely, a second embodiment of the present invention)

FIG. 38 is a schematic block diagram for illustrating the configuration of another compression/expansion device of the present invention (namely, another embodiment (hereunder referred to as a second embodiment) of the present invention)) will be described hereinbelow.

In this compression/expansion device 1A, a local bus control portion 5000 is further provided in order to enable to connect a local memory, which is dedicated to the compression/expansion device 1A, to an external circuit. Further, a DMA transfer of data between this local bus control portion 5000 and the local memory is possible. Moreover, the local bus control portion 5000 is provided with a data buffer 5001, an address bus interface 5002 and a DMA controller 5003.

To realize expansion of the line memories of the internal RAM 200 to external local memories, the internal configuration of the internal bus DMA control portion 300 of FIG. 16 is changed as that of the internal bus DMA control portion 300A. The rest of the configuration of the compression/expansion device 1A is the same as that of the configuration of the compression/expansion device 1A.

Figure 39:
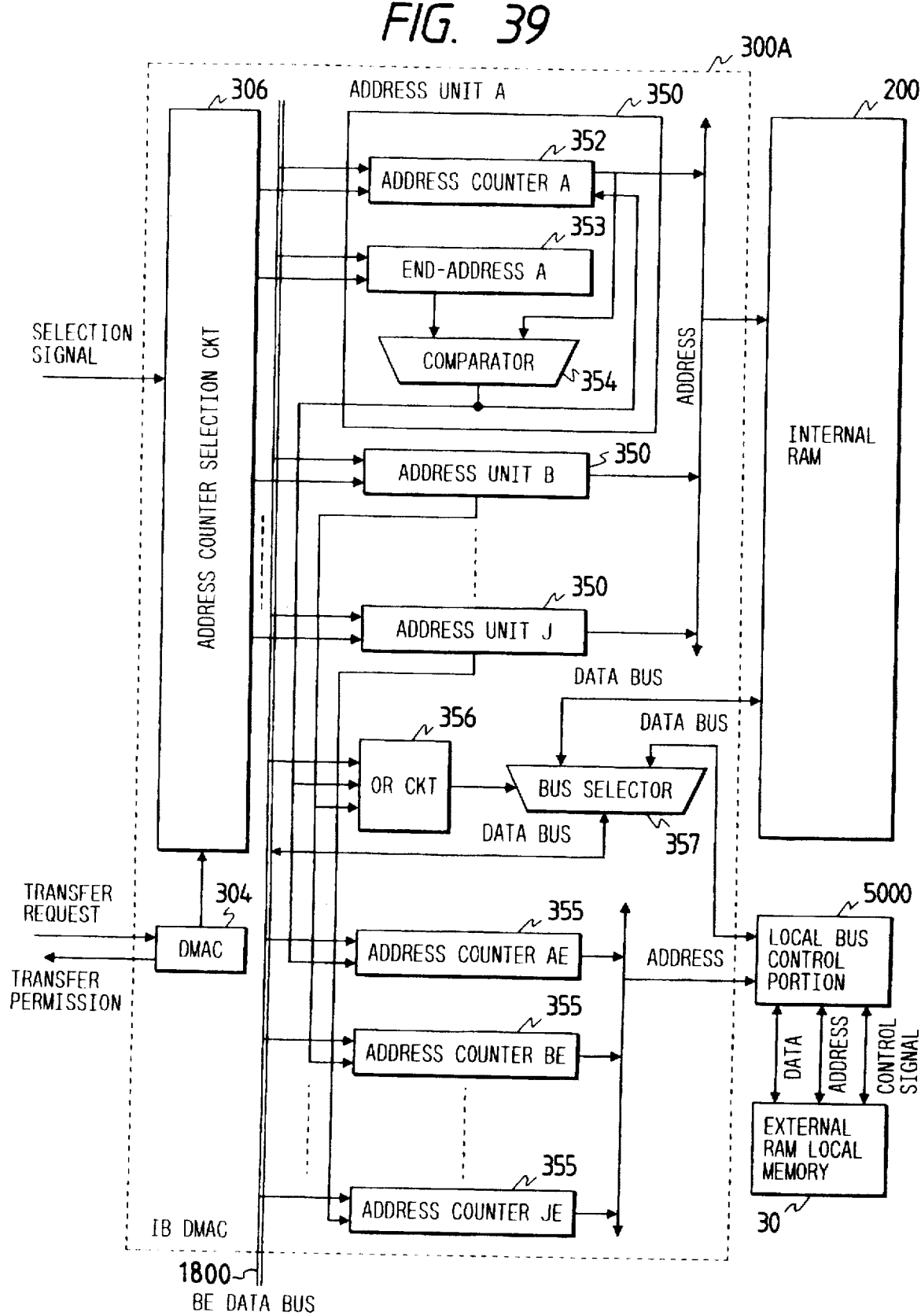
FIG. 39 is a schematic block diagram for illustrating change in the configuration of the system, which change is attended by extending or expanding a line memory, namely, for illustrating the configuration of an internal-bus DNA control portion of the system of FIG. 38.

FIG. 39 is a schematic block diagram for illustrating the configuration of the internal bus DMA control portion 300A. In this figure, reference numeral 350 denotes address units A to J, which are in a one-to-one correspondence with the line memories of the RAM 200. Each of the address units 350 has the same internal-structure and consists of an address counter 352, an end-address register 353 and a comparator 354. Further, in this figure, reference numeral 352 designates address counters A to J of the address units (A to J) 350, which correspond to the address counters (A to J) of FIG. 16, respectively, and are used to generate addresses of the corresponding line memories of the internal RAM 200.

A comparator 354 of each of the address units 350 outputs "1" when a value indicated by the address counter 352 is equal to a value indicated by the end-address register 353. This output of the comparator 354 is supplied not only to the address counter 352 of the same address unit but also to the corresponding address counter outside the same address unit.

Correspondingly to each of the address units A to J, an address counter (AE, ..., IE or JE) 355 is provided in order to generate addresses of a region of the local memory, which is used as an expanded or extended region (hereunder sometimes referred to as a line memory expansion region) for one of the line memories. To this address counter 354, an output of the comparator 354 of the corresponding address unit 350 is inputted.

In addition, an OR circuit 356 and a bus selector 357 are further provided in the portion 300A. The OR circuit 356 applies a signal representing the logical OR between outputs of the comparators 354 of the address units (A to J) 350 to the bus selector 357 as a selection signal. The bus selector 357 connects the internal data bus 1800 to the internal RAM 200 when the selection signal indicates "0". Further, the bus selector 357 connects the internal data bus 1800 to the local bus control portion 5000.

Furthermore, the address counter 352, the end-address register 353 and the address counter 355 can be initialized through the internal data bus 1800.

The DMA control portion 304 and the selector 306 used for selecting the address counters are the same as shown in FIG. 17. Incidentally, objects to be selected by the selector 306 are the address counters 352 and the end-address registers 353.

Additionally, in FIG. 39, reference numeral 30 represents an external RAM (namely, the local memory dedicated to the compression/expansion device) connected to the compression/expansion device 1A.

Next, an operation characteristic of this compression/expansion device 1A will be described hereinbelow. Incidentally, other operations thereof are the same as of the compression/expansion device 1.

Figure 40:
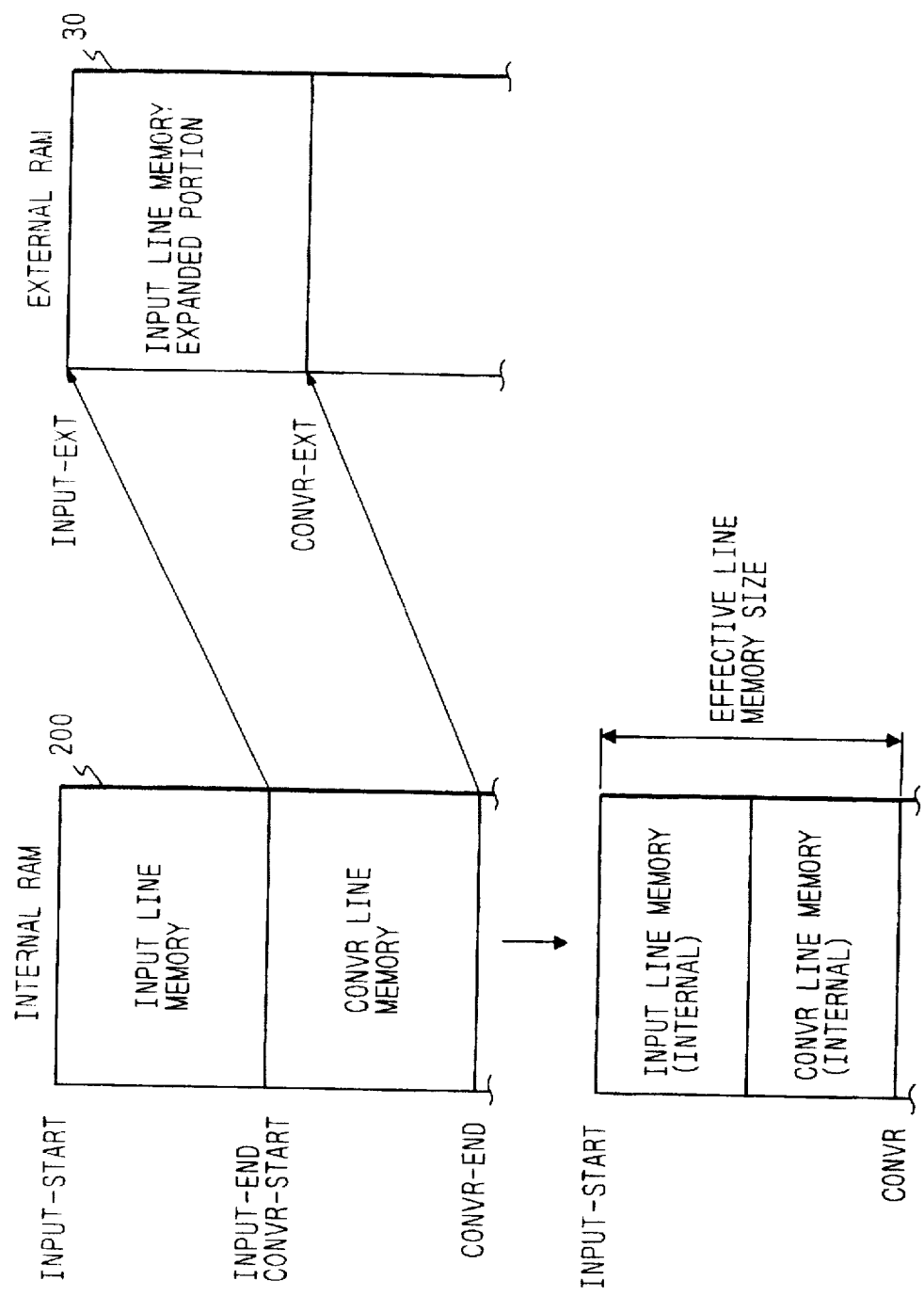
FIG. 40 is a diagram for illustrating an access to the extended line memory.

Here, an operation of inputting image data to the line memories of the RAM 200. FIG. 40 is a diagram for illustrating an memory access operation thereof.

After initialization of the image bus control portion 100A, initialization of the internal bus DMA control portion 300A is performed. In the initialization of the portion 300A, the microprogram sets a start address (INPUT-START) and an end address (INPUT-END) of the line memory INPUT of the internal RAM 200 in the address counter A and th end-address register A (352) of the address unit A (352), respectively. Further, a start address (INPUT-EXT) of the line memory expansion region corresponding to the line memory INPUT of the external RAM 30 in the address counter AE (355). Incidentally, the end address (INPUT-ENI)) and the start address (INPUT-EXT) may be calculated or preset in a register of the working register 500.

If the device is activated in such a state, image data inputted through the internal data bus 1800 from the image bus control portion 100 is written to a location corresponding to the start address of the line memory INPUT of the internal RAM 200. Each time one word is inputted, the address counter A (352) is incremented. Thus, the data are serially written to the line memory INPUT of the internal RAM 200 from the leading address thereof.

When the address counter A (352) is incremented up to the value or address (INPUT-END), an output of the comparator A (354) becomes equal to "1". As the result, the address counter A (352) is disabled. Further, the bus selector 357 changes the composing element to be connected with the internal data bus 1800 from the internal RAM 200 to the local bus control portion 5000.

Thereafter, image data inputted trough the internal data bus 1800 is written to the address of the external RAM 30 indicated by the address counter AE (357). Each time one word is inputted, the address counter AE (355) is incremented. Therefore, the subsequent data are serially written to the line memory expansion region of the line memory INPUT of the external RAM 30 from the leading address thereof.

As described above, during inputting image data of one line, the counterpart to be connected to the internal data bus is automatically changed from the internal RAM 200 to the external RAM 30 to write the image data thereto. Consequently, as illustrated a lower part of FIG. 40, a long or large line memory INPUT exceeding the storage region of the line memory of the internal RAM 200 (namely, including the expansion region) can be treated as if this long line memory INPUT were provided in the RAM 200. In the foregoing description, an operation of inputting image data to the line memory INPUT has been described by way of example. Apparently, the other line memories can be expanded similarly as in case of the line memory INPUT. As a result of employing such an expansion of the line memory, the limitation to the "length" (or capacity) of the line memory can be reduced.

Incidentally, an access to the line memory expansion region of a line memory means an access to the external RAM and takes a relatively long time in comparison with an access to a memory region of the internal RAM 200. However, this embodiment provided with line memory expansion regions in the external RAM has advantages in that increase in the size and cost of the compression/expansion device can be smaller in comparison with the device provided with the line memory of the same "length" in the internal RAM.

Incidentally, a memory, to which input image data is written, may be changed from the internal RAM to the external RAM by counting words and then comparing the count with a predetermined number instead of comparing the memory address to the end address.

In case of the second embodiment of the present invention, by providing an external memory to be used as an expansion memory region, image data of a long line exceeding limitation to various processing due to memory capacity of an internal memory can be processed. Moreover, increase in memory capacity of the internal memory can be suppressed.

Hereinafter, another facsimile system (hereunder sometimes referred to as a third embodiment) of the present invention will be described by referring to the accompanying drawings.

Figure 41:
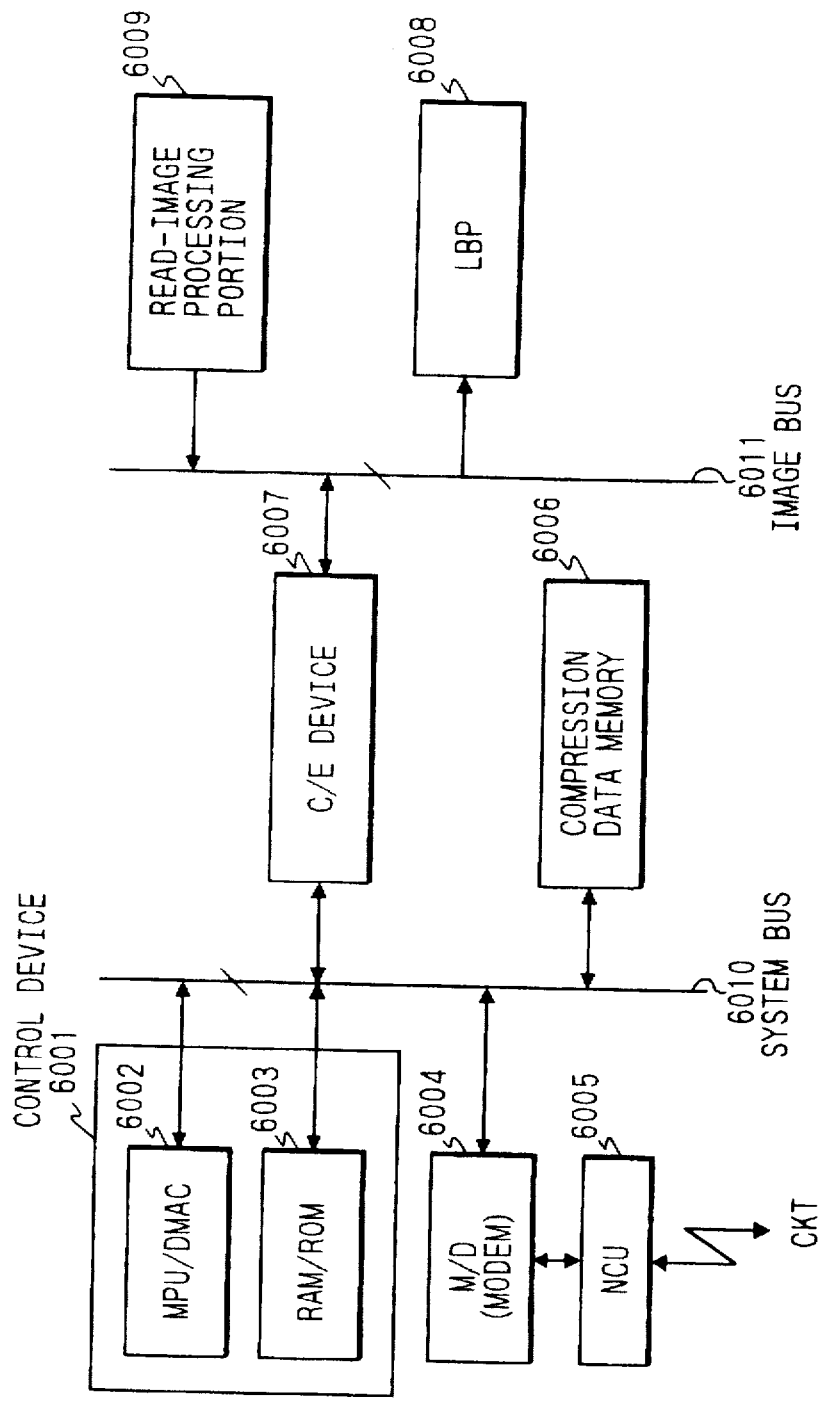
FIG. 41 is a schematic block diagram for illustrating the configuration of a further example of a facsimile system according to the present invention (namely, a third embodiment of the present invention)

FIG. 41 is a schematic block diagram for illustrating the configuration of this facsimile system (namely, the third embodiment). In this figure, reference numeral 6001 designates a control device for controlling the entire facsimile system and for performing the facsimile control procedures or the like. Incidentally, as shown in this figure, the compression/expansion device 6001 consists of an MPU 6002, which is provided with a DMAC, for controlling the entire facsimile system and the facsimile procedure, a peripheral circuit and a memory 6003, which is composed of a ROM and a RAM, for storing control programs and data. Further, reference numeral 6004 designates a modem for performing a modulation and a demodulation of a circuit signal, which is connected to a telephone circuit through an NCU 6005, a compression data memory 6005 for tentatively storing compression data (namely, code date) corresponding to an original image to be transmitted, and 6007 a compression/enlargement device having functions of coding, decoding, a code conversion and an image conversion as will be described below in detail.

On the other hand, reference numeral 6008 denotes an LBP recording unit (hereunder referred to simply as an LBP) for recording a received image on paper of a regular size. An operating principle of this LBP is similar to that of the common LBP. Reference numeral 6009 designate a read-image processing portion for inputting image data of an original image of one page to be transmitted, which is read by an image scanner, by performing necessary processing such as a thresholding, a smoothing, an error diffusion. Incidentally, reference numerals 6010 and 6011 represent a system bus and an image bus, respectively.

Figure 42:
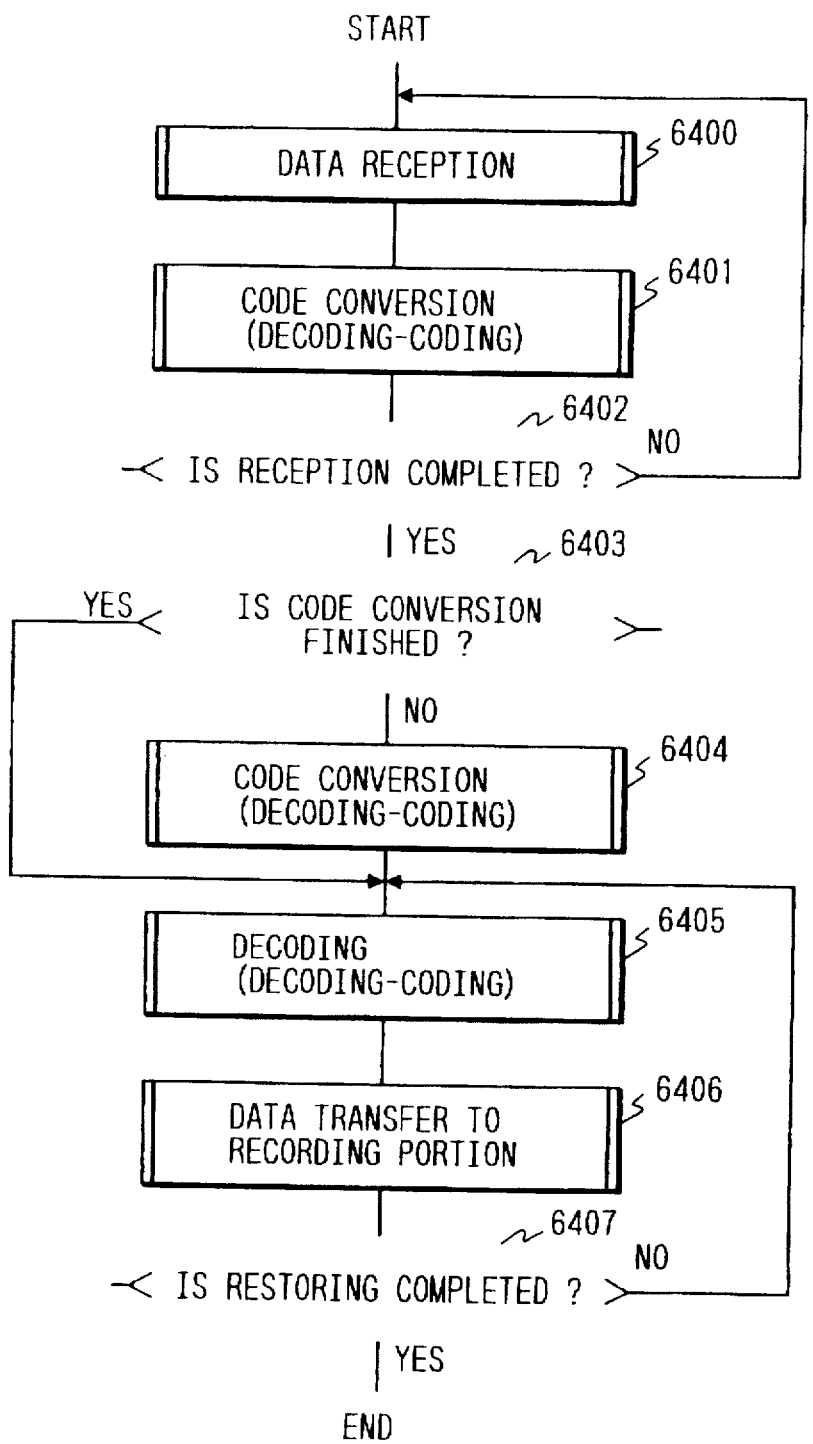
FIG. 42 is a flowchart for illustrating a receiving operation of the third embodiment of the present invention.

Next, a receiving operation of this facsimile system will be described hereinbelow. FIG. 42 is a flowchart for illustrating the receiving operation of this facsimile system.

When the system starts performing enters a message sending procedure (namely, enters Phase C of the standard facsimile protocol), image code data A (namely, MH, MR or MMR code obtained by the facsimile standard coding prescribed in CCITT Recommendation T4 and T6) inputted from the circuit and modulated by the modem 6004 is stored in the compression data memory 6006 under the control of the control device 6001 in step 6400. Incidentally, the code data A is temporarily stored in the compression data memory 6006 and is discarded when the code data A becomes unnecessary. Therefore, a storage area of the compression data memory 6006 occupied by the code data A is very small.

Further, the compression/expansion device 6007 reads the code data A from the compression data memory 6006 and performs a code conversion. Moreover, the device 6007 writes code data B obtained by effecting the code conversion to the compression data memory 6006 in step 6401. This code conversion is a combination of a coding for restoring image data from the code data A (namely, the MH, MR or MMR code) and a re-coding of the image data performed recording to MG3 coding, as will be described in detail later. The code data B is retained or stored in the memory 6006 until the recording thereof is completed. By the decoding of this code conversion, parameters (e.g., the number of lines and that of white lines in a row at the top and bottom portions of a page) required for determining the enlargement/reduction ratio to be used for performing an enlargement/reduction necessary at the time of a recording thereof, are calculated and preserved in the compression/expansion device 6007. Incidentally, the control device 6001 can refer to these parameters.

Then, the processing of steps 6400 and 6401 is repeatedly performed on each line. When the reception of the code data A of one page is completed (namely, the program exits from step 6402 to YES-branch) and there is code data A, which is not processed (namely, is not decoded), in the compression data memory 6005 (namely, the program exits from step 6403 to NO-branch), the compression/expansion device 6007 performs a code conversion, which is the same as the code conversion performed in step 6401, on the code data A in step 6404.

Upon completion of the conversion of the code data A (corresponding to the image data of one page) to the code data B as described hereinabove, the control device 6001 reads the parameter representing the number of lines of one page, which is obtained at the time of the conversion, from the compression/expansion device 6007. Further, the device 6001 determines the enlargement/reduction ratio on the basis of the parameter representing the number of lines of one page and sets control parameters such as the enlargement/reduction ratio in the compression/expansion device 6007 and commences a processing required for the recording (incidentally, an operation of the control device 6001 is not illustrated in FIG. 42).

The compression/expansion device 6007 reads the code data B from the compression data memory 6006 in word units serially and then decodes the read code data B. Thereafter, the compression/reduction device 6007 repeatedly performs operations of effecting an enlargement or reduction of an image represented by the restored image data of each line and transferring the data obtained as the result of the enlargement or reduction directly to the LBP 6008 until such a processing of the image data of one page is completed. In parallel with this operation, the LBP 6008 records the image data transferred thereto (see steps 6405, 6406 and 6407). This operation of performing a decoding and enlargement/reduction is effected by the LBP 6008 at a high recording speed thereof. Incidentally, the code data of one page is preliminarily stored in the compression data memory 6006. Therefore, in spite of the fact that this compression/enlargement is not provided with an image page memory differently from the conventional device, the operation of recording the image data of one page is not interrupted.

Additionally, a line memory of small memory capacity may be provided on the image bus 6011 in order that an image data transfer from the compression/expansion device 6007 to the LBP 6008 is effected through this line memory.

In addition, the MG3 coding adopted in the re-coding of the image data is described in detail. In the MG3 coding, image data corresponding to one line of one page is initially coded according to the facsimile standard coding such as MH, MR or MMR coding to obtain provisional code data for each line. In cases where a data length of the provisional code data is equal to or shorter than that of the image data of one line (or a summed data length obtained by summing the data length of the image data of one line and ten and several bits of an expansion code), the provisional code data is adopted as code data B. In contrast, in cases where a data length of the provisional code data is longer than that of the image data of one line (or the summed data length), a code obtained by adding the expansion code to the image data of one line is adopted as coded data B.

Moreover, the internal configuration of the compression/reduction device 6007 is the same as illustrated in FIG. 7. The image bus control unit 100 is composed of the DMA controller for controlling the transfer of data between the compression/reduction 6007 and each of the LBP 6008, the read-image processing portion 6009 and the above-mentioned line memory provided on the image bus 6011, the address counter and the data buffer for buffering transfer data. Further, the system bus control unit 400 is comprised of the register block for holding control information set by the control device 6001, the data buffer and the (slave) DMA controller and the clock (pulse) generator. The decoder 1300 is provided with means for detecting white lines, as well as decoding errors. Further, the image conversion portion 1400 is provided with means for counting the number of words corresponding to one line (namely, the width of one line). As will be described later, the image conversion (namely, the enlargement/reduction) in the secondary scanning direction is performed by controlling an output of image data (namely, a thinning and an interpolation). The coder 1500 is comprised of means for counting codes corresponding to one line (or words of code data corresponding to one line) and means for comparing the number of codes corresponding to one line with the width of one line to select one of MH, MR, MMR and MG3 codes.

Incidentally, a control bus or line (not shown) is provided between the microprogram control portion 1600 for controlling each of the other portions according to the commands and the parameters, which are set by the control device 6001, and each of the other portions. The working register 500 is used as a storage region in which the address registers corresponding to the line memories of the RAM 200 and storage areas for storing the parameters and the flag information. The ALU 1200 provides functions of performing arithmetic and logic operations and shifting data. The microprogram control portion 1600 uses the arithmetic portion 6032 to count lines of one page and white lines in a row at the time of effecting the code conversion and operate and check the states of the address registers of the working register 1500 (corresponding to the line memories).

Next, an operation of the compression/expansion device 6007 at the time of performing the reception of image data will be outlined hereinbelow.

First, a code conversion operation (steps 6401 and 6404 of FIG. 42) is similar to the operation illustrated in FIG. 31.

Namely, the control unit 6001 effects the setting of various registers of the register block of the system bus unit 400 and sets code conversion or coding commands in the command register. When the commands are set, the microprogram control portion 1600 loads the coding parameters and the decoding parameters, which are set in the parameter registers of the RAM 200 by the control device 6001, into the working register 500. Moreover, the start addresses held in the address registers of the working register 500 are established by the control portion in the address counters of the internal bus DMA control portions 300, which correspond to the line memories DECODE, D0R/D1R, CONVR, CONVW, CODING, C0R/C1R, BC1 and BC (see FIG. 44). The number of words composing the code data A of one line (namely, the width of the line) indicated by the control device 6001 is set in the decoder 1300 and the changing pixel detecting portion 600. The enlargement/reduction ratio (in the main scanning direction) set in the parameter registers of the RAM 200 is further set in the image conversion portion 1400 by the control device 6001. Furthermore, the coding mode (one of MH, MR, MMR and MG3 codes (in this case, MG3)) indicated by the control device 6001 is set in the coder 1500. Upon completion of such an initialization operation, the decoder 1300 is activated. Incidentally, the width of a line is reset or updated correspondingly to each line.

Thereafter, the code data stored in the compression data memory 6006 is read in word units to the decoder 1300 through the data buffer of the system bus control unit 400.

Simultaneously, the data (namely, image data of reference lines) stored in the line memory D0R/D1R (hereunder sometimes abbreviated as DR) is read in word units therefrom and is then inputted to the changing pixel detection portion 600. Moreover, the changing pixel address information and the color information (indicating white or black) are inputted to the decoder 1300 through the FIFO register 900. Then, a decoding is effected. Thereafter, the image data restored by the decoding is transferred to the line memory DECODE. When the decoding of the image data of one line is completed, the decoder 1300 outputs a condition signal indicating whether or not the line represented by the restored data is a white line. The microprogram control portion 1600 counts the numbers of white lines at the top and bottom portions of the page on the basis of this condition signal.

Further, when the image data of one line is restored in the line memory DECODE, a flag control operation is effected. For instance, the flag bit of the corresponding address register is set as indicating that there is effective data. Furthermore, the flag bit of the address register corresponding to the line memory CONVR is referred to. If it is empty, the data stored in the line memory DR is transferred to the line memory CONVR. Moreover, the data previously stored in the line memory CONVR is transferred to the line memory DECODE. Such a transfer of the data is actually performed by exchanging the contents (namely, the start addresses and the flag bits) of the address registers of the working register 500 with each other and thereafter setting the start addresses, which are stored as the result of the exchange in the address registers, in the corresponding address counters of the internal bus DMA control portion 300. Incidentally, transfers of data among the line memories are similarly performed. After such an operation, the microprogram control portion 1600 activates the decoder 1300 again and starts the decoding of image data of the next line.

Thus, the decoding of image data of lines, the number of which is indicated by the control device 6001, is performed by using the line memories DECODE, DR and CONVR in a circular manner.

Further, the microprogram control portion 1600 refers to flag bits of the address registers corresponding to the line memories CONVR and CONVW. Furthermore, if there is effective data in the line memory CONVR and the line memory CONVW is empty or idle and the image conversion portion 1400 does not work, the microprogram control portion 1600 activates the image conversion portion 1400.

Subsequently, the image data stored in the line memory CONVR is read in word units and is inputted to the changing pixel detection portion 700 in word units. The changing pixel address information and the color information is serially inputted to the image conversion portion 1400 through the FIFO register 1000. The image conversion portion 1400 obtains the changing pixel addresses after the enlargement/reduction, by multiplying a value, which is indicated by the address information, by the enlargement/reduction ratio. Further, the portion 1400 generates image data as a result of enlargement/reduction in the main scanning direction by inserting pixels between the changing pixels by effecting an interpolation. The resultant image data is transferred to the line memory CONVW in word units.

In case where the main scanning conversion of one line is finished, the microprogram control portion 1600 sets the flag bit of the address register corresponding to the line memory CONVR as being in an off-state. Further, the control portion 1600 sets the flag bit of the address register corresponding to the line memory CONVW as indicating that there is effective data. Moreover, the control portion 1600 refers to the flag bit of the address register corresponding to the line memory CODING. If the line memory CODING is empty or idle (namely, the coding is completed), the data stored in the line memory CONVW is transferred to the line memory CODING, and the data previously stored in the line memory CODING is transferred to the line memory CR. In this manner, the image conversion in the main scanning direction of image data of lines of the indicated number by using the line memories CONVW, CODING and CR in a circular manner.

Further, the microprogram control portion 1600 refers to the flag bits of the address registers of the line memories CODING and BC. If there is effective data in the line memory CODING and conversely the line memory CR is empty and the coder 1500 is not working, the coder 1500 is activated.

The image data of the reference line and the coding line are read from the line memories CR and CODING in word units and are then inputted to the changing pixel detection portions 600 and 800, respectively. The changing-pixel address information and the color information are inputted through the FIFO registers 900 and 1100 to the coder 1500 whereupon code data is generated and then the generated code data is outputted to the line memory BC1 in word units. Incidentally, the coder 1500 is in the MG3-coding-mode. In this case, the code first generated is MH, MR or MMR code. The codes of one line are counted, and thereafter the value of the count is compared with the width of one line of the image data after the image conversion in the main scanning direction, which width is set by the microprogram control portion 1600. If the former exceeds the latter, MG3-code data is selected as the code data to be generated. Namely, the line memory BC1 is re-written by using data (namely, MG-3 code data) obtained by adding expanded code to the data stored in the line memory CODING.

When the coding of image data of one line is finished, the microprogram control portion 1600 sets the flag bit of the address register corresponding to the line memory BC1 as indicating that there is effective data. Further, if the line memory BC is empty or idle, the data stored in the line memories BC1 and BC are exchanged with each other. Furthermore, the data now stored in the line memory BC, namely, the code data B is outputted to the compression data memory 6006. When the outputting of the code data of one line is completed, the line memory BC is set as being empty or idle. This coding operation is performed on the data corresponding to lines of the indicated number.

Incidentally, in case where the decoder 1500 is not in the MG3-code mode, it is not necessary to compare the number of codes with the width of one line. Therefore, the words of the code data outputted from the coder 1500 are directly outputted to the system bus 6010.

As is apparent from the foregoing description, the decoding, the image conversion in the main scanning direction and the coding are performed in parallel with one another. Further, in a stage in which such a processing of data of one page is completed, the parameters such as the number of lines of one page and the number of white lines in a row at the top and bottom portions are obtained under the control of the microprogram control portion 1600. Such parameters are stored in the parameter registers of the RAM 200.

Next, an operation of performing the decoding and the enlargement/reduction (see steps 6405 and 6406 of FIG. 42), which is similar to that of FIG. 29, will be described hereinbelow by referring to FIG. 29.

Namely, the control unit 6001 effects the setting of various registers of the register block of the system bus unit 400 and sets decoding commands in the command register. Further, the control device 6001 preliminarily reads the parameters such as the number of lines of one page and the number of white lines in a row at the top and bottom portion of the page from the parameter registers of the RAM 200 and determines the enlargement/reduction ratios in the main and secondary scanning directions on the basis of the read parameters. This enlargement/reduction ratio in the main scanning direction is written to the parameter register prior to the setting of commands. As will be described later, the enlargement/reduction in the secondary scanning directly is performed by thinning lines (correspondingly to the reduction) or interpolating lines (correspondingly to the enlargement). Therefore, in the registers of the system bus control unit 400, the information representing whether or not each of lines to consecutively be processed is an object to be reduced or thinned and to be enlarged or interpolated.

Then, the microprogram control portion 1600 loads the decoding parameters, which are set in the parameter registers of the RAM 200 by the control device 6001, into the working register 500. Moreover, the start addresses held in the address registers of the working register 500 are established by the control portion in the address counters of the internal bus DMA control portions 300, which correspond to the line memories DECODE, DR, CONVR, CONVW, CODING, C0R/C1R, BC1 and BC (see FIG. 29). The number of words composing the code data A of one line (namely, the width of the line) indicated by the control device 6001 is set in the decoder 1300 and the changing pixel detecting portion 600. The enlargement/reduction ratio (in the main scanning direction) set in the parameter registers of the RAM 200 is further set in the image conversion portion 1400 by the control device 6001. Further, the information (indicating whether or not a line to be processed is an object to be reduced or enlarged) is set at the flag bit of the address register corresponding to the line memory DECODE. Incidentally, the width of a line is reset or updated correspondingly to each line. Upon completion of such an initialization operation, the decoder 1300 is activated.

Thereafter, the code data stored in the compression data memory 6006 is read in word units to the decoder 1300 through the data buffer of the system bus control unit 400. Simultaneously, the data (namely, image data of reference lines) stored in the line memory DR is read in word units therefrom and is then inputted to the changing pixel detection portion 600. Then, a decoding is effected. Thereafter, the image data restored by the decoding is transferred to the line memory DECODE.

When the image data of one line is restored in the line memory DECODE, a flag control operation is effected. For example, the flag bit of the corresponding address register is set as indicating that there is effective data. Further, the flag bit of the address register corresponding to the line memory CONVR is referred to. If the line memory CONVR is empty or idle, the data stored in the line memory DR is transferred to the line memory CONVR. Moreover, the data previously stored in the line memory CONVR is transferred to the line memory DECODE. As previously described, such a transfer of the data is actually performed by exchanging the contents of the address registers of the working register 500 with each other and thereafter setting the start addresses, which are stored as the result of the exchange in the address registers, in the corresponding address counters of the internal bus DMA control portion 300. Incidentally; the microprogram control portion 1600 resets the width of one line and sets the information, which indicates that the line is an object to be enlarged or reduced, at the flag bit of the address register of the current line memory DECODE and activates the decoder 1300 again and starts the decoding of image data of the next line.

Thus, the decoding of image data of lines, the number of which is indicated by the control device 6001, is performed by using the line memories DECODE, DR and CONVR in a circular manner.

Further, if there is effective data in the line memory CONVR and the line memory CONVW is empty or idle and the image conversion portion 1400 does not work, the microprogram control portion 1600 activates the image conversion portion 1400.

Subsequently, the image data stored in the line memory CONVR is read in word units and is inputted to the changing pixel detection portion 700 in word units. Then the conversion (namely, the enlargement/reduction) in the main scanning direction is performed by using the enlargement/reduction ratio indicated by the control device 6001 is performed by the image conversion portion 1400. The resultant image data is transferred to the line memory CONVW in word units.

When the main scanning conversion of one line is finished, the microprogram control portion 1600 sets the flag bit of the address register corresponding to the line memory CONVR as being in an off-state. Further, the control portion 1600 sets the flag bit of the address register corresponding to the line memory CONVW as indicating that there is effective data. Thereafter, if the line memory comes to contain effective data and the line memory, CONVW becomes empty, the image conversion portion 1400 is activated to perform an image conversion in the main scanning direction on the next line.

Further, if there is effective data in the line memory CONVW and conversely the line memory OUT2 is empty, the microprogram control portion 1600 exchanges the contents of these line memories CONVW and OUT2. Furthermore, similar data exchanges between the line memories OUT2 and OUT1 and between the line memories OUT1 and OUT are performed.

If the line memory OUT contains effective data and the line to be currently processed is not a line to be reduced and moreover the image bus control unit 600 is not outputting image data, the image bus control unit 1600 is activated. Further, the image data stored in the line memory OUT is outputted to the image bus 6011. The indicating of the mode and the number of words to be transferred (namely, the width of one line (already obtained by the image conversion portion 1400 at the time of performing the conversion in the main scanning line)), which are necessary for performing this DMA transfer, is effected by the microprogram control portion 1600.

Upon completion of outputting the image data of this line, the flag of the address register of the line memory OUT is set as being in an off-state if this line should not be enlarged.

In contrast, if this line should be enlarged, a flag for indicating a line to be enlarged, which is provided in the address register, is reset. Therefore, a second outputting operation related to the same line is performed. When the second outputting operation is completed, the line memory OUT is set as being empty or idle.

Further, in case where this line is a line to be reduced, the data stored in the line memory OUT is not outputted and this line memory OUT is set as being empty or idle.

By controlling an output of the line memory OUT in such a manner, the image conversion (namely, the enlargement/reduction) in the secondary scanning direction is performed.

As is apparent from the foregoing description, the decoding, the image conversion in the main scanning direction and the image data output processing (the image conversion in the secondary scanning direction) are performed in parallel with one another. Moreover, causes for delay in processing (for instance, the fact that data is transferred through the external bus) are eliminated. Thereby, the processing of data corresponding to one line can be easily performed at a high speed larger than the one-line recording speed of the LBP. Consequently, it is unnecessary to provide a mass image page memory on the image bus 6001.

Additionally, as stated previously, image data may be transferred through a line memory of small memory capacity provided on the image bus 6011. Addresses of the line memory in this case are generated by the address counter of the image bus control unit 100. Further, the start address is set by the microprogram control portion 1600 at the time of initiating an outputting of the data corresponding to one.

Incidentally, the data stored in the line memory OUT may be outputted to the system bus 6010.

Further, an operation of coding of image data is similar to that of FIG. 24.

Where a coding command is set by the control device 6001 in the system bus control unit 400, the coding operation is conducted under the control of the microprogram control portion 1600.

Namely, image data is transferred from the image bus 6011 to the line memory INPUT of the RAM 200 by employing the DMA controller of the image bus control unit 100 and the internal bus DMA controller 300 as a master unit and a slave unit, respectively.

When an inputting of image data of one line is completed, the data stored in the line memory INPUT is transferred to the line memory CONVR. Further, the image conversion in the main scanning direction is performed by the image conversion portion 1400 on the data stored in the line memory CONVW. Resultant data is obtained in the line memory CONVR. If the conversion in the main scanning direction is unnecessary, the data stored in the line memory CONVW is transferred to the line memory CODING without any change.

Further, the data stored in the line memory CODING is coded by the coder 1500 by using coding line data and the data stored in the line memory CR as reference line data. Resultant code data is outputted through the line memories BC1 and BC to the system bus 6010. If the coder 1500 is not in G3-code mode, the output of the coder 1500 may be directly outputted to the system bus 6010.

In case of the third embodiment of the present invention, at the time of receiving code data A, the code conversion is performed on the received code data A and then the code data B obtained as the result of the code conversion is stored in the compression data memory 6006. The size or quantity of the code data B corresponding to one page of the original image is nearly equal to that of image data, which is not coded, at most. Therefore, the necessary capacity of the compression data memory 6006 can be reduced. Further, the compression data memory 6006 can be easily used for another purpose.

Incidentally, in case of a modification of the third embodiment, the code data A received from the circuit is directly stored in the compression data memory 6006 and is retained until the recording thereof is completed. Additionally, to obtain the parameters necessary for determining the enlargement/reduction (for instance, the number of lines of one page and that of white lines arranged in a row at the top and bottom portions of the page), only the decoding of the code data A is performed by the compression/expansion device 6007 during the code data is received. Further, the restored image data is discarded. Namely, only the decoding is effected in steps 6401 and 6405 of FIG. 42 (incidentally, the conversion in the main scanning direction may be included).

Various processing for recording to be performed in steps 6405 and 6406 of FIG. 42 is similarly effected in the modification of the third embodiment. Consequently, a mass image page buffer is unnecessary.

Figure 43:
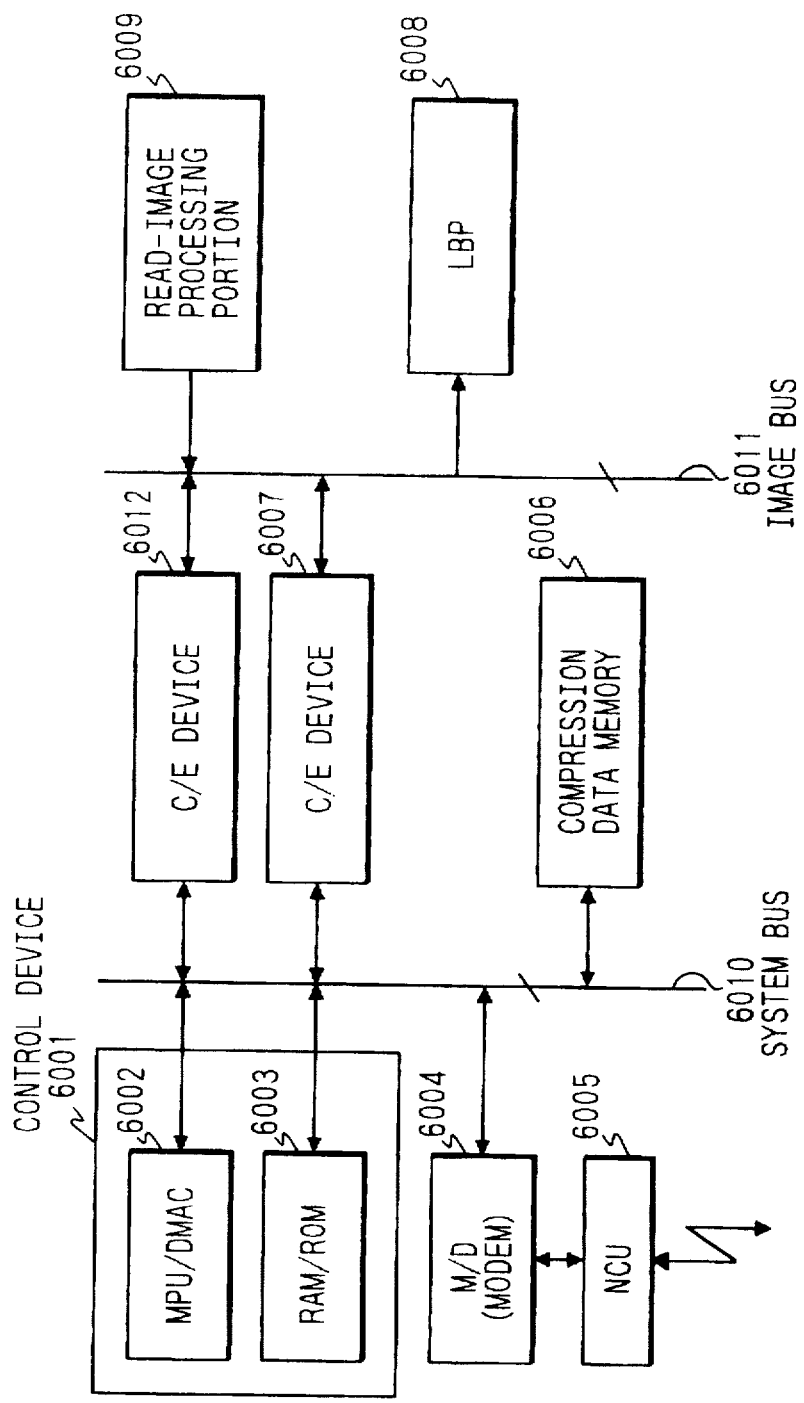
FIG. 43 is a schematic block diagram for illustrating still another example of a facsimile system according to the present invention (namely, a fourth embodiment of the present invention)

FIG. 43 is a schematic block diagram for illustrating the configuration of another facsimile system of the present invention (hereunder sometimes referred to as a fourth embodiment). Like reference characters designate like portions of FIG. 41.

This embodiment is different in configuration from the third embodiment in that two compression/expansion devices 6007 and 6012 are provided in the fourth embodiment. The compression/expansion device 6012 is the same as the compression/expansion device 6007. However, a single compression/expansion device employing 2 channels (namely, a decoding channel and a coding channel) may be provided instead of these devices 6007 and 6012.

In case of the fourth embodiment, when a request for transmission (namely, a request for reading original image to be transmitted) occurs during receiving the code data by the compression/expansion device 6007, image data representing the original image to be transmitted is inputted from the read-image image processing portion 6009 in parallel with the receiving operation and subsequently, the inputted image data is coded by the compression/expansion device 6012. Then, resultant code data can be stored in the compression data memory 6006.

Figure 44:
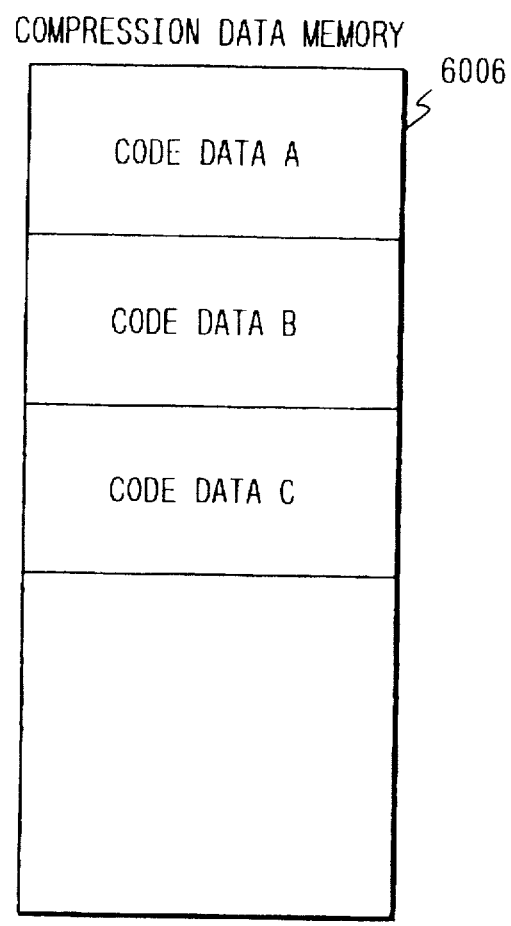
FIG. 44 is a diagram for illustrating the contents of data stored in a compression data memory.

In this case, in the compression data memory 6006, the received code data A, the code data B obtained by the conversion, the code data C corresponding to the original image to be transmitted coexist as illustrated in FIG. 44. The code data C is either facsimile standard code data (namely, MH, MR or MMR code) or MG3 code similarly as the code data B. If only the facsimile standard code data is employed as the code data c, a device employing only a standard coding method may be used as the compression/expansion device 6012.

The size or quantity of the code data B has a maximum value in case where all of an image of one page is what is called a 1-bit alternate image (namely, each bit of data representing the image represents white or black). In case of an ordinary document, the size of the code data P is one-tenth or so of that of the image data. In addition, the size of the code data B is nearly equal to that of the image data, which is not coded, at most as described above. Further, the code data A is merely what is called buffer data to be stored tentatively. Thus, the storage area occupied by the code data A can be small. Hence, if the memory capacity of the compression data memory 6006 is equal to the size of image data of one page or so, it is usual that 80 to 90% of storage areas of the compression data memory 6006 are free spaces, which are not occupied by the code data A and B. Such free spaces are effectively utilized in this embodiment. Thus, the coding off the image data representing the original image of one page to be transmitted can be performed while image data representing another image is received. The code data C corresponding to the original image to be transmitted is converted into code data, which meets the ability of the terminal for receiving the code data C, by the compression/expansion device 6007 (or 6012) after the decoding and recording of the code data B is completed. Incidentally, a process flow of the parallel processing of the reception of image data and the coding of the code data to be transmitted is the same as illustrated in FIG. 37. Therefore, the description thereof is omitted herein.

Figure 45:
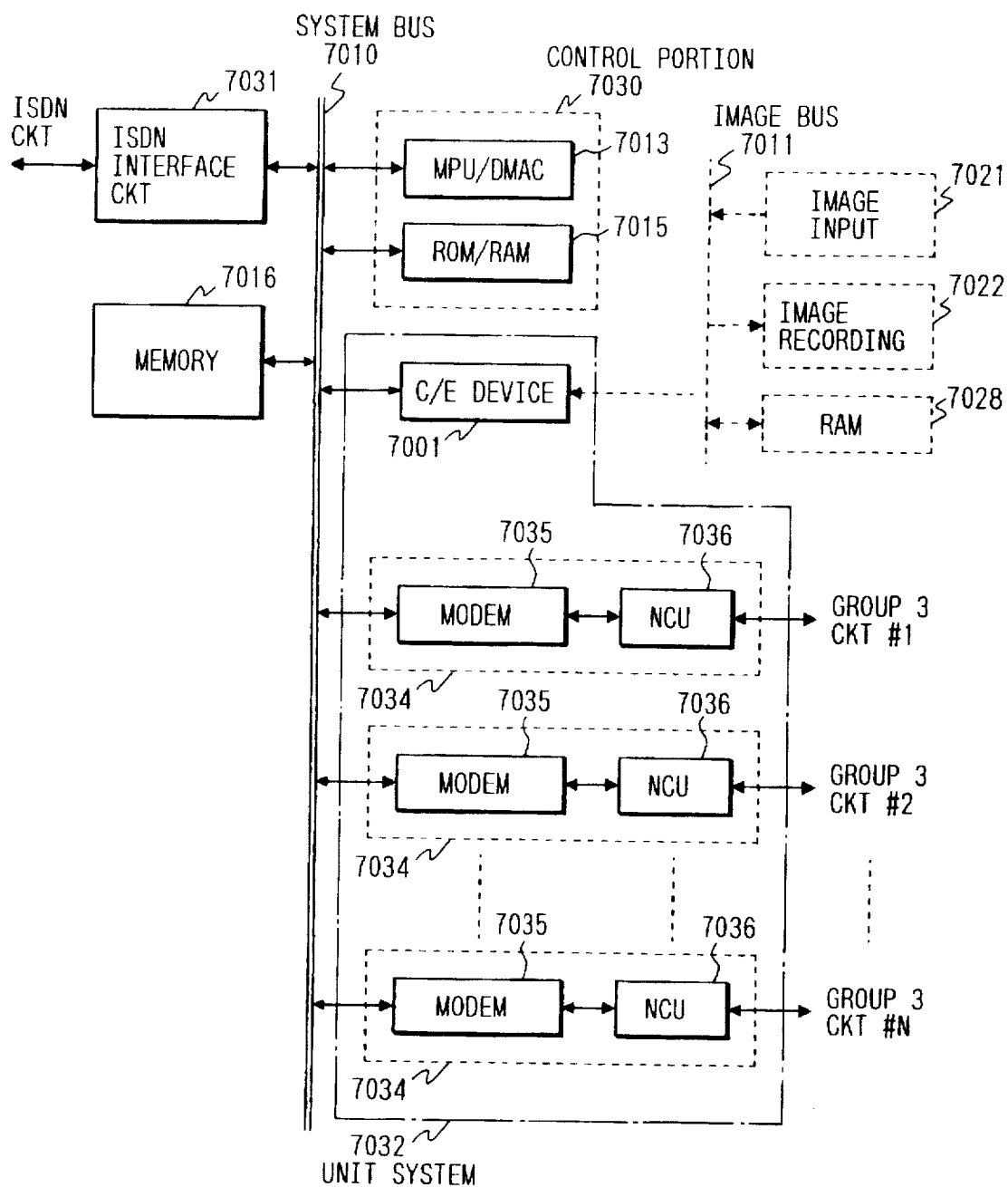
FIG. 45 is a schematic block diagram for illustrating the configuration of an example of a facsimile mail system according to the present invention (namely, a fifth embodiment of the present invention)

FIG. 45 is a schematic block diagram for illustrating the configuration of a facsimile mail system (hereunder sometimes referred to as a fifth embodiment) of the present invention. This embodiment receives facsimile data from Group 4 facsimile transmitting terminals through ISDN (integrated services digital network) circuits and performs a code conversion on the received data and transmits resultant code data to N Group 3 facsimile receiving terminals at most simultaneously.

In this figure, reference numeral 7001 denotes an improved compression/expansion device which can perform a code conversion at an extremely high speed. This compression/expansion device 7001 may be used not only as a code conversion device but also as a compression, expansion or image conversion device, as will be described in detail later. Reference numeral 7016 designates a memory for temporarily storing image code data (namely, received data or transmitted data); and 7031 an ISDN interface circuit for interfacing with the ISDN circuits.

Further, reference numeral 7034 denotes N communication units provided correspondingly to the Group 3 circuits (#1 to #N) for interfacing to the Group 3 circuits. Each of the communication units 7034 consists of a modem 7035 and an NCU 7036.

Reference numeral 7030 indicates a control portion for performing the facsimile procedure (or protocol), controlling operations of each of the other portions of the system and controlling data transfer. This control portion 7030 is of the program control type and is comprised of an MPU 7013 including a DMA controller, a memory (ROM/RAM) 7015 for storing programs and data, and MPU peripheral circuits (not shown). Incidentally, reference numeral 7010 designates a system bus used as a transmission line or path for transmitting data and control information among the composing elements or portions of the system.

The compression/expansion device 7001 performs code conversion on code data received from the N circuits. A set of a single compression/enlargement device 7001 and N communication units (corresponding to N circuits) composes a unit system 7032 required for increasing one circuit or line. Increasing of circuits in N-circuit units can be met only by adding this unit system 7032.

Figure 46:
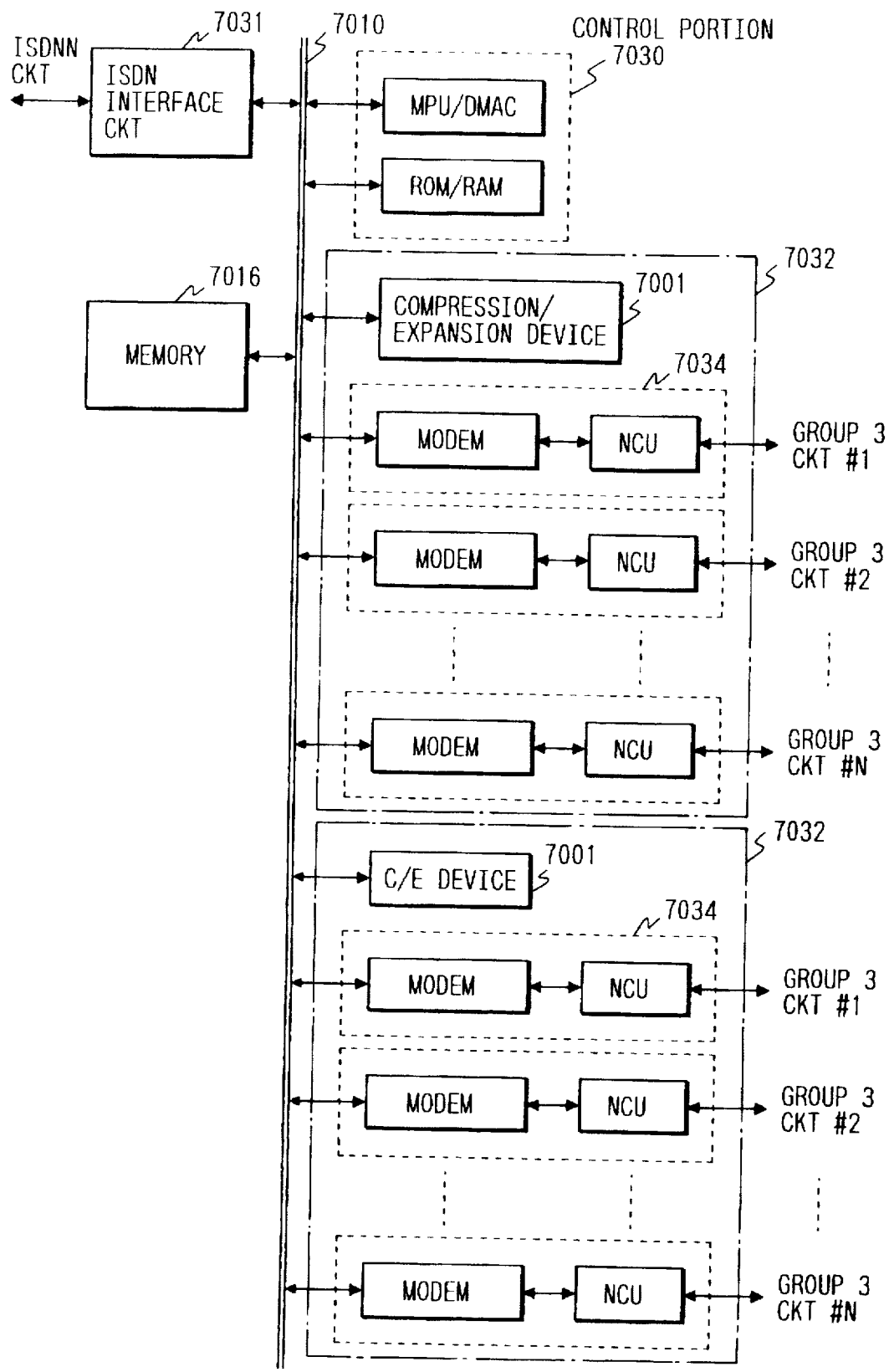
FIG. 46 is a schematic block diagram for illustrating another example of a facsimile mail system according to the present invention in case of increasing the number of circuits (or lines) to be connected thereto.

FIG. 46 illustrates an example of such increasing of circuits. In this example, two unit systems 7032 are provided. Thus, this example can simultaneously transmits data to 2N Group 3 facsimile receiving terminals through 2N Group 3 circuits (#1 ... #N, #(N+1) ... #(2N)). There is no necessity of modifying the other portions of the configuration of the facsimile system. Incidentally, the number of circuits actually connected to a unit system 7032 may be less than N.

An operation of the entire facsimile mail system will be described hereinbelow. Additionally, in the following description, it is assumed that the configuration of the facsimile mail system is as illustrated in FIG. 45. However, in case of a facsimile mail system employing the configuration of FIG. 46, to which a unit system 7032 is added, an operation thereof is similar to the operation described hereinbelow.

First, image code data received from the Group 4 facsimile transmitting terminal through the ISDN circuit is stored in the memory 7016 through the ISDN interface circuit 7031. At that time, the facsimile procedures are controlled by the control portion 7030. Further, the facsimile procedures are the same as employed in the conventional mail system. Therefore, the detailed description of the facsimile control procedures can be omitted.

Figure 47A:
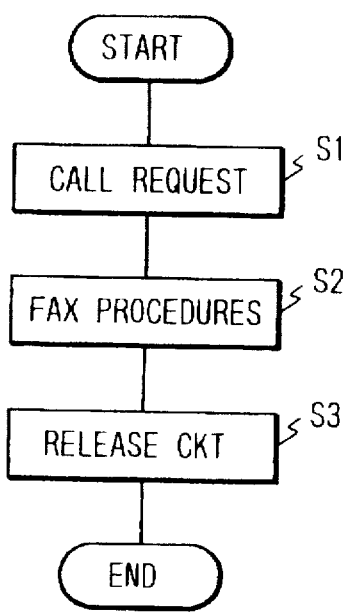
FIG. 47(a) is a general flowchart for illustrating an operation of transmitting data to one circuit or line.

After the receiving of data sent from the Group 4 transmitting terminal, the control portion 7030 starts transmitting data to the Group 3 facsimile receiving terminal. FIG. 47(a) is a schematic flowchart for illustrating an operation transmitting data to a circuit.

The control portion 7030 calls the N Group 3 facsimile receiving terminals through the the communication units corresponding to the Group 3 circuits (#1 to #N) one-to-one instep S1. Then, in step S2, the control portion performs the facsimile procedure correspondingly to each of the Group 3 facsimile receiving terminals, to which a call has been established. Thereafter, the control portion releases the circuits in step S3.

The control portion 7030 appreciates the receiving ability of each of the Group 3 facsimile receiving terminals from a DIS signal received in Phase B of the facsimile protocol or procedure correspondingly thereto. Data representing the receiving ability of each of the Group 3 facsimile receiving terminals is stored in the memory 7015 correspondingly to the Group 3 circuits #1 to #N. Simultaneously with this, DIS receiving flags are set in the memory 7015 correspondingly to the G3 circuits.

Figure 47B:
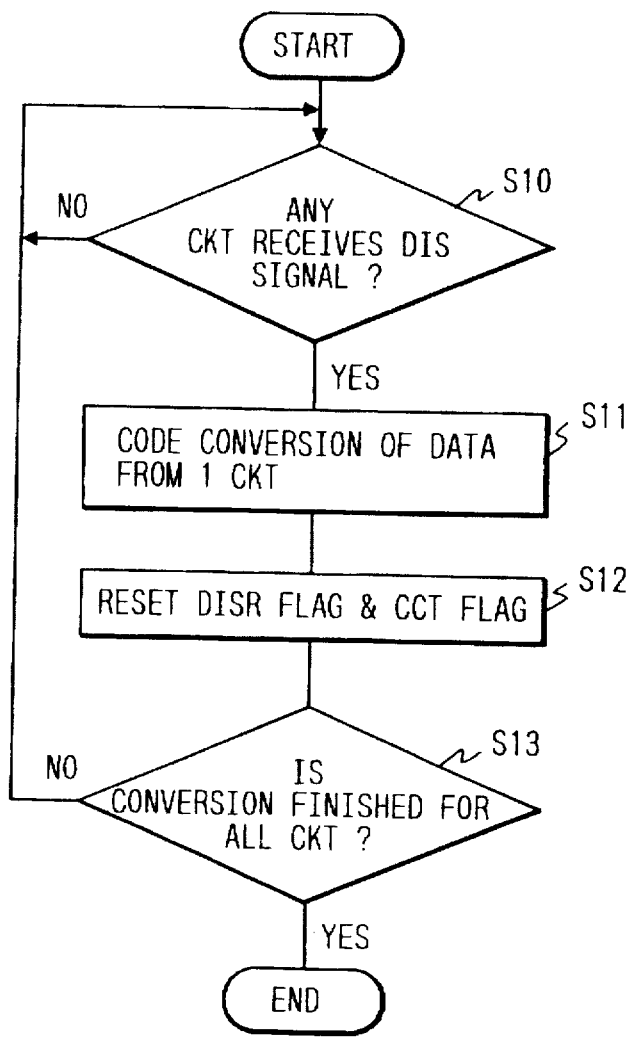
FIG. 47(b) is a general flowchart for illustrating an operation of controlling a code conversion.

Further, the control portion 7030 controls the compression/expansion device 7001 such that a code conversion is performed on the received image code data stored in the memory 7016 according to the receiving ability of each Group 3 facsimile receiving terminal by the device 7001. FIG. 47(b) is a schematic flowchart of a program for performing this control operation. Namely, in step S10, the DIS receiving flags stored in the memory 7015 are referred to and it is checked whether or not there is any circuit, correspondingly to which the flag is set. In case where the DIS receiving flags are set correspondingly to one or more circuits, one of such circuits is selected and a code conversion, which meets the receiving ability of the Group 3 facsimile receiving terminal connected to the selected circuit, is performed in step S11. The converted image code data are managed correspondingly to the circuits and are stored in the memory 7011. Upon completion of the code conversion corresponding to one circuit, the DIS receiving flag corresponding to this circuit is reset and a code conversion termination flag stored in the memory 7015 correspondingly to this circuit is set in step S12. The control operation described hereinabove is repeated until it is found in step S13 that the code conversions of data corresponding to all of the circuits are completed.

Such code conversions are finished before the system enters Phase C of the facsimile procedure of step S2. Conversely, the number N of the circuits is determined in such a manner that the code conversions of data corresponding to all of the circuits connected to a compression/expansion device 7001 can be finished before the system enters Phase C even in the worst case, namely, even in case that the DIS signals are received from all of the Group 3 facsimile receiving terminals connected to the circuits.

Thereafter, the control portion 7030 transmits to each of the Group 3 facsimile receiving terminals the corresponding converted code data, which are stored in the memory 7016 in Phase C, through the corresponding communication unit 7034.

Incidentally, the priority of each of the Group 3 circuits (#1 to #N) is preliminarily determined. If the DIS receiving flags respectively corresponding to two or more circuits are set, one of the circuits, which has the highest priority, is chosen in step S11. If, for instance, the priorities of the Group 3 circuits #1 to #N are predetermined as #1>#2>#3>. . . >#(N−1)>#N (namely, the circuit #1 has the highest priority) and the DIS receiving flags of all of the circuits are set, the circuits are selected from #1.

Incidentally, note that the control operation or priority control using the flags, which has been described above, is merely an example and that other suitable control methods may be employed.

FIG. 48 illustrates an example of a communication sequence. In this example, it is assumed that DIS signals are simultaneously received from all of the Group 3 circuits #1 to #N. Further, in this case, code conversion operations are performed according to the priorities predetermined as above described. However, it is usual that the receiving moments or times, at which the DIS signals are received, vary with the circuits.

Time required for performing each of the Group 3 facsimile procedures is long and is usually 5 seconds or so from the beginning thereof to the time at which the system enters Phase C. However, a speed, at which the code conversion (including the paper size conversion) is effected in the compression/expansion device 7001 of this embodiment, is very high sufficient to the extent that the code conversions corresponding to 16 circuits can be performed in 5 seconds, as will be more practically described later. Namely, the maximum value of N is equal to 16. Incidentally, this value is obtained in the worst case, namely, in the case that DIS signals are simultaneously received from all of the circuits. In practice, the receiving moments or times, at which the DIS signals are received, vary with the circuits, as above described. Thus, practically, a single compression/expansion device 7001 can perform code conversions corresponding to a further larger number of the circuits. Additionally, in the foregoing description, it has been described that a code conversion is performed on facsimile data received from ISDN circuits and resultant data is transmitted to Group 3 facsimile receiving terminals. Apparently, a code conversion can be performed on facsimile data received from Group 3 circuits and resultant data can be similarly transmitted to Group 3 facsimile receiving terminals.

Further, the configuration of the compression/expansion device of this embodiment is the same as illustrated in FIG. 7. The compression/expansion device of this embodiment can perform a code conversion, a decoding, an image conversion (namely, an enlargement/reduction required for a paper size conversion) and the combinations of these at a high speed. Further, an example of such a combination is a code conversion.

Moreover, the compression/expansion device of this embodiment can interface to the system bus 10. Furthermore, as indicated by a dashed line in FIG. 45, the compression/expansion device of this embodiment can interface with an external image bus 7011. In addition, the compression/expansion device of this embodiment can control data input from an image data input portion 7021 and data output to an image recording portion 7022 to be performed through the RAM 2028 on the image bus 7011 or directly. Incidentally, there are microprogram control buses (not shown in FIG. 7) between the microprogram control portion 1600 and each of the portions of the system.

Meanwhile, the configurations and operations of various portions of this embodiment are the same as of the corresponding portions of the first embodiment. Namely, the configuration of a coder of this embodiment is the same as illustrated in FIG. 9. Further, the configuration of a decoder of this embodiment is the same as illustrated in FIG. 10. Furthermore, the configuration of an image conversion portion of this embodiment is the same as illustrated in FIG. 11. Additionally, the configurations of an ALU and a working register are the same as illustrated in FIG. 12. In addition, the configurations of a microprogram control portion and a system bus control unit are the same as illustrated in FIG. 13. Further, the manner, in which an internal RAM is used, is the same as illustrated in FIG. 14. The arrangement of line memories and associated portions is the same as illustrated in FIGS. 16, 17 and 18. Regarding operations of this embodiment, refer to, for instance, FIGS. 22, 23, 25 to 28, 30, 31, 35 and 36.

Incidentally, similarly as in case of the first embodiment, the compression/expansion device 7001 of this embodiment is adapted to perform only an image conversion. Alternatively, the compression/expansion device 7001 of this embodiment is adapted to perform an expansion operation without outputting data and can effect a checking of errors in code data and can detect the parameters such as the number of lines of one page and that of white lines arranged in a row at the top and bottom portions of the page at a high speed.

Figure 49:
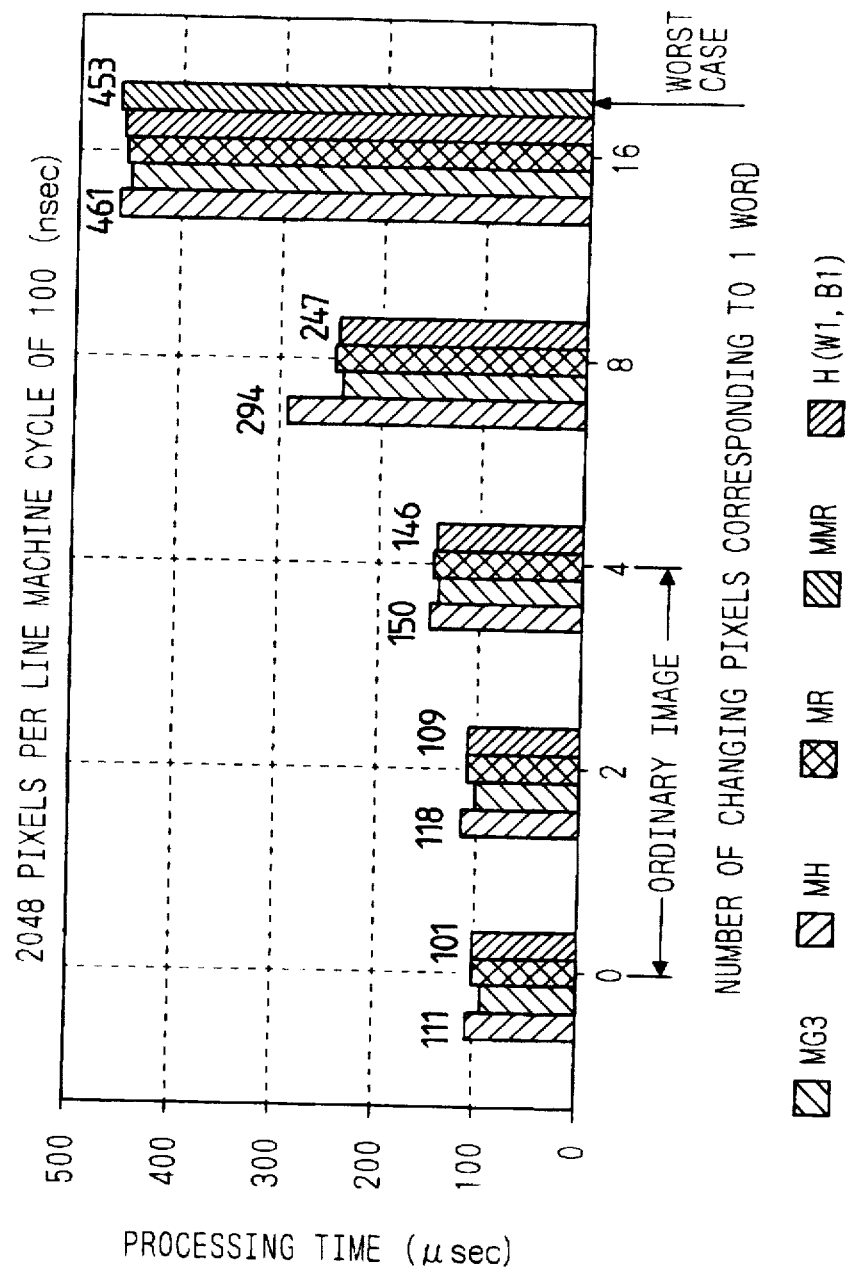
FIG. 49 is a graph for illustrating the relation between each coding method employed in a compression/expansion device and a processing time required for processing data of one line at the time of performing a compression operation.
Figure 50:
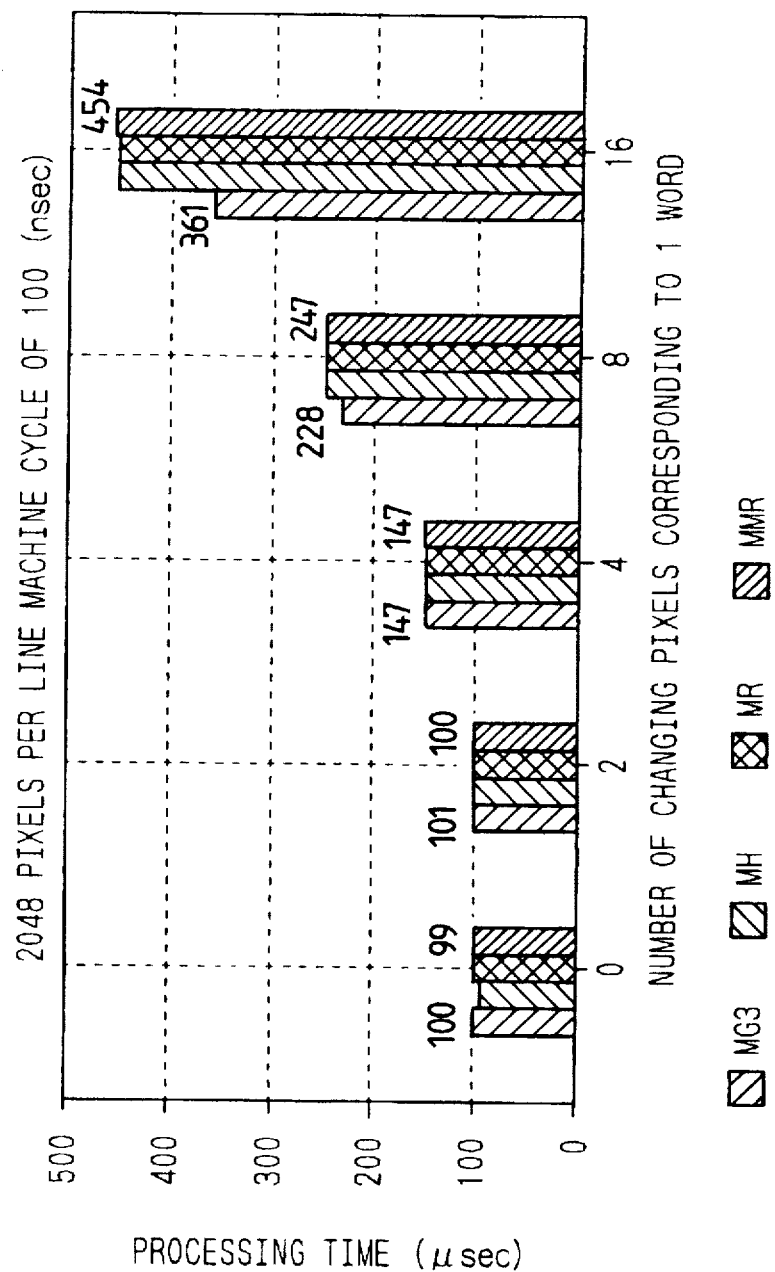
FIG. 50 is a graph for illustrating the relation between each coding method employed in a compression/expansion device and a processing time required for processing data of one line at the time of performing an enlargement operation.

Actually observed values of processing times in case of the compression/expansion device 7001 are shown in FIGS. 49 and 50. FIG. 49 shows the relation between the number of changing pixels of one word and the processing time required for effecting a compression operation (namely, performing a coding and an image conversion on) data corresponding to one line. FIG. 50 shows the relation between the number of changing pixels of one word and the processing time required for effecting an expansion operation (namely, performing a decoding and an image conversion on) data corresponding to one line.

Further, conditions of measurement are established such that the internal load of the compression/expansion device attain a maximum value on the assumption that the rate of the image conversion is 100%. Further, the length or width of one length and a machine cycle are assumed to be 2048 pixels corresponding to ISO (International Standards Organization) B4 nominal page and 100 nano-seconds (nsec) corresponding to 10 mega-hertzes (MHz). These figures show observed values of MH, MR and MMR codes of the facsimile standard coding system and the MG3-coding system, which is employed such that the size of code data does not exceed that of image data, and 1-bit alternate image data H (W1, B1).

The horizontal axis of each of these figures represents the number of changing pixels corresponding to one word (or 16 bits). In case of a common document or image, the number of the changing pixels corresponding to one word ranges from 0 to 4 or so. Therefore, in such a case, data of one line can be compressed or expanded in 100 micro-seconds (µ sec) or so.

Further, the processing time required for performing a code conversion is equal to or less than a total of a time required for performing a compression and a time required for performing an expansion. Namely, even in case of including a time required for effecting an image conversion (namely, a size conversion) from ISO B4 to ISO B4 in the processing time, a code conversion can be performed on an ordinary document or image at a high speed (namely, at a rate of 200 µ sec per line or so).

Practically, it is usual to perform an image conversion from ISO B4 to ISO A4. Therefore, the practical processing time is further smaller than the above-mentioned value. Further, in this case, it is assumed that the compression/expansion device 7001 is operated at a frequency of 10 MHz corresponding to a machine cycle of 100 nsec. However, it is confirmed that the compression/expansion device 7001 can be easily operated at a frequency of 16 MHz. Thus the processing time required for performing a code conversion can be reduced to 100 µ sec per line or so. Supposing that one page has 2400 lines, a code conversion of data corresponding to one page can be done in 0.2 to 0.3 sec. Consequently, as described above, a single compression/expansion device 7001 can perform a code conversion of data received from 16 circuits or lines in 5 sec or so.

Incidentally, in the foregoing description, an example of applying the present invention to a facsimile mail system has been described. However, it is apparent that the present invention can be applied to another image communication device for performing similar image code data transmission processing by employing specific communication procedures other than the facsimile procedures.

While the preferred embodiments of the present invention have been described above, it is to be understood that the present invention is not limited thereto and that other modifications will be apparent to those skilled in the art without departing from the spirit of the invention. For instance, in accordance with the present invention, there is provided a device which can perform one or more of the compression, expansion and code conversion. Further, the compression/expansion device of the present invention is most suitable for an image communication device such as a facsimile system. The compression/expansion device of the present invention, however, is also suitable for an image processing to be performed in an image file system or the like. The scope of the present invention, therefore, is to be determined solely by the appended claims.

What is claimed is:

1. An image communication system comprising:

receiving means for receiving code data corresponding to an image from a circuit;

compression/expansion performing means for decoding the code data received by the receiving means to first image data indicating the image of one page, calculating an enlargement/reduction parameter required to determine an enlargement/reduction ratio from the first image data corresponding to one page and coding the first image data to re-coded data;

coded data storing means for storing the re-coded data obtained by the compression/expansion performing means;

control means for controlling the compression/expansion performing means to decode the code data to the first image data, code the first image data to the re-coded data, re-decode the re-coded data stored in the coded data storing means to second image data indicating the image and convert the second image data into enlargement/reduction image data by performing an enlargement/reduction operation for the second image data according to the enlargement/reduction parameter; and recording means for recording the enlargement/reduction image data obtained by the compression/expansion performing means on a recording paper having a fixed size under the control of the control means.

2. An image communication system according to claim 1 in which the reception of the code data in the receiving means is performed in parallel with a storing operation of the re coded data performed in the coded data storing means and the recording of the enlargement/reduction image data in the recording means in cases where a data recording instruction indicating the recording of the enlargement/reduction image data is received by the control means during the reception of the code data in the receiving means.

3. An image communication system according to claim 1 in which the enlargement/reduction parameter indicates the number of lines in one page, the number of white lines in a row at the top of the page and the number of white lines in a row at the bottom of the page.

4. An image communication system according to claim 1 in which the recording of the enlargement/reduction image data in the recording means is performed in parallel with the coding of the first image data to re-coded data performed by the compression/expansion performing means.

5. An image communication system according to claim 1 in which compression/expansion performing means is composed of a first compression/expansion performing unit and a second compression/expansion performing unit, the decoding of the code data to the first image data is performed in the first compression/expansion performing unit in parallel with the re-decoding of the re-coded data to the second image data and the conversion of the second image data into the enlargement/reduction image data performed in the second compression/expansion performing unit.

6. An image communication system comprising:

receiving means for receiving code data corresponding to an image from a circuit, the code data being coded according to a first data coding;

compression/expansion performing means for decoding the code data received by the receiving means to first image data indicating the image of one page, calculating an enlargement/reduction parameter required to determine an enlargement/reduction ratio from the first image data corresponding to one page and coding the first image data to re-coded data, the re-coded data being coded according to a second data coding different from the first data coding;

coded data storing means for storing the re-coded data obtained by the compression/expansion performing means;

control means for controlling the compression/expansion performing means to decode the code data to the first image data, code the first image data to the re-coded data, re-decode the re-coded data stored in the coded data storing means to second image data indicating the image and convert the second image data into enlargement/reduction image data by performing an enlargement/reduction operation for the second image data according to the enlargement/reduction parameter; and recording means for recording the enlargement/reduction image data obtained by the compression/expansion performing means on a recording paper having a fixed size under the control of the control means.

7. An image communication system according to claim 6 in which the reception of the code data in the receiving means is performed in parallel with a storing operation of the recoded data performed in the coded data storing means and the recording of the enlargement/reduction image data in the recording means in cases where a data recording instruction indicating the recording of the enlargement/reduction image data is received by the control means during the reception of the code data in the receiving means.

8. An image communication system according to claim 6 in which the enlargement/reduction parameter indicates the number of lines in one page, the number of white lines in a row at the top of the page and the number of white lines in a row at the bottom of the page.

9. An image communication system according to claim 6 in which the recording of the enlargement/reduction image data in the recording means is performed in parallel with the coding of the first image data to re-coded data performed by the compression/expansion performing means.

10. An image communication system according to claim 6 in which compression/expansion performing means is composed of a first compression/expansion performing unit and a second compression/expansion performing unit, the decoding of the code data to the first image data is performed in the first compression/expansion performing unit in parallel with the re-decoding of the re-coded data to the second image data and the conversion of the second image data into the enlargement/reduction image data performed in the second compression/expansion performing unit.

11. An image communication system according to claim 6 in which the first data coding is an MH, MR or MMR facsimile standard coding prescribed in CCITT Recommendation T4 and T6, and the second data coding is an MG3 coding.

* * * * *